(12) United States Patent
Rich et al.

(10) Patent No.: US 12,397,576 B2
(45) Date of Patent: Aug. 26, 2025

(54) OPTICAL PRODUCTS, MASTERS FOR FABRICATING OPTICAL PRODUCTS, AND METHODS FOR MANUFACTURING MASTERS AND OPTICAL PRODUCTS

(71) Applicant: WAVEFRONT TECHNOLOGY, INC., Paramount, CA (US)

(72) Inventors: Christopher Chapman Rich, Rancho Palos Verdes, CA (US); Joel Mikael Petersen, Valley Village, CA (US); John Michael Tamkin, Pasadena, CA (US); Roger Winston Phillips, Santa Rosa, CA (US); Phillip Christopher Harvey, Long Beach, CA (US)

(73) Assignee: WAVEFRONT TECHNOLOGY, INC., Paramount, CA (US)

( * ) Notice: Subject to any disclaimer, the term of this patent is extended or adjusted under 35 U.S.C. 154(b) by 0 days.

(21) Appl. No.: 18/174,510

(22) Filed: Feb. 24, 2023

(65) Prior Publication Data
US 2024/0059094 A1     Feb. 22, 2024

Related U.S. Application Data

(63) Continuation of application No. 16/378,125, filed on Apr. 8, 2019, now Pat. No. 11,590,790, which is a
(Continued)

(51) Int. Cl.
*B42D 25/342*     (2014.01)
*B42D 25/21*      (2014.01)
(Continued)

(52) U.S. Cl.
CPC ........... *B42D 25/342* (2014.10); *B42D 25/21* (2014.10); *B42D 25/29* (2014.10); *B42D 25/324* (2014.10);
(Continued)

(58) Field of Classification Search
CPC ....... B42D 25/342; B42D 25/21; B42D 25/29
(Continued)

(56) References Cited

U.S. PATENT DOCUMENTS

| 4,124,947 A | 11/1978 | Kuhl et al. |
|---|---|---|
| 4,186,943 A | 2/1980 | Lee |

(Continued)

FOREIGN PATENT DOCUMENTS

| AU | 2006246716 | 11/2006 |
|---|---|---|
| AU | 2011348479 A1 | 6/2013 |

(Continued)

OTHER PUBLICATIONS

Choi et al., "Image degradation due to surface scatter in the presence of aberrations," Applied Optics, vol. 51, No. 5, pp. 535-546, Feb. 10, 2012.
(Continued)

*Primary Examiner* — Robert E. Tallman
(74) *Attorney, Agent, or Firm* — Knobbe, Martens, Olson & Bear, LLP

(57) ABSTRACT

An optical product can reproduce a first 3D image of at least part of a first 3D object and a second 3D image of at least part of a second 3D object. The optical product comprises a surface configured, when illuminated, to reproduce by reflected or transmitted light, the first 3D image without reproducing the second 3D image at a first angle of view, and the second 3D image without reproducing the first 3D image at a second angle of view. Each portion of first portions can correspond to a point on a surface of the first 3D object, and comprise first non-holographic features configured to produce at least part of the first 3D image. Each portion of second portions can correspond to a point on a surface of the
(Continued)

second 3D object, and comprise second non-holographic features configured to produce at least part of the second 3D image.

19 Claims, 26 Drawing Sheets

Related U.S. Application Data continuation of application No. 15/208,551, filed on Jul. 12, 2016, now Pat. No. 10,252,563.

(60) Provisional application No. 62/329,192, filed on Apr. 28, 2016, provisional application No. 62/328,606, filed on Apr. 27, 2016, provisional application No. 62/326,707, filed on Apr. 22, 2016, provisional application No. 62/326,706, filed on Apr. 22, 2016, provisional application No. 62/192,052, filed on Jul. 13, 2015.

(51) Int. Cl.
*B42D 25/29* (2014.01)
*B42D 25/324* (2014.01)
*B42D 25/351* (2014.01)
*B42D 25/355* (2014.01)
*B42D 25/373* (2014.01)
*B42D 25/378* (2014.01)
*B42D 25/425* (2014.01)
*G02B 5/18* (2006.01)

(52) U.S. Cl.
CPC ......... *B42D 25/351* (2014.10); *B42D 25/355* (2014.10); *B42D 25/373* (2014.10); *B42D 25/378* (2014.10); *B42D 25/425* (2014.10); *G02B 5/18* (2013.01)

(58) Field of Classification Search
USPC ....................................................... 359/629
See application file for complete search history.

(56) References Cited

U.S. PATENT DOCUMENTS

| | | |
|---|---|---|
| 4,417,784 A | 11/1983 | Knop et al. |
| 4,534,398 A | 8/1985 | Crane |
| 4,681,451 A | 7/1987 | Guerra et al. |
| 4,892,336 A | 1/1990 | Kaule et al. |
| 5,105,306 A | 4/1992 | Ohala |
| 5,276,478 A | 1/1994 | Morton |
| 5,291,317 A | 3/1994 | Newswanger |
| 5,600,486 A | 2/1997 | Gal et al. |
| 5,689,340 A | 11/1997 | Young |
| 5,699,190 A | 12/1997 | Young et al. |
| 5,924,870 A | 7/1999 | Brosh et al. |
| 6,351,334 B1 | 2/2002 | Hsieh et al. |
| 6,410,213 B1 | 6/2002 | Raguin et al. |
| 6,424,467 B1 | 7/2002 | Goggins |
| 6,817,530 B2 | 11/2004 | Labrec et al. |
| 7,047,883 B2 | 5/2006 | Raksha et al. |
| 7,298,533 B2 | 11/2007 | Petersen et al. |
| 7,333,268 B2 | 2/2008 | Steenblik et al. |
| 7,551,335 B2 | 6/2009 | Schilling et al. |
| 7,729,026 B2 | 6/2010 | Argoitia et al. |
| 8,009,360 B2 | 8/2011 | Steenblik et al. |
| 8,025,239 B2 | 9/2011 | Labrec et al. |
| 8,077,393 B2 | 12/2011 | Steenblik et al. |
| 8,111,462 B2 | 2/2012 | Steenblik et al. |
| 8,120,855 B2 | 2/2012 | Steenblik et al. |
| 8,144,399 B2 | 3/2012 | Steenblik et al. |
| 8,254,030 B2 | 8/2012 | Steenblik et al. |
| 8,284,492 B2 | 10/2012 | Crane et al. |
| 8,310,760 B2 | 11/2012 | Steenblik et al. |
| 8,739,711 B2 | 6/2014 | Cote |
| 8,755,121 B2 | 6/2014 | Cape et al. |
| 8,773,763 B2 | 7/2014 | Steenblik et al. |
| 8,861,055 B2 | 10/2014 | Holmes et al. |
| 8,867,134 B2 | 10/2014 | Steenblik et al. |
| 8,964,296 B2 | 2/2015 | Hoffmuller et al. |
| 8,982,231 B2 | 3/2015 | Vincent |
| 9,016,726 B2 | 4/2015 | Rauch et al. |
| 9,132,690 B2 | 9/2015 | Raymond et al. |
| 9,234,992 B2 | 1/2016 | Hill et al. |
| 9,827,802 B2 | 11/2017 | Fuhse et al. |
| 10,252,563 B2 | 4/2019 | Rich et al. |
| 10,850,550 B2 | 12/2020 | Rich et al. |
| 10,859,851 B2 | 12/2020 | Rich et al. |
| 11,113,919 B2 | 9/2021 | Rich et al. |
| 11,221,448 B2 | 1/2022 | Rich et al. |
| 11,590,790 B2 | 2/2023 | Rich et al. |
| 11,618,275 B2 | 4/2023 | Rich et al. |
| 11,861,966 B2 | 1/2024 | Rich et al. |
| 2003/0179364 A1 | 9/2003 | Steenblik et al. |
| 2003/0183695 A1 | 10/2003 | Labrec et al. |
| 2004/0196516 A1 | 10/2004 | Petersen et al. |
| 2004/0240777 A1* | 12/2004 | Woodgate ............ H04N 13/398 385/11 |
| 2005/0180020 A1 | 8/2005 | Steenblik et al. |
| 2006/0056065 A1 | 3/2006 | Schilling et al. |
| 2007/0058260 A1 | 3/2007 | Steenblik et al. |
| 2007/0098989 A1 | 5/2007 | Raksha et al. |
| 2007/0273143 A1 | 11/2007 | Crane et al. |
| 2008/0036196 A1 | 2/2008 | Steenblik et al. |
| 2008/0037131 A1 | 2/2008 | Steenblik et al. |
| 2008/0165423 A1 | 7/2008 | Steenblik et al. |
| 2008/0166505 A1 | 7/2008 | Huang et al. |
| 2008/0212192 A1 | 9/2008 | Steenblik et al. |
| 2008/0212193 A1 | 9/2008 | Steenblik et al. |
| 2008/0258456 A1 | 10/2008 | Rahm et al. |
| 2008/0309063 A1 | 12/2008 | Zintzmeyer |
| 2009/0021840 A1 | 1/2009 | Steenblik et al. |
| 2009/0034082 A1 | 2/2009 | Commander et al. |
| 2009/0102179 A1 | 4/2009 | Lo |
| 2009/0122412 A1 | 5/2009 | Steenblik et al. |
| 2010/0172000 A1 | 7/2010 | Holmes |
| 2010/0246019 A1 | 9/2010 | Booyens et al. |
| 2010/0308571 A1 | 12/2010 | Steenblik et al. |
| 2011/0019283 A1 | 1/2011 | Steenblik et al. |
| 2011/0036282 A1 | 2/2011 | Cote |
| 2011/0209328 A1 | 9/2011 | Steenblik et al. |
| 2012/0099199 A1 | 4/2012 | Vasylyev |
| 2012/0170124 A1 | 7/2012 | Fuhse et al. |
| 2012/0237675 A1 | 9/2012 | Sharp et al. |
| 2012/0319395 A1 | 12/2012 | Fuhse et al. |
| 2013/0052373 A1 | 2/2013 | Noizet |
| 2013/0093172 A1 | 4/2013 | Fuhse et al. |
| 2013/0099474 A1 | 4/2013 | Fuhse et al. |
| 2013/0106092 A1 | 5/2013 | Holmes |
| 2013/0182300 A1 | 7/2013 | Müller et al. |
| 2013/0193679 A1 | 8/2013 | Fuhse et al. |
| 2013/0266722 A1 | 10/2013 | Hill et al. |
| 2013/0270813 A1 | 10/2013 | Hoffmuller et al. |
| 2014/0151996 A1 | 6/2014 | Camus |
| 2014/0160568 A1 | 6/2014 | Fuhse |
| 2014/0177008 A1 | 6/2014 | Raymond et al. |
| 2014/0184599 A1 | 7/2014 | Quilot et al. |
| 2014/0191500 A1 | 7/2014 | Holmes |
| 2014/0268332 A1 | 9/2014 | Guo et al. |
| 2014/0346766 A1 | 11/2014 | Walter et al. |
| 2015/0084324 A1 | 3/2015 | Spehar |
| 2015/0084327 A1 | 3/2015 | Souparis |
| 2015/0198924 A1 | 7/2015 | Woida-O'Brien |
| 2015/0213666 A1 | 7/2015 | Schiffmann et al. |
| 2015/0258838 A1 | 9/2015 | Fuhse |
| 2015/0352884 A1 | 12/2015 | Fuhse et al. |
| 2016/0023495 A1 | 1/2016 | Fuhse et al. |
| 2016/0075164 A1 | 3/2016 | Sarrazin |
| 2016/0075166 A1 | 3/2016 | Ritter et al. |
| 2016/0147076 A1 | 5/2016 | Rich et al. |
| 2016/0167421 A1 | 6/2016 | Holmes |
| 2016/0176221 A1 | 6/2016 | Holmes |
| 2016/0178221 A1 | 6/2016 | Thornton |

(56) References Cited

U.S. PATENT DOCUMENTS

| | | |
|---|---|---|
| 2017/0023711 A1 | 1/2017 | Jiang et al. |
| 2017/0129272 A1 | 5/2017 | Rich et al. |
| 2018/0001692 A1 | 1/2018 | Rich et al. |
| 2018/0272788 A1 | 9/2018 | Bleiman et al. |
| 2019/0236887 A1 | 8/2019 | Rich et al. |
| 2019/0313086 A1 | 10/2019 | Contreras et al. |
| 2020/0039279 A1 | 2/2020 | Rich et al. |
| 2020/0400892 A1 | 12/2020 | Rich et al. |
| 2021/0101402 A1 | 4/2021 | Kohlmann et al. |
| 2021/0271105 A1 | 9/2021 | Rich et al. |
| 2021/0347194 A1 | 11/2021 | Rich et al. |
| 2021/0370701 A1 | 12/2021 | Godfrey |
| 2022/0221735 A1 | 7/2022 | Rich et al. |
| 2022/0237979 A1 | 7/2022 | Rich et al. |
| 2022/0276501 A1 | 9/2022 | Rich et al. |
| 2022/0276502 A1 | 9/2022 | Rich et al. |
| 2023/0264510 A1 | 8/2023 | Rich et al. |
| 2024/0083189 A1 | 3/2024 | Rich et al. |

FOREIGN PATENT DOCUMENTS

| | | |
|---|---|---|
| AU | 2014250638 | 11/2014 |
| AU | 2014250641 | 11/2014 |
| CN | 1906547 | 1/2007 |
| CN | 101563640 | 10/2009 |
| CN | 102712206 | 10/2012 |
| CN | 103748284 | 4/2014 |
| CN | 104769490 | 7/2015 |
| CN | 104838304 | 8/2015 |
| CN | 105636798 | 6/2016 |
| CN | 105291630 | 1/2017 |
| DE | 10 2012 010 908 | 12/2013 |
| DE | 10 2015 015 991 | 6/2017 |
| EP | 0 323 108 | 7/1989 |
| EP | 1 893 074 | 3/2008 |
| EP | 1 948 333 | 1/2011 |
| EP | 2 270 557 | 1/2011 |
| EP | 2 338 692 | 6/2011 |
| EP | 2 365 374 | 9/2011 |
| EP | 2 365 375 | 9/2011 |
| EP | 2 365 378 | 9/2011 |
| EP | 1 776 242 | 10/2011 |
| EP | 2 384 902 | 11/2011 |
| EP | 2 450 735 | 5/2012 |
| EP | 2 461 203 | 6/2012 |
| EP | 2 608 161 | 6/2013 |
| EP | 2 660 070 | 11/2013 |
| EP | 2 708 371 | 3/2014 |
| EP | 2 727 742 | 5/2014 |
| EP | 2 853 411 | 4/2015 |
| EP | 2 860 042 | 4/2015 |
| EP | 2 886 356 | 6/2015 |
| EP | 2 365 376 | 10/2015 |
| EP | 2 400 338 | 12/2015 |
| EP | 3339048 | 6/2018 |
| JP | 5132540 | 1/2013 |
| JP | 2013-509312 | 3/2013 |
| JP | 2013-509314 | 3/2013 |
| KR | 10-2010-0052511 | 5/2010 |
| KR | 10-2012-0058726 | 6/2012 |
| KR | 10-1429755 | 8/2014 |
| KR | 10-2015-0077923 | 7/2015 |
| KR | 10-2014-0020961 | 11/2018 |
| RU | 2 514 589 C2 | 4/2014 |
| WO | WO 95/026916 | 10/1995 |
| WO | WO 98/015418 | 4/1998 |
| WO | WO 00/013916 | 3/2000 |
| WO | WO 01/070516 | 9/2001 |
| WO | WO 2005/106601 | 11/2005 |
| WO | WO 2006/013215 | 2/2006 |
| WO | WO 2006/125224 | 11/2006 |
| WO | WO 2007/020048 | 2/2007 |
| WO | WO 2007/056782 | 5/2007 |
| WO | WO 2007/079851 | 7/2007 |
| WO | WO 2007/131375 | 11/2007 |
| WO | WO 2008/008635 | 1/2008 |
| WO | WO 2009/126030 | 10/2009 |
| WO | WO 2011/051668 | 5/2011 |
| WO | WO 2011/051670 | 5/2011 |
| WO | WO 2011/066990 | 6/2011 |
| WO | WO 2011/116425 | 9/2011 |
| WO | WO 2012/027779 | 3/2012 |
| WO | WO 2012/048809 | 4/2012 |
| WO | WO 2012/048847 | 4/2012 |
| WO | WO 2012/055505 | 5/2012 |
| WO | WO 2012/055506 | 5/2012 |
| WO | WO 2012/055537 | 5/2012 |
| WO | WO 2012/055538 | 5/2012 |
| WO | WO 2012/084169 | 6/2012 |
| WO | WO 2012/084182 | 6/2012 |
| WO | WO 2013/007374 | 1/2013 |
| WO | WO 2013/055318 | 4/2013 |
| WO | WO 2013/079542 | 6/2013 |
| WO | WO 2013/091819 | 6/2013 |
| WO | WO 2014/024145 | 2/2014 |
| WO | WO 2014/044402 | 3/2014 |
| WO | WO 2014/060089 | 4/2014 |
| WO | WO 2014/060115 | 4/2014 |
| WO | WO 2014/065799 | 5/2014 |
| WO | WO 2014/095057 | 6/2014 |
| WO | WO 2014/174402 | 10/2014 |
| WO | WO 2015/011494 | 1/2015 |
| WO | WO 2015/078572 | 6/2015 |
| WO | WO 2015/078573 | 6/2015 |
| WO | WO 2016/065331 | 4/2016 |
| WO | WO 2017/011476 | 1/2017 |
| WO | WO 2017/184581 | 10/2017 |
| WO | WO 2019/077419 | 4/2019 |
| WO | WO 2020/214239 | 10/2020 |
| WO | WO 2022/077011 | 4/2022 |
| WO | WO 2022/077012 | 4/2022 |
| WO | WO 2022/087550 | 4/2022 |

OTHER PUBLICATIONS

"Diffuse reflection." Wikipedia, https://en.wikipedia.org/wiki/Diffuse_reflection, 5 pages, last edited Nov. 15, 2021.
Hecht, Eugene, "Optics", Third Edition, Addison-Wesley Publishing Company, Ch. 9.3.1, 1998, pp. 385-392.
"Insights into New OVDs", Presented by Dr. Mark Deakes at the Holography Conference, Nov. 2017, Barcelona, 38 pages.
"Korrelation." Wikipedia, https://de.wikipedia.org/wiki/Korrelation; see English Entry "Correlation." Wikipedia, https://en.wikipedia.org/wiki/Correlation, 21 pages, last edited Sep. 5, 2022.
"Light Waves—Reflection of light," BBC Bitesize, https://www.bbc.co.uk/bitesize/guides/z2bwtv4/revision/1#:~:text=If a surface is rough, 4 pages, 2022.
Lin et al., "Design and Fabrication of an Alternating Dielectric Multi-Layer Device for Surface Plasmon Resonance Sensor", Sensors and Actuators, B, 113, 2006, pp. 169-176.
"Positive and Negative Photoresist", <https://web.archive.org/web/20151017081844/http://www.ece.gatech.edu:80/research/labs/vc/theory/PosNegRes.html>, as archived Oct. 17, 2015 in 1 page.
"Specular Reflection." RP Photonics Encyclopedia, https://www.rp-photonics.com/specular_reflection.html, 4 pages, 2022.
"Specular and Diffuse Reflection: 13 Important Concepts," Lambda Geeks, https://lambdageeks.com/specular-and-diffuse-reflection/, 23 pages, 2022.
Yen, Eugene K. et al., "The Ineffectiveness of the Correlation Coefficient for Image Comparisons", http://lib-www.lanl.gov/la-pubs/00418797.pdf, LA-UR-96-2474, 13 pages.
Communication of a Notice of Opposition received in European Patent Application No. 16825055.3, dated Aug. 6, 2021.
Reply of the Patent Proprietor to the Notice of Opposition in European Patent Application No. 16825055.3, dated Jan. 3, 2022.
International Search Report and Written Opinion received in PCT Application No. PCT/US2015/057235, dated Feb. 23, 2016 in 12 pages.
International Preliminary Report on Patentability and Written Opinion received in PCT Application No. PCT/US2015/057235, dated May 4, 2017 in 10 pages.

(56) References Cited

OTHER PUBLICATIONS

International Search Report and Written Opinion received in PCT Application No. PCT/US2016/041935, dated Nov. 4, 2016 in 12 pages.
International Preliminary Report on Patentability and Written Opinion received in PCT Application No. PCT/US2016/041935, dated Jan. 25, 2018 in 9 pages.
International Search Report and Written Opinion received in PCT Application No. PCT/US2017/028094, dated Aug. 14, 2017 in 14 pages.
International Search Report and Written Opinion received in PCT Application No. PCT/IB2018/056296, dated Dec. 11, 2018 in 27 pages.
International Search Report and Written Opinion received in PCT Application No. PCT/US2020/018913, dated Jun. 16, 2020 in 10 pages.
International Search Report and Written Opinion received in PCT Application No. PCT/US2021/071246, dated Nov. 30, 2021 in 8 pages.
International Search Report and Written Opinion received in PCT Application No. PCT/US2021/071765, dated Jan. 26, 2022 in 10 pages.
International Search Report and Written Opinion received in PCT Application No. PCT/US2021/071763, dated Mar. 21, 2022 in 7 pages.
International Preliminary Report on Patentability and Written Opinion received in PCT Application No. PCT/US2017/028094, dated Nov. 1, 2018 in 11 pages.
International Preliminary Report on Patentability and Written Opinion received in PCT Application No. PCT/IB2018/056296, dated Apr. 21, 2020 in 24 pages.
International Preliminary Report on Patentability and Written Opinion received in PCT Application No. PCT/US2020/018913, dated Oct. 28, 2021 in 8 pages.
International Preliminary Report on Patentability and Written Opinion in PCT Application No. PCT/US2021/071246, dated Apr. 13, 2023, in 6 pages.
International Preliminary Report on Patentability and Written Opinion received in PCT Application No. PCT/US2021/071765, dated Mar. 28, 2023 in 8 pages.
International Preliminary Report on Patentability and Written Opinion received in PCT Application No. PCT/US2021/071763, dated Mar. 28, 2023 in 5 pages.
Decision Rejecting the Opposition in European Patent Application No. 16825055.3, dated Jul. 4, 2023.
Notice of Appeal in European Patent Application No. 16825055.3, filed Oct. 26, 2023.
Statement of Grounds of Appeal in European Patent Application No. 16825055.3, dated Jan. 9, 2024.
Reply to Appeal in European Patent Application No. 16825055.3, dated May 14, 2024.
Letter of the Opponent in European Patent Application No. 16825055.3, dated Jul. 8, 2024.

\* cited by examiner

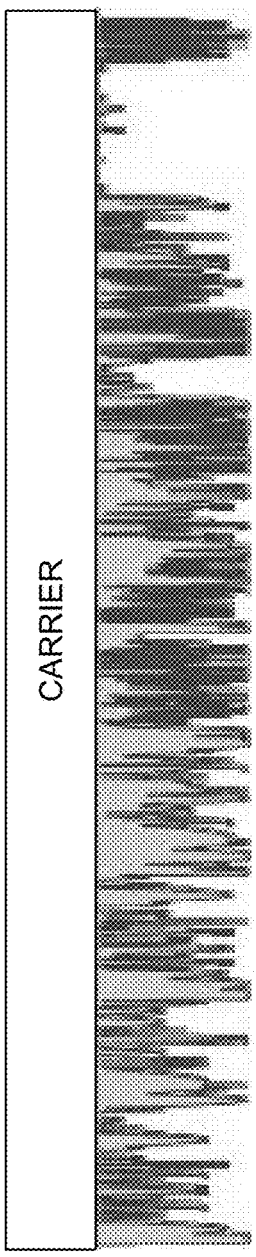
FIG. 1E-1a  100% Diffuse, 0% Specular
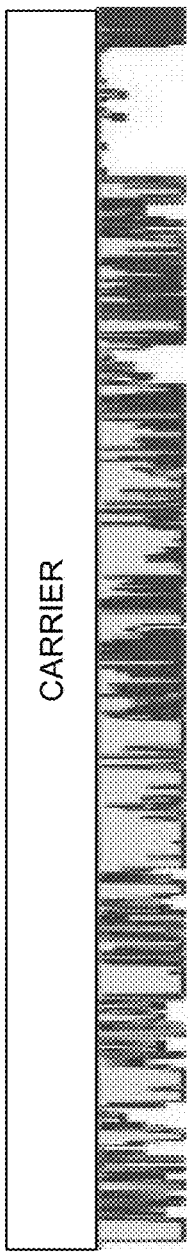
FIG. 1E-1b  70% Diffuse, 30% Specular
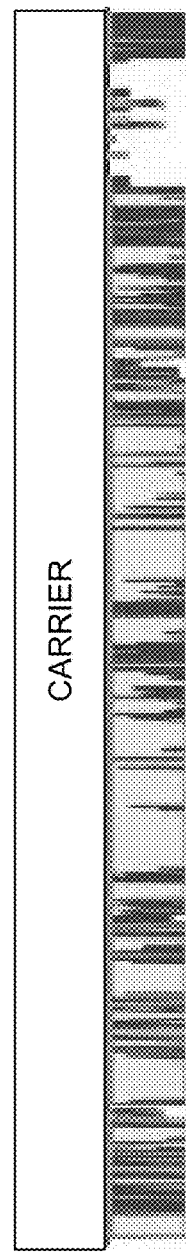
FIG. 1E-1c  40% Diffuse, 60% Specular
FIG. 1E-1d  0% Diffuse, 100% Specular
VARIABLE SPECULAR REFLECTION FROM A DIFFUSE SURFACE (DASHED LINE INDICATES REFLECTIVE COATING)

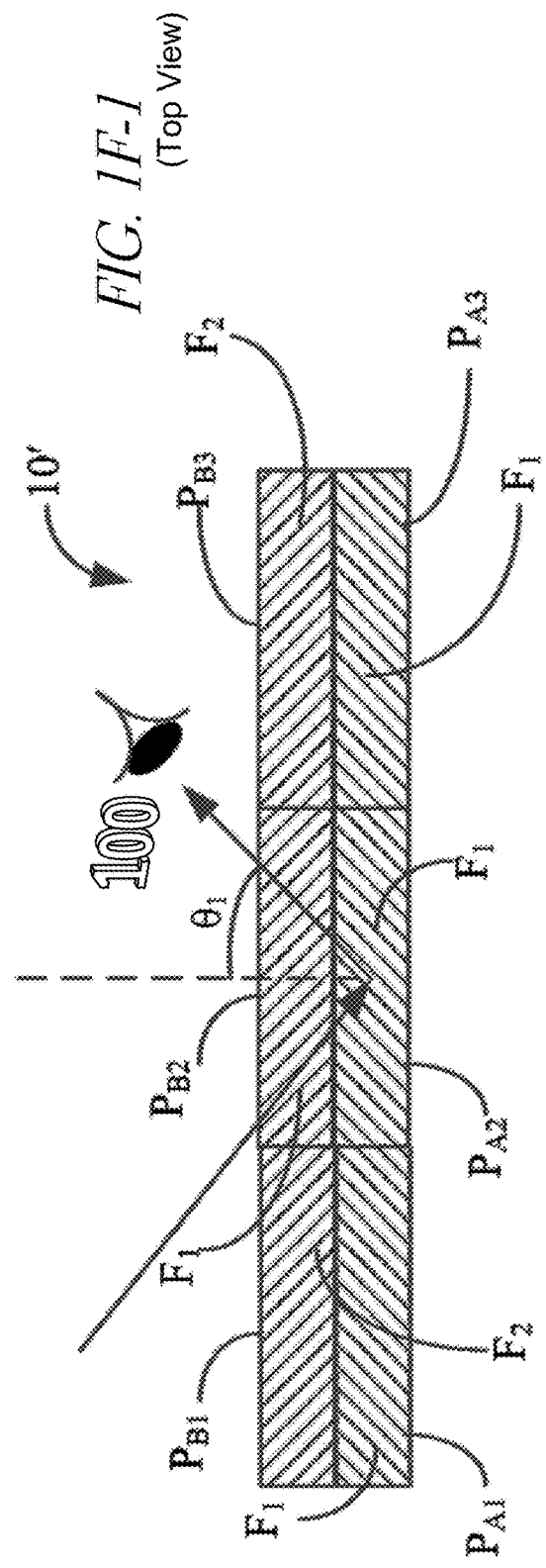
*FIG. 1F-1* (Top View)
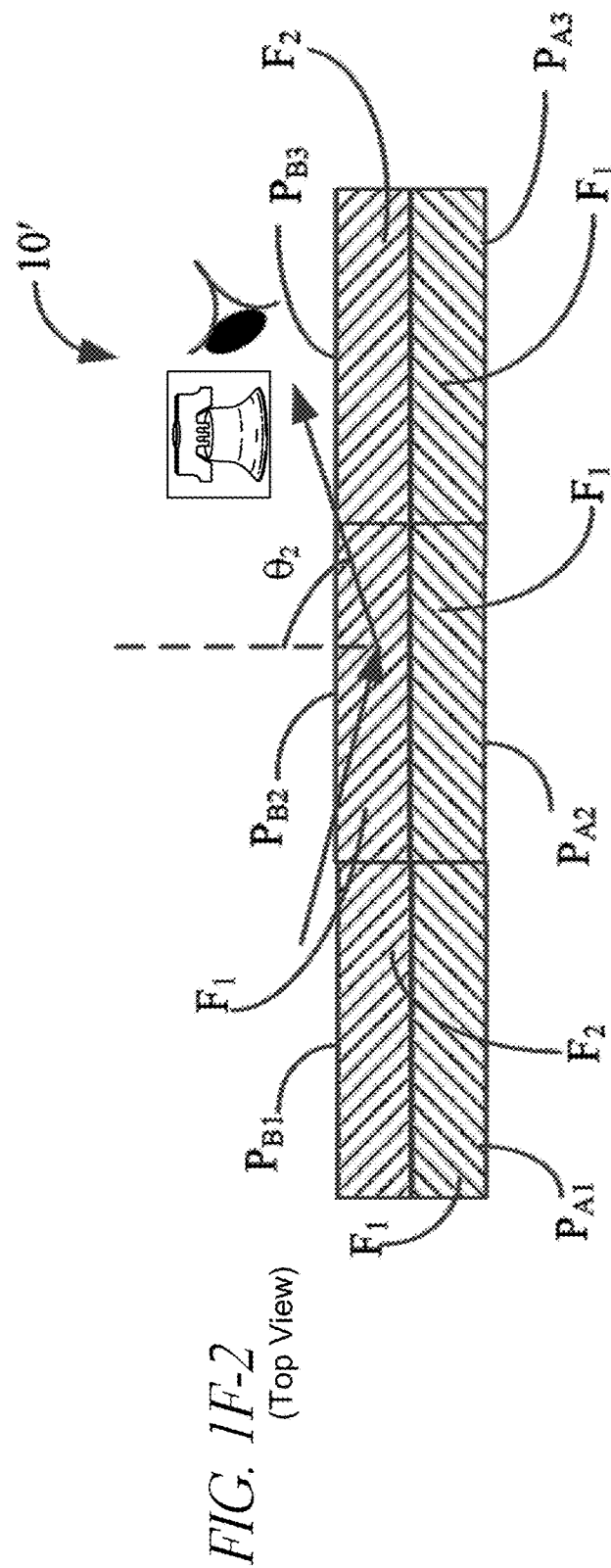
*FIG. 1F-2* (Top View)

*FIG. 1G-1*
(Top View)
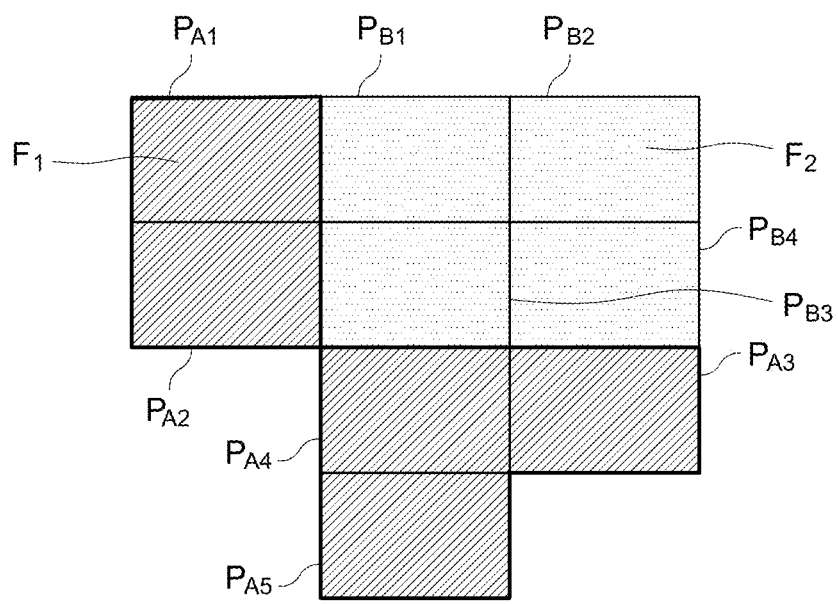
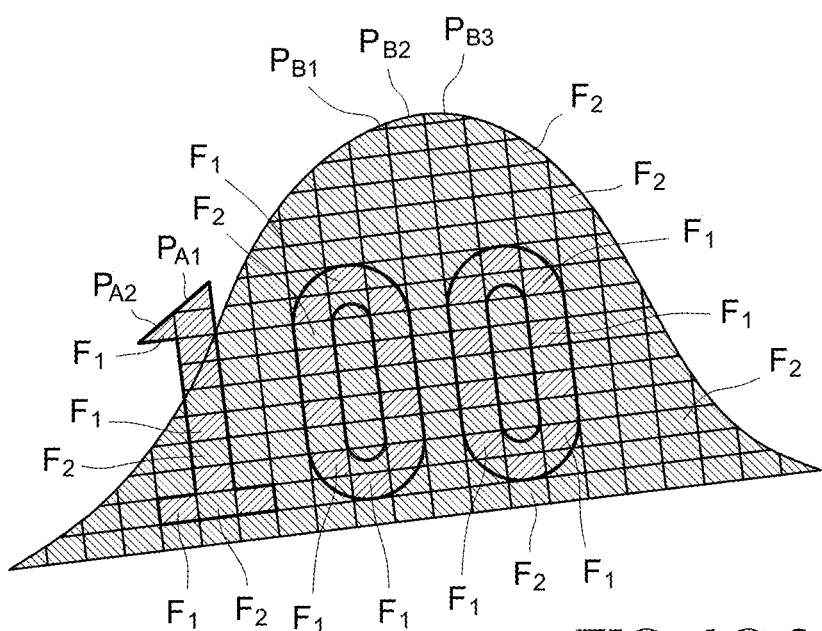
*FIG. 1G-2*
(Top View)

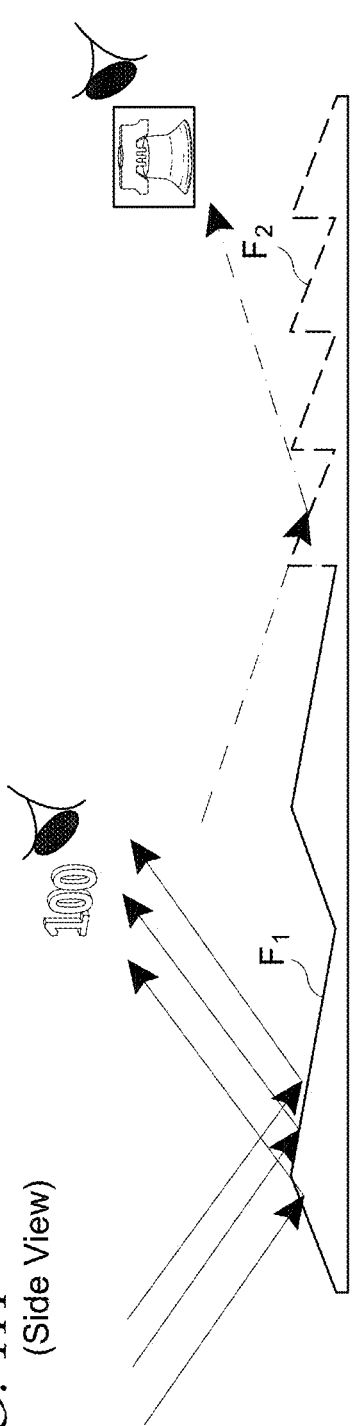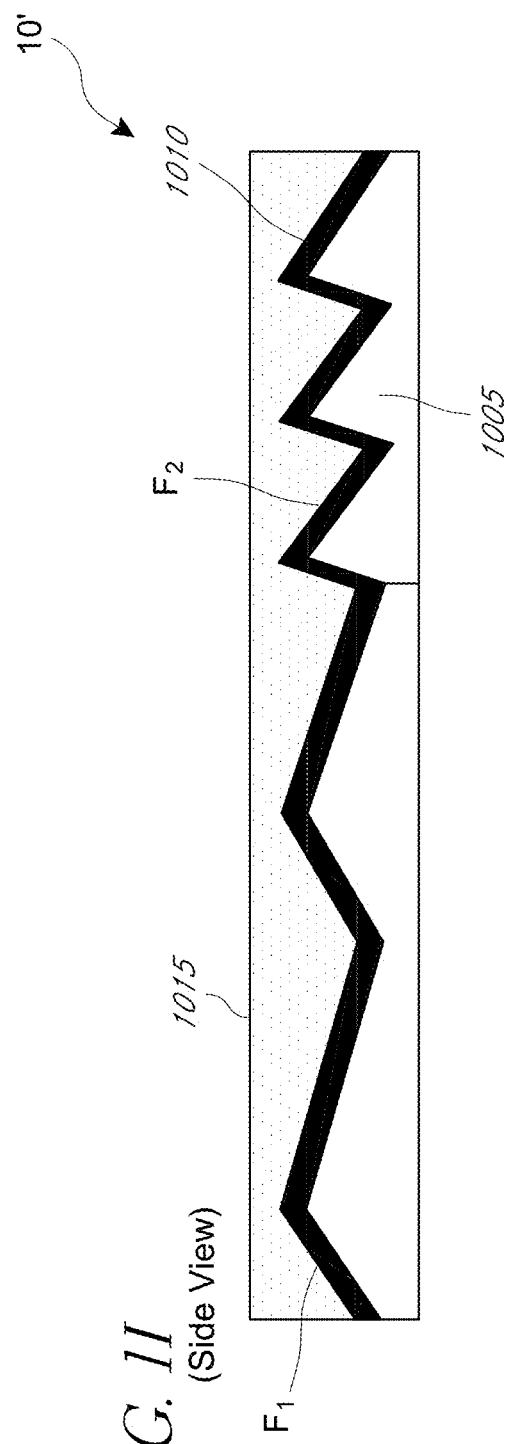
FIG. 1H (Side View)
FIG. 1I (Side View)

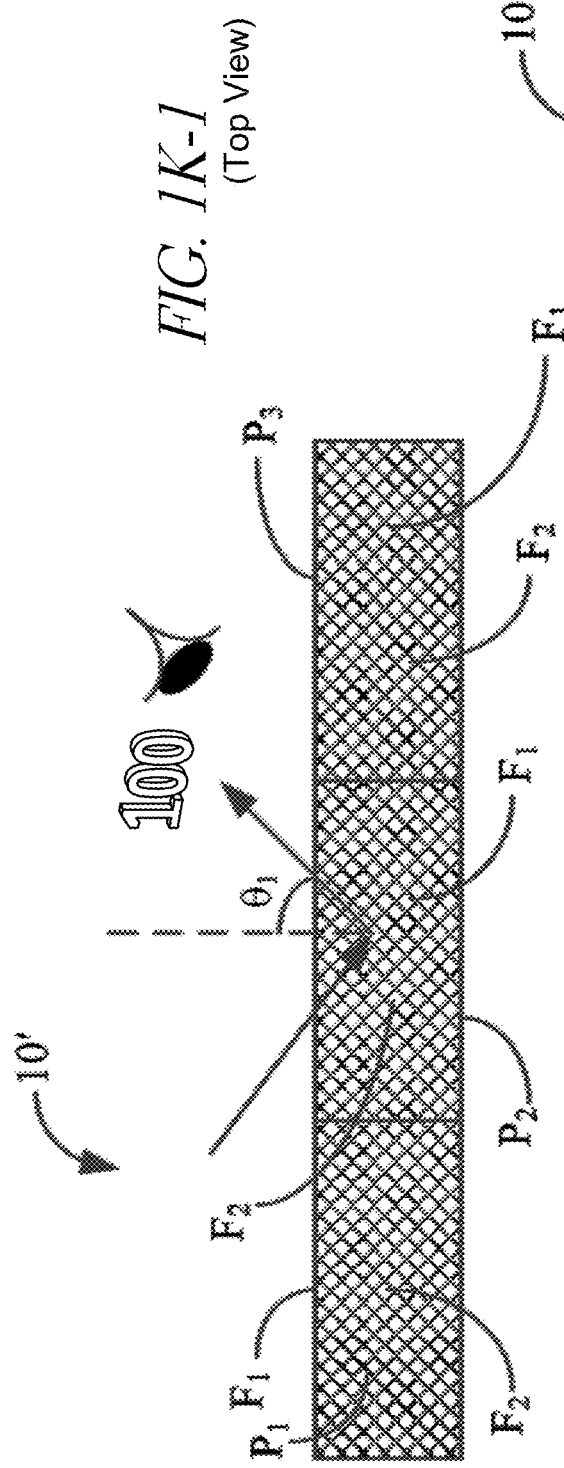
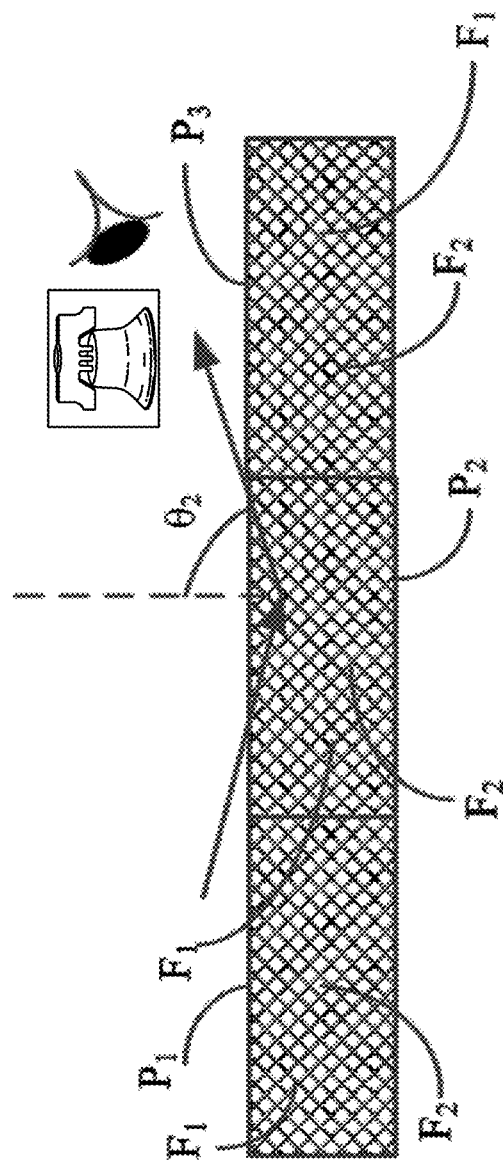

OPTICAL PRODUCTS, MASTERS FOR FABRICATING OPTICAL PRODUCTS, AND METHODS FOR MANUFACTURING MASTERS AND OPTICAL PRODUCTS

CROSS-REFERENCE TO RELATED APPLICATIONS

This application is a continuation of U.S. patent application Ser. No. 16/378,125, entitled "OPTICAL PRODUCTS, MASTERS FOR FABRICATING OPTICAL PRODUCTS, AND METHODS FOR MANUFACTURING MASTERS AND OPTICAL PRODUCTS," filed Apr. 8, 2019, which is a continuation of U.S. patent application Ser. No. 15/208,551, entitled "OPTICAL PRODUCTS, MASTERS FOR FABRICATING OPTICAL PRODUCTS, AND METHODS FOR MANUFACTURING MASTERS AND OPTICAL PRODUCTS," filed Jul. 12, 2016, which claims the benefit of priority to U.S. Provisional Application No. 62/192,052, entitled "OPTICAL PRODUCTS, MASTERS FOR FABRICATING OPTICAL PRODUCTS, AND METHODS FOR MANUFACTURING MASTERS AND OPTICAL PRODUCTS," filed Jul. 13, 2015, to U.S. Provisional Application No. 62/326,706, entitled "OPTICAL PRODUCTS, MASTERS FOR FABRICATING OPTICAL PRODUCTS, AND METHODS FOR MANUFACTURING MASTERS AND OPTICAL PRODUCTS," filed Apr. 22, 2016, to U.S. Provisional Application No. 62/328,606, entitled "OPTICAL PRODUCTS, MASTERS FOR FABRICATING OPTICAL PRODUCTS, AND METHODS FOR MANUFACTURING MASTERS AND OPTICAL PRODUCTS," filed Apr. 27, 2016, to U.S. Provisional Application No. 62/329,192, entitled "OPTICAL PRODUCTS, MASTERS FOR FABRICATING OPTICAL PRODUCTS, AND METHODS FOR MANUFACTURING MASTERS AND OPTICAL PRODUCTS," filed Apr. 28, 2016, and to U.S. Provisional Application No. 62/326,707, entitled "OPTICAL SWITCH DEVICES," filed Apr. 22, 2016. The entirety of each application referenced in this paragraph is incorporated herein by reference.

STATEMENT REGARDING FEDERALLY SPONSORED R&D

This invention was made with government support under Contract No. TEPS 14-02302 awarded by the Bureau of Engraving and Printing. The government has certain rights in the invention.

TECHNICAL FIELD

The present application generally relates to optical products, masters (e.g., master and/or daughter shims) for fabricating an optical product, and methods for manufacturing the masters and optical products. In particular, the optical product can be configured, when illuminated, to reproduce by reflected (or refracted) or transmitted light, one or more 3D images (e.g., one or more images that appear three-dimensional) of at least a part of one or more 3D objects.

DESCRIPTION OF THE RELATED TECHNOLOGY

Optical products can be used for a variety of purposes such as to reproduce a 3D image. Such products can be placed on decorative signs, labels, packaging, and consumer goods. Some optical products can be used as an anti-counterfeit feature, for example, on currency (e.g., a banknote). Holograms have traditionally been used as a counterfeit deterrent. However, this technology has become so widespread with hundreds if not thousands of holographic shops around the world that holograms are now viewed as having poor security. Optically variable inks and optically variable magnetic inks have also enjoyed for the past decade a high security place on banknotes. However, these products have now been simulated or have been even made from similar materials as the originals that these security elements are now being questioned as a high security feature. Motion type security elements have been adopted into banknotes, but even here, security has been compromised as this feature has also been used on commercial products. Thus, what is needed is a new security feature that the average person readily recognizes, has no resemblance to holograms or inks, is readily verified as to its authenticity, is difficult to counterfeit, is easily manufactured in quantity and can be readily incorporated into an item such as a banknote.

Manufacturing optical products, e.g., in relatively large quantities for commercial use, can utilize a master to fabricate the optical product. A master can be either a negative or positive master. For example, a negative master can form a surface of the optical product that is complementary to the surface of the master. As another example, a positive master can provide a surface for the optical product that is substantially similar to the surface of the master.

SUMMARY

Various embodiments described herein comprise a master for fabricating an optical product. The optical product can be configured, when illuminated, to reproduce by reflected light, a 3D image of at least a part of a 3D object. The master can comprise a first surface and a second surface opposite the first surface. The second surface can comprise a plurality of portions. Each portion can correspond to a point on a surface of the 3D object. Each portion can comprise features corresponding to non-holographic elements on the optical product. A gradient (e.g., slope) in the features can correlate to an inclination of the surface of the 3D object at the corresponding point. In addition, an orientation of the features can correlate to an orientation of the surface of the 3D object at the corresponding point.

Certain embodiments described herein also include an optical product configured, when illuminated, to reproduce by reflected light, a 3D image of at least a part of a 3D object. The optical product can comprise a first surface and a second surface opposite the first surface. The second surface can comprise a plurality of portions. Each portion can correspond to a point on a surface of the 3D object. Each portion can comprise non-holographic features configured to produce at least part of the 3D image of the 3D object without relying on diffraction. A gradient in the non-holographic features can correlate to an inclination of the surface of the 3D object at the corresponding point. In addition, an orientation of the non-holographic features can correlate to an orientation of the surface of the 3D object at the corresponding point.

Furthermore, various embodiments described herein include a method for manufacturing a master for fabricating an optical product. The optical product can be configured, when illuminated, to reproduce by reflected light, a 3D image of at least a part of a 3D object. The method can comprise providing a 2D data file configured to describe the 3D image. The data file can comprise a plurality of portions. Each portion can correspond to one or more points on a surface of the 3D object. Each portion can comprise features of intensity corresponding to non-holographic elements on the optical product. A gradient in intensity can correlate to an inclination of the surface of the 3D object at the one or more corresponding points. In addition, an orientation of the features can correlate to an orientation of the surface of the 3D object at the one or more corresponding points. The method can also comprise manufacturing the master based at least in part on the 2D data file.

Certain embodiments described herein of a master, optical product, and/or data file can also include one or more of the following (1) a majority of the plurality of portions comprising a single non-holographic feature, (2) a majority of the plurality of portions comprising one or more non-holographic features discontinuous with one or more non-holographic features in surrounding adjacent portions, (3) a majority of the plurality of portions comprising one or more non-holographic features having different orientations as one or more non-holographic features in surrounding adjacent portions, and/or (4) one or more non-holographic features comprising non-linear features when viewed in a cross-section. In some embodiments, each portion comprising one or more non-holographic features can be configured to produce at least part of the image without relying on diffraction (1) at a viewing angle at least between 20 degrees to 160 degrees relative to a plane of the optical product as the optical product is tilted and (2) at a viewing angle at least between 20 degrees to 90 degrees relative to the plane of the optical product as the optical product is rotated at least throughout the range of 90 degrees (rotated at least throughout the range of 180 degrees, rotated at least throughout the range of 270 degrees, or rotated at least throughout the range of 360 degrees) in the plane of the optical product.

In some embodiments, the size of the portion may assist in reducing iridescence or a change in color with change in angle of view or change in angle of illumination such as results when tilting the product with respect to the viewer and/or source of illumination. Accordingly, in various embodiments, the optical product does not exhibit a rainbow-like array of displayed colors where colors simultaneously appear in the order of a rainbow. Also, in some embodiments, the color of light emanating from the product does not appear to change when tilting the product or the viewer with respect to the product or the illumination with respect to the product, for example, in order of progressively increasing wavelength or in order of progressively decreasing wavelength (e.g., in progressive order of the arrangement of colors in the rainbow).

The size of the portion may be sufficiently large to produce light that can pass through a circular pupil 5 mm in diameter located 24 inches from the product that includes a plurality of colors that mix together to form white light. Accordingly, for a person viewing the product with their eye positioned 24 inches from the product and having a pupil of 5 mm in diameter, light from the product will enter the eye and be mixed together to form white light. The person thus does not see iridescence or change in color with change in angle of view or angle of illumination or tilt of the product. Other factor besides the size of the portion may contribute to this effect, even if the size of the portion is not sufficiently large on its own to cause this lack of iridescence. For example, not having multiple grating like features in a single portion may reduce this effect. Similarly, having a large number or percentage of portions that do not have multiple grating like features but instead have a single surface may contribute to reducing iridescence or change in color with angle. Additionally, having features with a curved surface within the portion may help counter the iridescent effect. The curved features may, for example, enhance mixing of different colors so that white light is sensed by the viewer. Even if multiple features are included in a portion, these features may be curved and this curvature may potentially reduce the iridescence. Also, the amount of portions that have features that are oriented differently from each other may be increased and the amount of portions that have a shift in phase or otherwise introduce a discontinuity may be increased, possibly resulting in increased mixing of color components and reducing this effect of diffractive spectral dispersion. However, the size of the portion may not be limited to produce light that can pass through a circular pupil 5 mm in diameter located 24 inches. For example, in some embodiments, a size of the portion can be 75 microns such that all the colors generated by the portion can be captured by a 4 mm pupil located at about 24 inches.

The embodiments disclosed herein can include articles including laminates, films, or layers including a plurality of optical features configured such that a viewer viewing the article from a first direction perceives a first set of distinct images and perceives a second set of distinct images when viewing the article from a second direction. At the first direction, the viewer does not perceive the second set of distinct images. At the second direction, the viewer does not perceive the first set of distinct images. There may be little to no overlap between the first and the second set of images. The first and the second set of images can include one or more patterns, one or more characters, one or more objects, one or more numbers, one or more graphics, and/or one or more letters. The laminates, films, or layers can be reflective or transmissive. In reflective embodiments, incident light reflected from the plurality of optical features can have varying levels of brightness based on the viewing direction which results in the perception of depth in the different distinct images. Without any loss of generality, in reflective embodiments the laminate, film or layer including optical features that can produce different distinct images when viewed from different directions can be tilted about an axis in the plane of the laminate, film or layer to flip between the first and the second set of distinct images. Without any loss of generality, in transmissive embodiments, the laminate, film or layer including optical features that can produce different distinct images when viewed from different directions can be rotated to flip between the first and the second set of distinct images viewable when light passes through the laminate, film or layer.

The embodiments disclosed herein can be advantageously manufactured on a large industrial scale. The laminates, films, or layers including optical features that can produce different distinct images when viewed from different directions can be manufactured on polymeric substrates, such as, for example, polyethylene terephthalate (PET), oriented polypropylene (OPP), low density polyethylene (LDPE), linear low density polyethylene (LLDPE), polypropylene (PP), polyvinyl chloride (PVC), polycarbonate (PC) or any other type of plastic film. In various embodiments, the polymeric substrate can be clear. The polymeric substrates can have a thickness less than or equal to 300 microns (e.g., less than or equal to 250 microns, less than or equal to 200 microns, less than or equal to 150 microns, less than or equal to 100 microns, less than or equal to 50 microns, less than or equal to 25 microns, less than or equal to 15 microns, etc.) and/or from 10 microns to 300 microns, or any range within this range (e.g., from 10 microns to 250 microns, from 12.5 microns to 250 microns, from 12.5 microns to 200 microns, from 10 microns to 25 microns, from 10 microns to 15 microns, etc.). Polymeric substrates including laminates, films, or layers comprising optical features that can produce different distinct images when viewed from different directions having such a thickness can be formed into security threads that can be incorporated into a banknote which has similar thickness.

The different distinct images can appear bright and can be seen under a variety of lighting conditions. The first and the second viewing directions can be oriented (e.g., tilted and/or rotated) with respect to each other by an angle from 10 degrees to 60 degrees. For example, in reflective embodiments different distinct non-overlapping images can be perceived when the laminate, film or layer including optical features that can produce different distinct images when viewed from different directions is tilted about an axis in the plane of the laminate, film or layer by an angle less than or equal to 20 degrees. As another example, in transmissive embodiments different distinct non-overlapping images can be perceived when the laminate, film or layer including optical features that can produce different distinct images when viewed from different directions is rotated about an axis perpendicular to the plane of the laminate, film or layer by an angle less than or equal to 45 degrees.

In reflective embodiments, the plurality of optical features that can produce different distinct images when viewed from different directions can be coated with a reflective material, such as, for example, aluminum, silver, copper or some other reflective metal. In embodiments where the plurality of optical features are coated with a reflective metal, the thickness of the reflective metal can be greater than or equal to 45 nm (e.g., 50 nm, 55 nm, 60 nm, etc.) and/or be in a range from 45 nm to 100 nm, or any range within this range (e.g., from 45 nm to 85 nm, from 45 nm to 75 nm, from 50 nm to 85 nm, etc.) such that the laminate, film or layer is opaque. Alternately, the thickness of the reflective metal can be less than 45 nm (e.g., 10 nm, 15 nm, 20 nm, 25 nm, etc.) and/or be in a range from 10 nm to 44.9 nm, or any range within this range (e.g., from 10 nm to 40 nm, from 10 nm to 35 nm, from 10 nm to 30 nm, etc.) such that the laminate, film or layer is semi-transparent.

The plurality of the optical features and/or the reflective material coating the plurality of the optical features can be covered with a protective coating (e.g., an organic resin coat) to protect the plurality of the optical features and/or the reflective material coating the plurality of the optical features from corrosion from acidic or basic solutions or organic solvents such as gasoline and ethyl acetate or butyl acetate.

The plurality of optical features can include relief features disposed on the surface of the polymeric substrate. In various embodiments, the plurality of optical features can include grooves or facets disposed on the surface of the polymeric substrate. In various embodiments, the orientation, slope/gradient and other physical attributes of the optical features can be determined from the images that are desired to be reproduced. The images can be in the form of a dot matrix or a 3D image. The laminates, films and layers including the plurality of optical features that can produce different distinct images when viewed from different directions can be integrated with one or more lenses (e.g., a curved lens or a Fresnel lens or an array of lenses such as a lenticular lens). In such embodiments, the focal length of the lens can be approximately equal to the thickness of polymeric substrate. In some embodiments, the optical features can be incorporated with one or more prisms or mirrors.

The laminates, film or layers including the plurality of optical features that can produce different distinct images when viewed from different directions can be manufactured using the systems and methods disclosed.

The disclosure provides an optical product comprising a first surface and a second surface opposite the first surface. The second surface is configured, when illuminated, to reproduce by reflected or transmitted light, a first 3D image of at least part of a first 3D object at a first angle of view, and a second 3D image of at least part of a second 3D object at a second angle of view. At the first viewing angle, the optical product does not reproduce the second 3D image, and at the second viewing angle, the optical product does not reproduce the first 3D image. The second surface comprises a first plurality of portions and a second plurality of portions. Each portion of the first plurality of portions corresponds to a point on a surface of the first 3D object, each portion comprising first non-holographic features configured to produce at least part of the first 3D image of the first 3D object without relying on diffraction. Each portion of the second plurality of portions corresponds to a point on a surface of the second 3D object, each portion comprising second non-holographic features configured to produce at least part of the second 3D image of the second 3D object without relying on diffraction.

In the optical product, a gradient in the first non-holographic features can correlate to an inclination of the surface of the first 3D object at the corresponding point, and an orientation of the first non-holographic features can correlate to an orientation of the surface of the first 3D object at the corresponding point. In the optical product, a gradient in the second non-holographic features can correlate to an inclination of the surface of the second 3D object at the corresponding point, and an orientation of the second non-holographic features can correlate to an orientation of the surface of the second 3D object at the corresponding point.

The optical product can comprise borders surrounding at least part of the portions of the first and second plurality of portions. In the optical product, some of the portions of the first and second plurality of portions can form a periodic array. The periodic array can include a striped, zigzagged, checkerboard, or houndstooth pattern.

In the optical product, the portions of the first and second plurality of portions can form an aperiodic array. In the optical product, the optical product when tilted in a direction from the first angle of view to the second angle of view, the first 3D image can appear to change to the second 3D image in a direction orthogonal to the direction from the first angle of view to the second angle of view.

In the optical product, the first or second non-holographic features can have a largest dimension between 1 μm and 35 μm. In the optical product, some of the portions of the first and second plurality of portions can comprise features discontinuous with features in surrounding adjacent portions. In the optical product, when viewed from a top or front view, the first or second features can comprise linear features corresponding to a substantially smooth region of the surface of the first or second 3D object respectively. When viewed from a top or front view, the first or second features can comprise non-linear features corresponding to a curved region of the surface of the first or second 3D object respectively.

In the optical product, the inclination of the surface of the first 3D object can comprise a polar angle from a first reference line of the first 3D object, and the orientation of the surface of the first 3D object can comprise an azimuth angle from a second reference line orthogonal to the first reference line of the first 3D object.

In the optical product, the inclination of the surface of the second 3D object can comprise a polar angle from a first reference line of the second 3D object, and the orientation of the surface of the second 3D object can comprise an azimuth angle from a second reference line orthogonal to the first reference line of the second 3D object.

In the optical product, the second surface can comprise a reflective surface. The second surface can comprise holographic features. The holographic features can be integrated into at least one of the portions of the first and second plurality of portions.

In the optical product, the first or second 3D object can comprise an irregularly shaped object. The first or second 3D object can comprise one or more alphanumeric characters. The second surface can further comprise additional features that when illuminated, do not reproduce a part of the first or second 3D object.

The optical product can be configured to provide authenticity verification on an item for security. The item can be currency, a credit card, a debit card, a passport, a driver's license, an identification card, a document, a tamper evident container or packaging, or a bottle of pharmaceuticals.

The disclosure further provides an optical product comprising an array of optical elements (e.g., lenses, prisms, or mirrors), a first plurality of portions, and a second plurality of portions. The first plurality of portions is disposed under the array of lenses, prisms, or mirrors. Individual ones of the first plurality of portions correspond to a point on a surface of a first 3D object and comprise first non-holographic features configured to produce at least part of a first 3D image of the first 3D object without relying on diffraction. The second plurality of portions is disposed under the array of lenses, prisms, or mirrors. Individual ones of the second plurality of portions correspond to a point on a surface of a second 3D object and comprise second non-holographic features configured to produce at least part of a second 3D image of the second 3D object without relying on diffraction. In the optical product, at a first viewing angle, the array of lenses, prisms, or mirrors presents the first 3D image for viewing without presenting the second 3D image for viewing, and at a second viewing angle different from the first viewing angle, the array of lenses, prisms, or mirrors presents for viewing the second 3D image without presenting the first 3D image for viewing.

In the optical product, the array of optical elements can comprise an array of lenses, an array of microlenses, an array of curved mirrors, or an array of prisms. The array of optical elements can comprise a 1D lenticular lens array. The array of optical elements can comprise a 2D microlens array. The array of optical elements can comprise an array of prisms. The array of optical lenses can comprise an array of mirrors with optical power.

In the optical product, a gradient in the first non-holographic features can correlate to an inclination of the surface of the first 3D object at the corresponding point, and an orientation of the first non-holographic features can correlate to an orientation of the surface of the first 3D object at the corresponding point.

In the optical product, a gradient in the second non-holographic features can correlate to an inclination of the surface of the second 3D object at the corresponding point, and an orientation of the second non-holographic features can correlate to an orientation of the surface of the second 3D object at the corresponding point.

In the optical product, some of the portions of the first and second plurality of portions can form a periodic array.

In the optical product, the inclination of the surface of the first 3D object can comprise a polar angle from a first reference line of the first 3D object, and the orientation of the surface of the first 3D object can comprise an azimuth angle from a second reference line orthogonal to the first reference line of the first 3D object.

In the optical product, the inclination of the surface of the second 3D object can comprise a polar angle from a first reference line of the second 3D object, and the orientation of the surface of the second 3D object can comprise an azimuth angle from a second reference line orthogonal to the first reference line of the second 3D object.

In the optical product, the first and second non-holographic features can comprise a reflective surface. In the optical product, the first or second 3D object can comprise an irregularly shaped object. The first or second 3D object can comprise one or more alphanumeric characters.

The optical products described herein can be configured to provide authenticity verification on an item for security. The item can be currency, a credit card, a debit card, a passport, a driver's license, an identification card, a document, a tamper evident container or packaging, or a bottle of pharmaceuticals. The optical product can be configured to be applied onto a lighting product, such as, for example, a light emitting diode (LED) based lighting system to control the LED based lighting system. The optical product can include portions and/or optical features which do not rely on phase information to generate an image of an object. The portions and/or optical features can be configured to be substantially achromatic. The optical product can include non-holographic features configured to produce images that are achromatic. For example, the non-holographic features can provide no diffractive or interference color (e.g., no wavelength dispersion or rainbows or rainbow effects). In some cases, the non-holographic features can be colored. For example, the non-holographic features can comprise a tint, an ink, dye, or pigment where absorption can provide color.

Various embodiments disclosed herein can be used for security documents, in particular, as security threads in bank notes or as a patch or as a window. Other security items such as passports, ID cards, chip cards, credit cards, stock certificates and other investment securities, vouchers, admission tickets and commercial packages that protect items of value such as CD's, medicinal drugs, car and aircraft parts, etc. may also be protected against counterfeiting using the concepts and embodiments described herein.

BRIEF DESCRIPTION OF THE DRAWINGS

FIGS. 1E-1a, 1E-1b, 1E-1c, and 1E-1d show an example of height modulation to vary the ratio of specular reflecting features to diffusing features in accordance with certain embodiments described herein.

FIG. 1E-2 schematically illustrates an example half-tone pattern and/or screen that can be used in certain embodiments described herein.

FIG. 1E-3 schematically illustrates another example half-tone pattern and/or screen that can be used in certain embodiments described herein.

FIG. 1E-4 schematically illustrates an example greyscale that can be used in certain embodiments described herein.

FIGS. 1F-1, 1F-2, 1G-1 and 1G-2 schematically illustrate top views of an optical product including a plurality of portions, each portion comprising a plurality of optical features that are configured to produce different distinct images when viewed from different directions.

FIG. 1H schematically illustrates an enlarged side view of a portion of an optical product including a plurality of optical features that are configured to produce different distinct images when viewed from different directions.

FIG. 1I schematically illustrates a side view of an embodiment of an optical product including a polymeric substrate comprising a plurality of optical features that are configured to produce different distinct images when viewed from different directions wherein the plurality of optical features are coated with a reflective material and a protective coating.

FIG. 1J-1 schematically illustrates an isometric view of an example optical product including an array of lenses disposed over a plurality of portions having optical features as described herein. The optical product is configured to present different distinct images when viewed from different directions.

FIG. 1J-2 schematically illustrates an isometric view of an example optical product including an array of prisms disposed over a plurality of portions having optical features as described herein. The optical product is configured to present different distinct images when viewed from different directions.

FIG. 1J-3 schematically illustrates a 1D lens array compatible with certain embodiments described herein.

FIG. 1J-4 schematically illustrates a 2D lens array compatible with certain embodiments described herein.

FIG. 1J-5 schematically illustrates a cross-sectional view of a product comprising a plurality of portions including optical features that are configured to produce one or more images, some of which can be viewed by a user at different view angles. FIG. 1J-6 illustrates a cross-sectional view of the product depicted in FIG. 1J-5 including a lenticular element. FIG. 1J-7 depicts a lenticular element disposed over a facet configured to specularly reflect incident light that is capable of magnifying the range of local surface normal.

FIG. 1J-8 illustrates an embodiment of an optical product that is configured to produce a first image viewable from a first direction and a second image viewable from a second direction. The first and the second image can correspond to right side-view and left side-view of an object.

FIG. 1J-9 illustrates a cross-sectional view of a product comprising a plurality of portions including optical features integrated with lenses, mirrors or prisms that are configured to produce different images that can be viewed by a user at different view angles. FIG. 1J-10 illustrates a bottom view of the product illustrated in FIG. 1J-9. FIG. 1J-11 illustrates a bottom view of another embodiment of the product.

FIGS. 1K-1 and 1K-2 schematically illustrate top views of an optical product including a plurality of portions, each portion comprising a plurality of optical features that are configured to produce different distinct images when viewed from different directions.

FIG. 2 illustrates an example method to manufacture a master for fabricating an optical product in accordance with certain embodiments described herein.

DETAILED DESCRIPTION

Figure 1A:
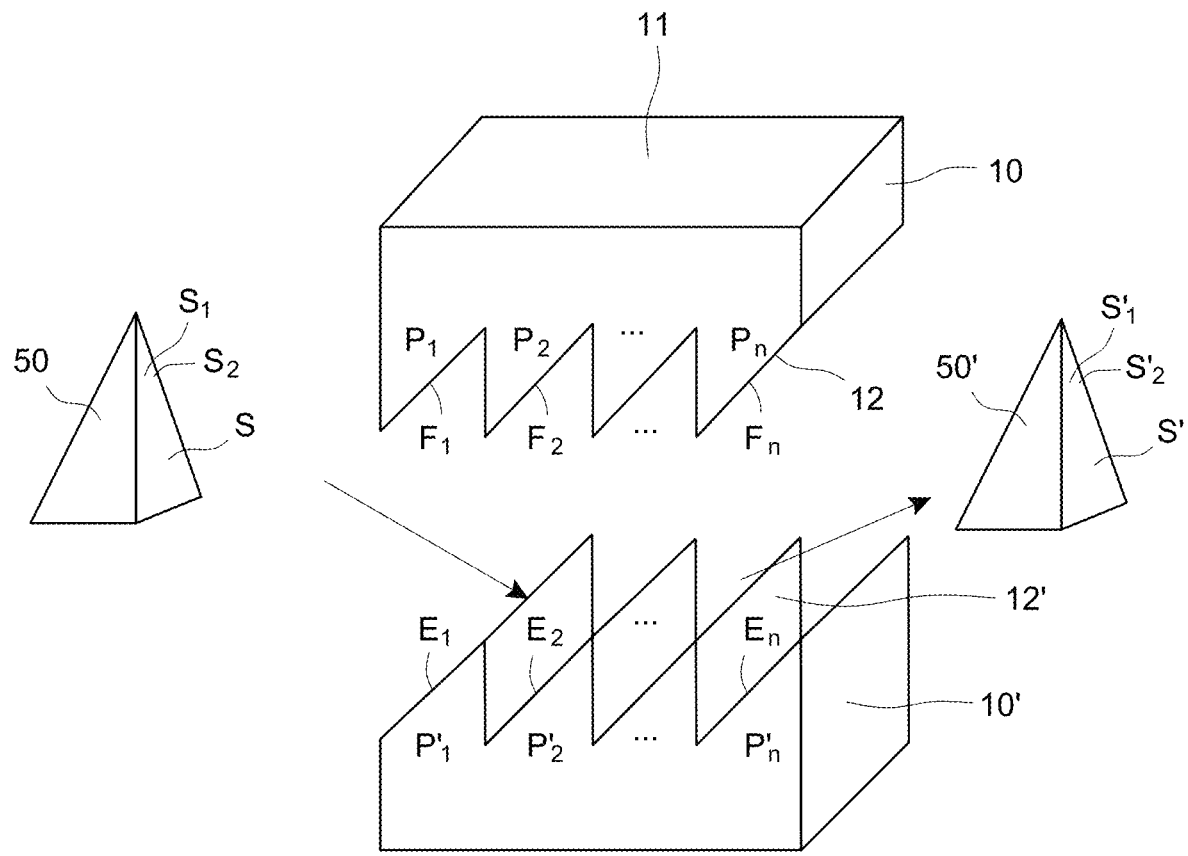
FIG. 1A schematically illustrates an example master and optical product in accordance with certain embodiments described herein.

In various embodiments, a master (e.g., a master and/or daughter shim) for fabricating an optical product is provided. The optical product, when illuminated, can reproduce an overt 3D image (e.g., an image that appears 3D to the naked eye) of a 3D object. Compared to ink printed images, the reflective surface of various embodiments of the optical product can produce a brighter mirror-like image produced by reflecting (or refracting) light incident on the surface. In certain such embodiments, the surface normals of the 3D object are mimicked as surface relief on the master and/or optical product. The surface relief on the master and/or optical product can be thinner than the 3D object, yet produce the same appearance of the 3D object. This property is similar to Fresnel lenses, where the surface relief allows a lens to be produced that is thinner than a comparable non-Fresnel lens. Unlike Fresnel lenses, however, certain embodiments disclosed herein are not limited in the type of 3D object that can be reproduced (e.g., linear and regularly shaped objects). As such, realistic and bright 3D images can be produced on relatively thin films (e.g., 30 µm and less in thickness, 25 µm and less in thickness, 15 µm and less in thickness, or any ranges in between these values). Thin films may be advantageous for different applications. In addition, special effects can be integrated into the image. In various embodiments described herein, the optical product can advantageously be used in applications for flexible packaging, brand identification, tamper evident containers, currency (e.g., a banknote), decoding messages, authenticity, and security, etc. Some security applications include incorporation of small detailed features, incorporation of non-symmetrical features, incorporation of machine readable features, etc.

In certain embodiments, the optical product can be incorporated into an item as an embedded feature, a hot stamp feature, a windowed thread feature, or a transparent window feature. For example, on an item such as a banknote, the optical product can be a patch, a window, or a thread. The optical product can have a thickness of less than 30 µm, less than 25 µm, or less than 15 µm. In various embodiments, the image can appear 3D by the naked eye.

In some embodiments, the image can be seen at a viewing angle between 20 degrees to 160 degrees, between 15 degrees to 165 degrees, between 10 degrees to 170 degrees, between 5 degrees to 175 degrees, or between 0 degrees to 180 degrees relative to the plane of the item (e.g., relative to the banknote plane) as the item is tilted. For example, the image can be viewable within one or more of these viewing angle ranges relative to the plane of the item.

In some embodiments, the image can be seen at a viewing angle between 20 degrees to 90 degrees, between 15 degrees to 90 degrees, between 10 degrees to 90 degrees, between 5 degrees to 90 degrees, or between 0 degrees to 90 degrees relative to the normal of the item as the item is rotated the normal of the item (e.g., in the plane of the item). For example, the image can be viewable and/or visible within one or more of these viewing angle ranges as the item is rotated (e.g., rotated at least throughout the range of 90 degrees, rotated at least throughout the range of 180 degrees, rotated at least throughout the range of 270 degrees, or rotated at least throughout the range of 360 degrees) about the normal of the item (e.g., in the plane of the item).

FIG. 1A schematically illustrates an example master 10 for fabricating an optical product 10' in accordance with certain embodiments described herein. In various embodiments, the master 10 can include a first surface 11 and a second surface 12 opposite the first surface 11. As shown in FIG. 1A, the second surface 12 can include a plurality of portions $P_1, P_2, \ldots P_n$. Each portion $P_n$ can correspond to a plurality of portions $P'_1, P'_2, \ldots P'_n$ on the optical product 10'. The plurality of portions $P'_1, P'_2, \ldots P'_n$ on the optical product 10' can also be referred to as a cell, pixel, or a tile. Each portion $P'_n$ can have a length between 7 μm and 100 μm, or any range within this range (e.g., between 7 μm and 50 μm, between 7 μm and 35 μm, between 12.5 μm and 100 μm, between 12.5 μm and 50 μm, between 12.5 μm and 35 μm, between 35 μm and 55 μm, between 40 μm and 50 μm, etc.). Each portion $P'_n$ can have a width between 7 μm and 100 μm, or any range within this range (e.g., between 7 μm and 50 μm, between 7 μm and 35 μm, between 12.5 μm and 100 μm, between 12.5 μm and 50 μm, between 12.5 μm and 35 μm, between 35 μm and 55 μm, between 40 μm and 50 μm, etc.). Accordingly, in various embodiments, the aspect ratio of each portion $P'_n$ can be 1:1 or 1:1.1.

Each portion $P_n$ of the master 10 (and each portion $P'_n$ of the optical product 10') can correspond to a point $S_1, S_2, \ldots S_n$ on a surface S of the 3D object 50. Each portion $P_n$ can include features $F_1, F_2, \ldots F_n$ corresponding to elements $E_1, E_2, \ldots E_n$, e.g., non-holographic elements, on the optical product 10'. A gradient (e.g., slope) in the features $F_1, F_2, \ldots F_n$ can correlate to an inclination (e.g., slope) of the surface S of the 3D object 50 at the corresponding point $S_1, S_2, \ldots S_n$. In addition, an orientation of the features $F_1, F_2, \ldots F_n$ can correlate to an orientation of the surface S of the 3D object 50 at the corresponding point $S_1, S_2, \ldots S_n$. Accordingly, with certain embodiments disclosed herein, an optical product 10' fabricated using the example master 10 can be configured, when illuminated, to reproduce by reflected (or refracted) light, a 3D image 50' (e.g., an image that appears 3D) of at least a part of a 3D object 50. The image can be observed by the naked eye and under various lighting conditions (e.g., specular, diffuse, and/or low light conditions).

The optical product 10' can be used on a variety of products to reproduce a 3D image 50' of at least a part of a 3D object 50. For example, the optical product 10' can be placed on decorative signs, advertisements, labels (e.g., self-adhesive labels), packaging (e.g., consumer paper board packaging and/or flexible packaging), consumer goods, collectible cards (e.g., baseball cards), etc. The optical product 10' can also be advantageously used for authenticity and security applications. For example, the optical product 10' can be placed on currency (e.g., a banknote), credit cards, debit cards, passports, driver's licenses, identification cards, documents, tamper evident containers and packaging, bottles of pharmaceuticals, etc.

In various implementations, the optical product 10' can be a reflective or transmissive device. For example, the optical product 10' can include reflective material (e.g., reflective metal such as aluminum, copper, or silver disposed on the plurality of elements $E_1, E_2, \ldots E_n$, or a transparent, relatively high refractive index material such as ZnS or $TiO_2$ disposed on the plurality of elements $E_1, E_2, \ldots E_n$ creating a semi-transmitting/partially reflective boundary). Depending on the thickness of the reflective material, the optical product 10' can be reflective or transmissive. Depending on the thickness of the reflective material, the optical product 10' can be partially reflective or partially transmissive. The thickness of the reflective material at which the optical product 10' is reflective or transmissive can depend on the chemical composition of the reflective material.

Accordingly, in some embodiments, the optical product 10' can include a reflective surface 12' from which light can reflect from the elements $E_1, E_2, \ldots E_n$ to reproduce the image 50' of the 3D object 50 or at least part of the 3D object 50. For example, the optical product 10' can be made of a reflective metal (e.g., aluminum, copper, or silver), a semi-transparent metal, or a material (e.g., polymer, ceramic, or glass) coated with a reflective metal. Reflective coatings that employ non-metallic material can also be employed.

In some embodiments where the elements $E_1, E_2, \ldots E_n$ are coated with a reflective metal, the thickness of the coating layer can be greater than or equal to 45 nm (e.g., 50 nm, 55 nm, 60 nm, etc.) and/or be in a range from 45 nm to 100 nm, or any range within this range (e.g., from 45 nm to 85 nm, from 45 nm to 75 nm, from 50 nm to 85 nm, etc.) such that the layer is opaque. Alternatively, the thickness of the reflective metal can be less than 45 nm (e.g., 10 nm, 15 nm, 20 nm, 25 nm, etc.) and/or be in a range from 10 nm to 44.9 nm, or any range within this range (e.g., from 10 nm to 40 nm, from 10 nm to 35 nm, from 10 nm to 30 nm, etc.) such that the layer is semi-transparent (e.g., 30% transparent, 40% transparent, 50% transparent, 60% transparent, 70% transparent, or any ranges inbetween these values, etc.). In reflective embodiments, the elements $E_1, E_2, \ldots E_n$ can reflect light towards or away from the observer's eye to reproduce the image 50' the 3D object 50. For example, the elements $E_1, E_2, \ldots E_n$ can reflect light towards the observer's eye in bright areas, and reflect light away from the observer's eye in dark areas. In some embodiments, the slopes of the elements $E_n$ can be configured to create the 3D depth perception of the image. For example, elements $E_n$ with less steep slopes can cause light to reflect toward the observer's eye creating more brightness, while elements $E_n$ with steeper slopes can cause light to reflect away from the observer's eye creating more darkness.

In some other embodiments (e.g., for a transmissive device), the optical product 10' can include a layer (e.g., a coating) of a transparent, relatively high refractive index material such as, for example, ZnS or $TiO_2$. In some such embodiments, light can transmit through the material and can also reflect at each of the elements $E_1, E_2, \ldots E_n$ due to the presence of the relatively high index layer which can create index mismatch and results in Fresnel reflection. The relatively high index material can be up to a full visible wavelength in thickness in some embodiments. If a color tint is used, the relatively high index material can be up to a ¼ of a visible wavelength in thickness in some embodiments.

Furthermore, the optical product 10' can include a protective covering, e.g., an organic resin, to protect the elements $E_1, E_2, \ldots E_n$ and/or any coating layer from corrosion from acidic or basic solutions or organic solvents such as gasoline and ethyl acetate or butyl acetate. In various implementations, the protective covering can also provide protection during subsequent processing steps and use of the optical product 10' (e.g., during the manufacturing of currency and/or by general handling by the public).

In various embodiments, the optical product 10' can be placed on or in another surface (e.g., as an embedded feature, a hot stamped feature such as a patch, a windowed thread feature, or a transparent window feature). In other embodiments, the optical product 10' can be placed under another surface (e.g., laminated under a film and/or cast cured). In some embodiments, the optical product 10' can be placed between two other surfaces (e.g., hot stamped on another surface and laminated under a film). Additional features associated with the optical product 10' will become apparent with the disclosure herein of the master 10 for fabricating the optical product 10'.

The image 50' of at least part of the 3D object 50 can be reproduced when the optical product 10' is illuminated. In various embodiments, the image 50' can be reproduced by a multitude of relatively small mirrors (e.g., each of the elements $E_1, E_2, \ldots E_n$ having both a length and width between 7 μm and 100 μm, or any range within this range (e.g., between 7 μm and 50 μm, between 7 μm and 35 μm, between 12.5 μm and 100 μm, between 12.5 μm and 50 μm, between 12.5 μm and 35 μm, between 35 μm and 55 μm, between 40 μm and 50 μm, etc.) which can be curved (e.g., have a freeform curvature) or planar. For example, in some embodiments, a reflective surface of the optical product 10' can provide a surface for specular reflection, such that the image 50' can be produced by the reflected light (e.g., like a mirror). Accordingly, various embodiments can produce a bright, high quality image. Some embodiments can also utilize techniques for producing diffuse reflection, e.g., for special or desired effects. Furthermore, the image 50' can be a substantially similar reproduction (e.g., with similar details), an approximate reproduction (e.g., with less details), and/or a scaled copy (e.g., scaled up or down in size) of the 3D object 50 or part of the 3D object 50.

In general, the 3D object 50 to be reproduced is not particularly limited and can advantageously include rotationally non-symmetrical and/or irregularly shaped objects, as well as symmetrical and/or regularly shaped objects. For example, the 3D object 50 can include one or more alphanumeric characters and/or symbols. For example, the 3D object 50 can include one or more text, one or more alphabetic characters, one or more numeric characters, one or more letters, one or more numbers, one or more symbols, one or more punctuation marks, one or more mathematical operators, etc. The 3D object 50 can also include one or more graphical images or logos, e.g., a company logo, a team logo, product branding designs, etc. Accordingly, the 3D object 50 can include irregularly shaped features in addition to planar and curved features. In some embodiments, the 3D object 50 can comprise animals, humans, plants or trees, landscapes, buildings, cars, boats, airplanes, bicycles, furniture, office equipment, sports equipment, foods, drinks, personal care items, flags, emblems, symbols like country, company or product symbols including trademarks, or parts thereof or groups or combination of these items with or without other items. The objects may be cartoon or artistic renditions. A wide range of other objects are possible.

As set forth herein, in various embodiments, the image 50' can be seen at various viewing angles (e.g., between 20 degrees to 160 degrees, between 15 degrees to 165 degrees, between 10 degrees to 170 degrees, between 5 degrees to 175 degrees, or between 0 degrees to 180 degrees relative to the plane of the item (e.g., relative to the banknote plane). For example, when the example optical product 10' is tilted, upon viewing the example optical product 10' at different viewing angles (or upon different angles of illumination), different sets of elements $E_1, E_2, \ldots E_n$ can be seen by the observer to provide the different images of the 3D object.

In some embodiments, the image can be seen at a viewing angle between 20 degrees to 90 degrees, between 15 degrees to 90 degrees, between 10 degrees to 90 degrees, between 5 degrees to 90 degrees, or between 0 degrees to 90 degrees relative to the normal of the item as the item is rotated about the normal of the item. For example, the image can be viewable within one or more of these viewing angle ranges as the item is rotated (e.g., rotated at least throughout the range of 90 degrees, rotated at least throughout the range of 180 degrees, rotated at least throughout the range of 270 degrees, or rotated at least throughout the range of 360 degrees) about the normal of the item.

Furthermore, in certain embodiments, the image 50' can be substantially without iridescence or change in color with angle. For example, in various embodiments, there are substantially no colors (e.g., rainbow effect), other diffractive colors, or ghosting effects in the image 50'. For example, in various embodiments, the optical product 10' does not provide a color change over an angular range around a viewing direction over the collection pupil having a size of 4.0 mm or 5.0 mm located at a distance of 24 inches. In some instances, the angular range is 2 degrees, 3 degrees, 4 degrees, 5 degrees, 6 degrees, 7 degrees, 10 degrees, 12 degrees, 15 degrees, 17 degrees, 20 degrees, 25 degrees, or any range between these values. The viewing direction can be from 0 and 90 degrees with respect to a normal to a surface of the product 10', or any range within this range (e.g., from 5 to 85 degrees, from 5 to 75 degrees, from 5 to 60 degrees, from 10 to 60 degrees, from 10 to 55 degrees, etc.).

As one example, in certain embodiments, the size of the portions $P'_1, P'_2, \ldots P'_n$ can have a length and width between 7 μm and 200 μm, or any range within this range (e.g., between 7 μm and 50 μm, between 7 μm and 35 μm, between 12.5 μm and 100 μm, between 12.5 μm and 50 μm, between 12.5 μm and 35 μm, between 35 μm and 55 μm, between 40 μm and 50 μm, between about 65 μm and 80 μm, between about 50 μm and 100 μm, between about 60 μm and 90 μm, between about 100 μm and 200 μm, etc.). In some such embodiments (e.g., between 40 μm and 50 μm), the portions $P'_n$ may be small enough such that the portions $P'_n$ are not resolvable by a human observer under normal viewing conditions (e.g., a reading distance of 18 to 24 inches between the eye and the item to be viewed). In addition, without being bound by theory, the portions $P'_n$ may be big enough such that the cone of light passing through the pupil (e.g., 4 mm or 5 mm in diameter) is small enough such that the eye may see a majority of the colors mixed as white light at a distance of 18-24 inches.

As another example, in some embodiments, a majority (e.g., greater than 50%, greater than 55%, greater than 60%, greater than 65%, greater than 70%, greater than 80%, greater than 90%, and any ranges in between these values) of the plurality of portions $P'_1, P'_2, \ldots P'_n$ on the optical product 10' can include a single non-holographic element $E_1$ (as opposed to a plurality of spaced apart non-holographic elements $E_n$ that may resemble a grating-like feature). Without being bound by theory, grating-like features can cause light to be dispersed with some of the light collected by the pupil of the eye. If the period of the grating-like feature is small enough, the light captured by the pupil may appear as a color. Accordingly, in various embodiments of the optical product 10' that have a majority of the plurality of portions $P'_1, P'_2, \ldots P'_n$ having not more than a single non-holographic reflective or refractive element $E_1$, unwanted color caused by grating-like features may possibly be substantially reduced and/or eliminated. Similarly, color change with angle of tilt can be reduced. In some embodiments, at least 20%, at least 30%, at least 40%, at least 50%, at least 60%, at least 70%, at least 80%, at least 90%, or any ranges in between these values) of the plurality of portions $P'_1, P'_2, \ldots P'_n$ on the optical product 10' can include a single non-holographic element $E_1$. In various embodiments, the single element may be slowly varying and/or substantially flat. In certain embodiments, the maximum average slope per portion with a single feature is less than ½, less than ⅓, less than ¼, less than ⅕, less than ⅙, potentially flat, and any ranges in between these values depending on feature height and width.

In addition, in portions $P'_n$ having a plurality of non-holographic elements $E_1, E_2, \ldots E_n$ (e.g., grating-like features), the elements $E_n$ can be discontinuous and/or have different orientation with non-holographic elements $E_1, E_2, \ldots E_n$ in surrounding adjacent portions $P'_n$. Without being bound by theory, the discontinuity and/or different orientations between grating-like features can cause a lateral shift of the grating-like feature. The lateral shift may cause the color spectrum to shift as well (e.g., from red to blue to green). The colors may combine on the retina providing an average white irradiance distribution. Accordingly, in embodiments of the optical product 10' that have a plurality of portions $P'_1, P'_2, \ldots P'_n$ including a plurality of non-holographic element $E_n$, unwanted color cause by grating-like features may possibly be substantially reduced and/or eliminated. Similarly, color change with angle of tilt can be reduced.

Accordingly, certain embodiments of the optical product 10' can utilize a certain portion $P'_n$ size, a single non-holographic element $E_1$ in a portion $P'_n$, discontinuous and/or differently orientated elements $E_n$ to produce images that may be substantially without iridescence or change in color with angle. The application of these features can be dependent on the image to be formed.

Various embodiments described herein can create a 3D image primarily by the reflection of light without relying on diffraction (e.g., without relying on holographic or grating diffraction). For example, various embodiments include the surface features disclosed herein that produce an image of a 3D object without relying on diffraction and/or phase information.

In other embodiments, the optical product 10' can include surfaces which additionally include features from which light can diffract, e.g., at surface defects, at discontinuities at borders, and/or via incorporation of diffractive or holographic elements. For example, such diffractive or holographic features can be combined with the surface features disclosed herein that produce an image of a 3D object using reflection (or possibly refraction, e.g., in transmission) without relying on diffraction.

In various embodiments, the master 10 can be either a negative or positive master. Whether as a negative or positive master, the method to produce the master 10 is not particularly limited. For example, the features $F_1, F_2, \ldots F_n$ on surface 12 of the master 10 can be produced using any technique known in the art or yet to be developed, including but not limited to photolithography (e.g., UV or visible light), electron beam lithography, and ion beam lithography to name a few. Additionally, the materials that can be used to manufacture the master 10 are not particularly limited and can include glasses, ceramics, polymers, metals, etc.

As a negative master, the master 10 can form a surface 12' of the optical product 10' that is complementary to the surface 12 of the master 10. For example, as shown in FIG. 1A, the features $F_1, F_2, \ldots F_n$ on the surface 12 of the master 10 can be the inverse of the elements $E_1, E_2, \ldots E_n$ on the surface 12' of the optical product 10'. In such embodiments, the master 10 can be used to form the optical product 10'. For example, the master 10 can be used to emboss the elements $E_1, E_2, \ldots E_n$ onto a metal sheet, a polymeric substrate such as a thermoformable polymer, or a UV curable photoresist layer such as a UV curable resin, or to injection mold the elements $E_1, E_2, \ldots E_n$ onto a polymer.

As another example, as a positive master, the master 10 can provide a surface 12' for the optical product 10' that is substantially similar to the surface 12 of the master 10. The features $F_1, F_2, \ldots F_n$ on the surface 12 of the master 10 can be substantially similar to the elements $E_1, E_2, \ldots E_n$ on the surface 12' of the optical product 10'. In some such embodiments, the positive master 10 can provide a model for the optical product 10'. In other such embodiments, the positive master 10 can be used to create an inverse image of the 3D object 50. In addition, the positive master 10 can be used to fabricate one or more negative masters.

Although the master 10 is shown producing a product directly, in certain embodiments the master 10 is employed to produce one or more other masters (e.g., daughter shims) or intermediate surfaces that can in turn be used to produce a product. For example a first negative master can be used to produce a second master that is a positive master. The second positive master can be used to make a third negative master. The third negative master can be used to produce a fourth positive master. The fourth positive master can be used to produce a product. Accordingly, a tooling tree of masters (e.g., four, five, six, etc. generations deep) can be produced.

Certain embodiments of the optical product 10' disclosed herein can be advantageously manufactured on a large industrial scale. Some embodiments can be manufactured by embossing the elements $E_1, E_2, \ldots E_n$ into an UltraViolet (UV) curable resin coated onto various polymeric substrates, such as, for example, polyethylene terephthalate (PET), oriented polypropylene (OPP), low density polyethylene (LDPE), linear low density polyethylene (LLDPE), polypropylene (PP), polyvinyl chloride (PVC), polycarbonate (PC) or any other type of plastic film or carrier. For thermoformable plastics such as PVC and PC, the elements $E_1, E_2, \ldots E_n$ can be embossed directly into the substrate without the UV curable layer. In various embodiments, the polymeric substrate can be clear. The polymeric substrates can have a thickness less than or equal to 300 microns (e.g., less than or equal to 250 microns, less than or equal to 200 microns, less than or equal to 150 microns, less than or equal to 100 microns, less than or equal to 50 microns, less than or equal to 25 microns, less than or equal to 15 microns, etc.). Some such polymeric substrates having elements $E_1, E_2, \ldots E_n$ can be formed into security threads that can be incorporated into a banknote having a paper thickness of 100 microns.

Figure 1B:
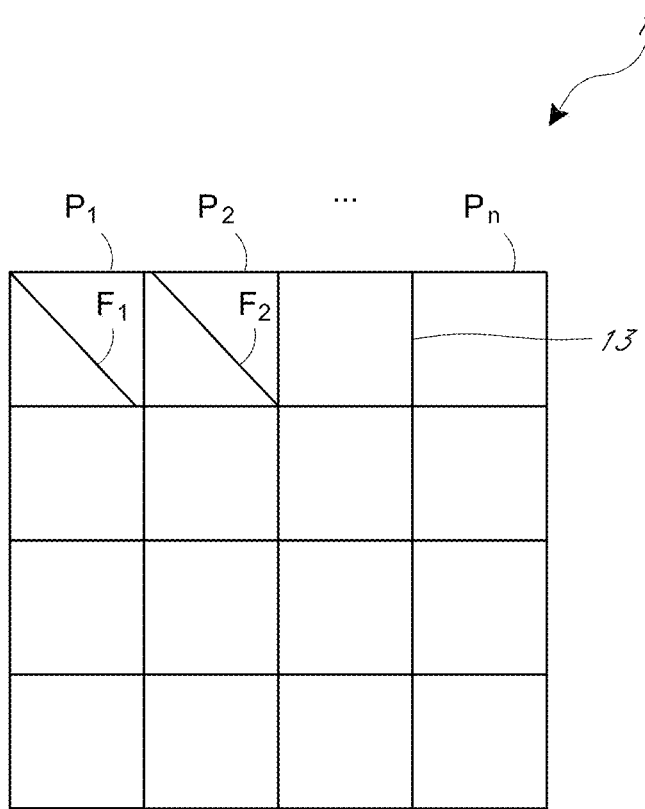
FIG. 1B schematically illustrates a top view of the surface of a master for fabricating an optical product in accordance with certain embodiments described herein.

With continued reference to FIG. 1A, the master 10 can include a first surface 11 and a second surface 12. The first surface 11 is shown for simplicity as a planar surface. However, the shape of the first surface 11 is not particularly limited. The second surface 12 can be opposite the first surface 11. The second surface 12 can include a plurality of portions $P_1, P_2, \ldots P_n$. In some embodiments, the plurality of portions $P_1, P_2, \ldots P_n$ can form a single cell (e.g., a mono-cell). In other embodiments, the plurality of portions $P_1, P_2, \ldots P_n$ can form a plurality of cells. For example, each of the plurality of portions $P_1, P_2, \ldots P_n$ can form a cell of the plurality of cells. The number of cells is not particularly limited and can depend on factors such as size and resolution of the image to be reproduced. In various embodiments, the portions $P_1, P_2, \ldots P_n$ can form a pixelated surface. For simplicity, only one row of portions $P_1, P_2, \ldots P_n$ is shown in FIG. 1A. However, certain embodiments can include additional rows and columns of portions $P_1, P_2, \ldots P_n$ For example, as shown in FIG. 1B, the portions $P_1, P_2, \ldots P_n$ can include a plurality of rows and columns spanning across the surface 12 of the master 10. For simplicity, only the first row is labeled as $P_1, P_2, \ldots P_n$. Futhermore, although FIG. 1B shows a 4×4 array of portions $P_1, P_2, \ldots P_n$, the numbers of rows, columns, and portions $P_1, P_2, \ldots P_n$ are not particularly limited.

As also shown in FIG. 1B, in some embodiments, borders 13 can surround at least part of the portions $P_1, P_2, \ldots P_n$ The borders 13 can substantially surround a portion $P_n$, or can surround just part of a portion $P_n$ In some embodiments, discontinuities can extend around all or substantially all of the portion $P_n$ In other embodiments, discontinuities may extend on just a part of the portion $P_n$ The borders 13 can help define the size and shape of the portions $P_1, P_2, \ldots P_n$ in some embodiments. However, the size and shape of the portions $P_1, P_2, \ldots P_n$ are not particularly limited. For example, some of the portions $P_1, P_2, \ldots P_n$ can comprise a symmetrical shape. For example, the symmetrical shape can include a rectangle, a square, a rhombus, an equilateral triangle, an isosceles triangle, a regular polygon (e.g., a regular pentagon, a regular hexagon, a regular octagon, etc.), to name a few. The symmetrical shape can also include curvature, e.g., a circle, an ellipse, etc. In other embodiments, some of the portions $P_1, P_2, \ldots P_n$ can comprise a non-symmetrical shape, e.g., a non-rotationally symmetrical shape, and/or an irregular shape. In some embodiments, some of the portions $P_1, P_2, \ldots P_n$ can have a shape that is substantially the same as other portions $P_1, P_2, \ldots P_n$ In some embodiments, at least 20%, at least 30%, at least 40%, at least 50%, at least 60%, at least 70%, at least 80%, at least 90% (or any range in between these percentages) of the portions $P_1, P_2, \ldots P_n$ can have the same shape, size, or both. In other embodiments, some of the portions $P_1, P_2, \ldots P_n$ can have a shape that is different from other portions $P_1, P_2, \ldots P_n$.

Arrangement of the portions $P_1, P_2, \ldots P_n$ is not particularly limited. For example, whether with or without borders, whether symmetrically shaped or non-symmetrically shaped, or whether regularly or irregularly shaped, the portions $P_1, P_2, \ldots P_n$ can form a periodic array. In other embodiments, whether with or without borders, whether symmetrically shaped or non-symmetrically shaped, or whether regularly or irregularly shaped, the portions $P_1, P_2, \ldots P_n$ can form an aperiodic array. In yet other embodiments, the portions $P_1, P_2, \ldots P_n$ can form a combination of periodic and aperiodic arrays.

With continued reference to FIG. 1A, each portion $P_n$ can correspond to a point $S_1, S_2, \ldots S_n$ on the surface S of the 3D object 50, and each portion $P_n$ can include one or more features $F_1, F_2, \ldots F_n$. For simplicity, the features $F_1, F_2, \ldots F_n$ shown in FIG. 1A appear linear and substantially similar to each other. However, the features $F_1, F_2, \ldots F_n$ can vary in number, size, shape, and orientation.

In certain embodiments, the features $F_1, F_2, \ldots F_n$ can include linear and/or curved features, for example as seen from a top or front view. In some embodiments, the features $F_1, F_2, \ldots F_n$ can include facets, such as linear or curved saw tooth shaped features. The size of the features $F_1, F_2, \ldots F_n$ are not particularly limited. However, from a manufacturing and economic perspective, in some embodiments, a smaller height (e.g., 0 μm to 10 μm) can be advantageous to reduce the amount of material used. Accordingly, in some embodiments, the heights of the features $F_1, F_2, \ldots F_n$ can be from close to 0 μm to 0.1 μm (e.g., 0 nm to 100 nm, 1 nm to 75 nm, or 1 nm to 50 nm), from close to 0 μm to 1 μm (e.g., 0 nm to 1000 nm, or 1 nm to 500 nm), from close to 0 μm to 5 μm (e.g., 1 nm to 5 μm, 10 nm to 5 μm, 50 nm to 5 μm, 75 nm to 5 μm, 0.1 μm to 5 μm, 0.5 μm to 5 μm, or 1 μm to 5 μm), or from close to 0 μm to 8 μm (e.g., 1 nm to 8 μm, 10 nm to 8 μm, 50 nm to 8 μm, 75 nm to 8 μm, 0.1 nm to 8 μm, 0.5 μm to 8 μm, or 1 μm to 8 μm), or from close to 0 μm to 10 μm (e.g., 1 nm to 10 μm, 10 nm to 10 μm, 50 nm to 10 μm, 75 nm to 10 μm, 0.1 μm to 10 μm, 0.5 μm to 10 μm, or 1 μm to 10 μm). In other embodiments, the heights of the features $F_1, F_2, \ldots F_n$ can go up to 15 μm, up to 20 μm, up to 25 μm, or any ranges from 1 μm, 2 μm, or 3 μm up to 25 μm. In yet other embodiments, the heights of the features $F_1, F_2, \ldots F_n$ can go up to 50 μm if needed, e.g., depending on the desired size of the 3D image to be reproduced.

Furthermore, in some embodiments, the lateral dimensions of the features $F_1, F_2, \ldots F_n$ are not particularly limited, but can depend on the details of the 3D object. For example, for text, the lateral dimensions of the features $F_1, F_2, \ldots F_n$ can be less than 1 μm. Accordingly, the lateral dimensions of the features $F_1, F_2, \ldots F_n$ can be from close to 0 μm to 0.1 μm (e.g., 0 nm to 100 nm, 1 nm to 75 nm, or 1 nm to 50 nm), from close to 0 μm to 1 μm (e.g., 0 nm to 1000 nm, or 1 nm to 500 nm), from close to 0 μm to 5 μm (e.g., 1 nm to 5 μm, 10 nm to 5 μm, 50 nm to 5 μm, 75 nm to 5 μm, 0.1 μm to 5 μm, 0.5 μm to 5 μm, or 1 μm to 5 μm), or from close to 0 μm to 8 μm (e.g., 1 nm to 8 μm, 10 nm to 8 μm, 50 nm to 8 μm, 75 nm to 8 μm, 0.1 nm to 8 μm, 0.5 nm to 8 μm, or 1 μm to 8 μm), or from close to 0 μm to 10 μm (e.g., 1 nm to 10 μm, 10 nm to 10 μm, 50 nm to 10 μm, 75 nm to 10 μm, 0.1 nm to 10 μm, 0.5 nm to 10 μm, or 1 nm to 10 μm).

In various embodiments, a lateral distance between two features can be defined in some embodiments as a pitch. In some embodiments, the pitch between features within a portion $P_n$ can be substantially the same within the portion $P_n$. For example, in various embodiments, in portion $P_1$ of the portions $P_1, P_2, \ldots P_n$, the feature $F_1$ can comprise a plurality of features that form a periodic array such that the pitch is substantially the same within portion $P_1$. In addition, in some embodiments, the features $F_1, F_2, \ldots F_n$ among the multiple portions $P_1, P_2, \ldots P_n$, can form a periodic array such that the pitch is substantially the same among the portions $P_1, P_2, \ldots P_n$ In other embodiments, the features could be chirped and form an aperiodic array such that the pitch may be different among multiple portions $P_1, P_2, \ldots P_n$. However, although the pitch may be different for different portions $P_1, P_2, \ldots P_n$, the pitch can be slowly varying (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance) among the portions $P_1, P_2, \ldots P_n$. In some embodiments, the pitch may uniformly change across multiple portions $P_1, P_2, \ldots P_n$. In other embodiments, the features could be chirped within a portion $P_n$ such that the pitch may be different within the portion $P_n$. In some such embodiments, the pitch within the portion $P_n$ may slowly vary (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance). In some embodiments, the pitch may uniformly change with the portion $P_n$. The pitch in certain embodiments can be between 1 μm and 100 μm, between 1 μm and 75 μm, between 1 μm and 50 μm, or between 1 μm and 25 μm.

Figure 1C:
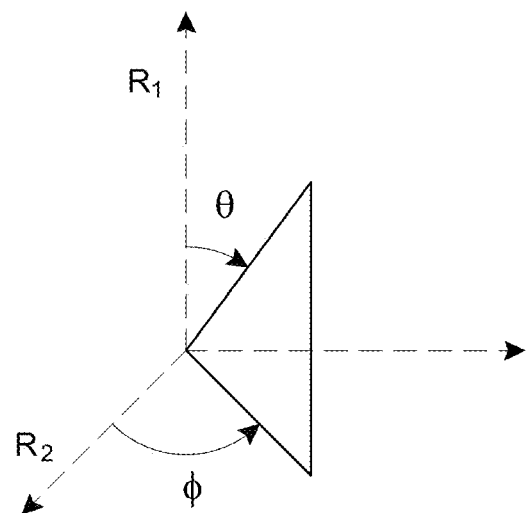
FIG. 1C schematically illustrates the inclination and orientation of a surface of a 3D object at a point on the surface.

With continued reference to FIG. 1A, the features $F_1, F_2, \ldots F_n$ can correspond to elements $E_1, E_2, \ldots E_n$ on the optical product 10', and since the optical product 10' is configured to reproduce the 3D object 50, aspects of the features $F_1, F_2, \ldots F_n$ can correlate to aspects of the surface S of the 3D object 50 at the corresponding point $S_1, S_2, \ldots S_n$. For example, a gradient (e.g., slope) in the features $F_1, F_2, \ldots F_n$ can correlate to an inclination of the surface S of the 3D object 50 at the corresponding point $S_1, S_2, \ldots S_n$. For example, in various embodiments, each feature can include a slope. A slope of the feature $F_1$ can correlate to the inclination of the surface S of the 3D object 50 at the corresponding point $S_1$. As shown in FIG. 1C, the slope of the feature $F_1$ can correlate to the polar angle $\theta_1$ from reference line $R_1$ of the 3D object 50. Accordingly, the slopes of the features $F_1, F_2, \ldots F_n$ can mimic the surface normals of the 3D object 50.

Various embodiments can advantageously have a uniform gradient (e.g., uniform slope) within each portion $P_n$ such that the gradient is a single value (e.g., a single polar angle $\theta_n$) at the corresponding point $S_n$ on the surface S of the 3D object 50. In other embodiments, the feature $F_n$ within a portion $P_n$ includes a plurality of features, and the features within the portion $P_n$ may have more than one gradient (e.g., different slopes). In such embodiments, the average gradient (e.g., average slope) of the features within the portion $P_n$ can correlate to the inclination of the surface S of the 3D object 50 at the corresponding point $S_n$.

In some embodiments, varying the slopes within and/or among portions $P_1, P_2, \ldots P_n$ can create contrast on the surface and therefore, on the image 50'. Furthermore, varying at least one of the height of features, pitch between features (e.g., lateral distance between two features), and slope of the features in one or more portions $P_1, P_2, \ldots P_n$ can be used in authenticity and security applications. For example, one can intentionally vary the pitch within one or more portions $P_n$, but maintain the given slopes. The image 50' of the 3D object 50 would be reproduced, yet upon closer inspection of the presence of the intentional variation within one or more portions $P_1, P_2, \ldots P_n$, authenticity can be verified. Other variations are possible.

In various embodiments, the orientation of features $F_1, F_2, \ldots F_n$ can correlate to an orientation of the surface S of the 3D object 50 at the corresponding point $S_1, S_2, \ldots S_n$. For example, an orientation of the feature $F_1$ can correlate to the orientation of the surface S of the 3D object 50 at the corresponding point $S_1$. As shown in FIG. 1C, the orientation of the feature $F_1$ can correlate to the azimuth angle $\varphi_1$ from reference line $R_2$ of the 3D object 50. Various embodiments can advantageously have a uniform orientation within each portion $P_n$, such that the orientation is a single value (e.g., a single azimuth angle $\varphi_n$) at the corresponding point $S_n$ on the surface S of the 3D object 50. In other embodiments, the feature $F_n$ within a portion $P_n$ includes a plurality of features, and the features within the portion $P_n$ may have more than one orientation (e.g., different orientations). In such embodiments, the average orientation of the features within the portion $P_n$ can correlate to the orientation of the surface S of the 3D object 50 at the corresponding point $S_n$. Furthermore, the orientation of the features within and among the portions $P_1, P_2, \ldots P_n$, can slowly vary (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance) within and among the portions $P_1, P_2, \ldots P_n$.

In some embodiments, where a feature $F_1$ includes multiple features within a portion, the features can appear discontinuous with other features within the portion. In some embodiments where the surface 12 of the master 10 is pixelated (e.g., having a plurality of cells), the features $F_1, F_2, \ldots F_n$ can appear discontinuous with features in surrounding adjacent portions. In other embodiments, the portions $P_1, P_2, \ldots P_n$ can form a single cell or a mono-cell. In some such embodiments, the features $F_1, F_2, \ldots F_n$ can appear continuous and smoothly varying depending on the shape. In other such embodiments, the features $F_1, F_2, \ldots F_n$ can appear discontinuous due to discontinuities in the 3D object 50.

In some embodiments, the features $F_1, F_2, \ldots F_n$ can comprise linear features corresponding to a substantially smooth region of the surface S of the 3D object 50. The features $F_1, F_2, \ldots F_n$ can also comprise non-linear features, e.g., curved features as seen from a top or front view, corresponding to a curved region of the surface S of the 3D object 50, e.g., instead of flat facets. In some embodiments, features $F_1, F_2, \ldots F_n$ that are linear can be used to correspond to a curved region of the surface S of the 3D object 50. In some such embodiments, linear features on a master 10 can be used to represent a curved region by using a piecewise approximation function (e.g., a piecewise linear function such as a function comprising straight line sections). In some other embodiments, features $F_1, F_2, \ldots F_n$ that are non-linear can be used to correspond to a substantially smooth region of the surface S of the 3D object 50. In some such embodiments, non-linear features on a master 10 can be used to represent smooth regions on the surface S of the 3D object because the features $F_1, F_2, \ldots F_n$ can correspond to relatively small sized features on the optical product 10'. For example, the pitch and/or texture on the optical product 10' can be from 1 μm to 100 μm, or any range within this range (e.g., from 1 μm to 75 μm, from 1 μm to 50 μm, from 1 μm to 25 μm, etc.).

With continued reference to FIG. 1A, as described herein, the features $F_1, F_2, \ldots F_n$ can correspond to aspects of the surface S of the 3D object 50 and can also correspond to elements $E_1, E_2, \ldots E_n$ on the optical product 10' such that the optical product 10' can reproduce an image 50' of the 3D object 50. In various embodiments, the elements $E_1, E_2, \ldots E_n$ on the optical product 10' can be non-holographic. For example, the elements $E_1, E_2, \ldots E_n$ do not need to rely on holography (e.g., effects based on diffraction and/or based on optical interference) to render a 3D image 50' of the 3D object 50. In some such embodiments, the features $F_1, F_2, \ldots F_n$ on the surface 12 of the master 10 can include non-sinusoidal features or non-quasi-sinusoidal features. In general, sinusoidal or quasi-sinusoidal features can be diffractive with +/− orders of equal intensity that generate a twin image. One positive order and one negative order can share the incident light and result in a simultaneous twin image with counter-intuitive movement of one image with respect to the other. Such effects may be non-ideal. In some embodiments that include non-sinusoidal or non-quasi-sinusoidal features, the features $F_1, F_2, \ldots F_n$ on the surface 12 of the master 10 can include other shapes, such as saw toothed shapes as described herein.

Although various embodiments described herein do not necessarily rely on holography to reproduce an image, some embodiments can include diffractive or holographic features (e.g., less than or equal to 50% of the surface area, less than or equal to 40% of the surface area, less than or equal to 30% of the surface area, less than or equal to 20% of the surface area, less than or equal to 10% of the surface area, less than or equal to 5% of the surface area, less than or equal to 3% of the surface area, less than or equal to 2% of the surface area, or less than or equal to 1% of the surface area, or any range defined by any of these values) to be used in conjunction with the non-holographic elements $E_1, E_2, \ldots E_n$ described herein. For example, in some embodiments, the second surface 12 of the master 10 can further comprise features corresponding to holographic elements on the optical product 10' in one or more portions $P_1, P_2, \ldots P_n$. In other embodiments, a holographic layer can be added over or under the surface 12' of the optical product 10'.

Figure 1D:
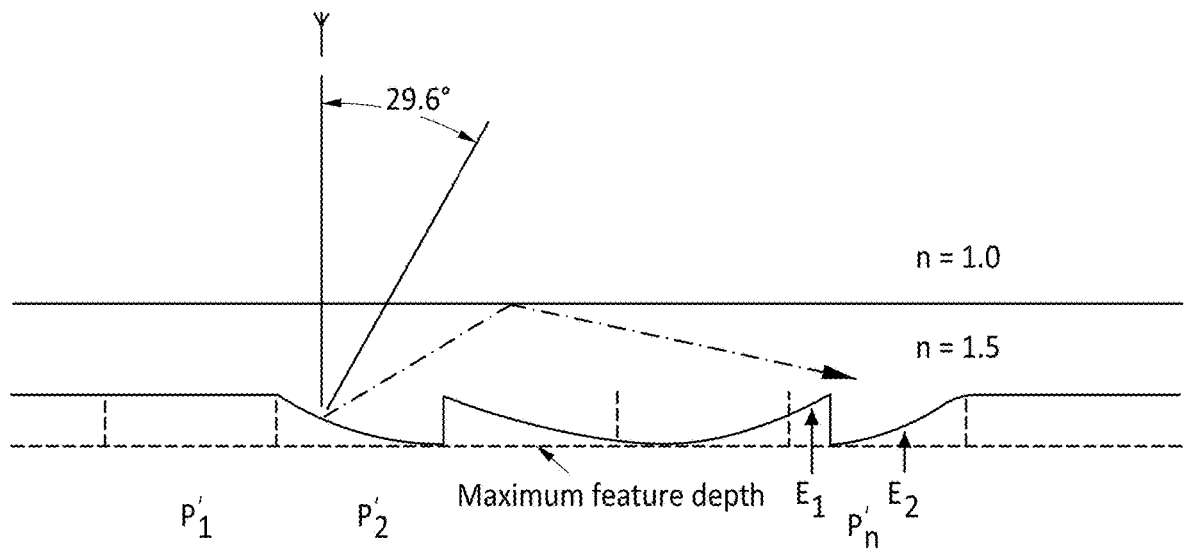
FIG. 1D is another example optical product 10' in accordance with certain embodiments described herein.

FIG. 1D is another example optical product 10' in accordance with certain embodiments described herein. As shown in FIG. 1D, the optical product 10' can include a plurality of portions $P'_1, P'_2, \ldots P'_n$. Each portion $P'_n$ can include elements $E_1, E_2, \ldots E_n$, e.g., non-holographic elements, on the optical product 10'. In some such embodiments, the elements $E_1, E_2, \ldots E_n$ can be embossed on the bottom surface of the substrate, e.g. UV curable resin having a refractive index of 1.5. The elements $E_1, E_2, \ldots E_n$ can be coated with a reflective coating. The elements $E_1, E_2, \ldots E_n$ may then be embedded between the substrate and the item to which the optical product 10' is attached. As described herein, the slopes of the elements $E_1, E_2, \ldots E_n$ can be configured to create the 3D depth perception of the image. For example, elements $E_1, E_2, \ldots E_n$ with less steep slopes can cause light to reflect toward the observer's eye creating more brightness, while elements $E_1, E_2, \ldots E_n$ with steeper slopes can cause light to reflect away from the observer's eye creating more darkness. In this example of an embedded optical product 10', elements $E_1, E_2, \ldots E_n$ with steep enough slopes can cause light to be totally internally reflected within the substrate (which has a higher index than the surrounding medium), and creating even more darkness.

Figure 1E:
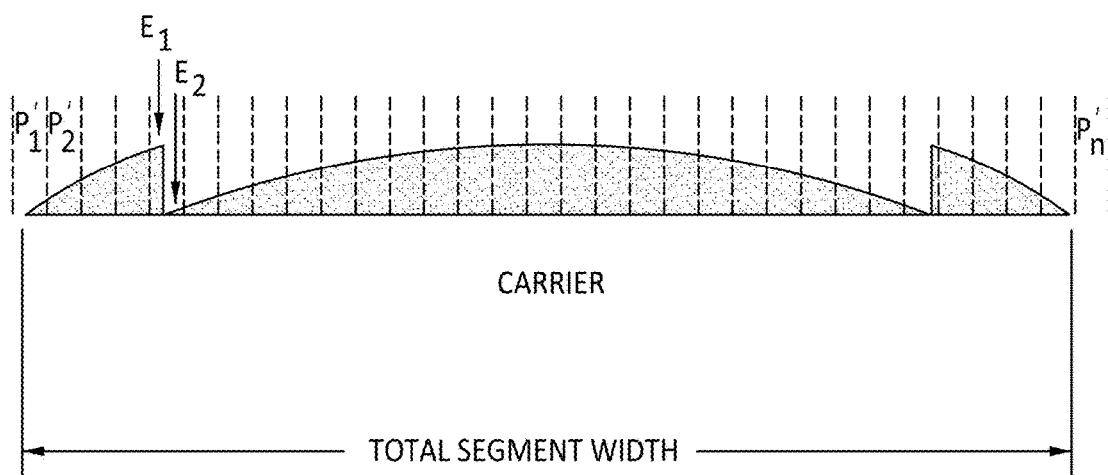
FIG. 1E is another example optical product 10' in accordance with certain embodiments described herein.

FIG. 1E is another example optical product 10' in accordance with certain embodiments described herein. As shown in FIG. 1E, the optical product 10' can include a plurality of portions $P'_1, P'_2, \ldots P'_n$. Each portion $P'_n$ can include elements $E_1, E_2, \ldots E_n$, e.g., non-holographic elements, on the optical product 10'. As described herein, utilizing embodiments of the optical product 10' having elements $E_1, E_2, \ldots E_n$ (or masters having features $F_1, F_2, \ldots F_n$) with smaller height can be advantageous to reduce the amount of material used. However in cases where height is less important, certain embodiments can utilize elements $E_1, E_2, \ldots E_n$ with slowly varying surfaces (e.g., slopes) creating a substantially contiguous surface from one portion $P'_n$ to another. In various embodiments, the number of substantially contiguous portions can include at least two, three, four, five, eight, ten, fifteen, twenty, or more, or be in any range in between these values.

Referring to FIG. 1A, certain embodiments of a master 10 are configured to fabricate an optical product 10'. The optical product 10' can be configured, when illuminated, to reproduce (e.g., by reflected or transmitted light) a 3D image 50' of at least a part of a 3D object 50. The master 10 or optical product 10' can include features $F_1, F_2, \ldots F_n$ or elements $E_1, E_2, \ldots E_n$ In various embodiments, such features $F_1, F_2, \ldots F_n$ or elements $E_1, E_2, \ldots E_n$ (collectively referred to herein as optical features $F_1, F_2, \ldots F_n$ for simplicity) can include specular reflecting features and diffusing features that can provide greyscale in the 3D image 50'. The specular reflecting and diffusing features can be provided by a diffuser coated with a reflective material.

In various embodiments, the diffuser can include a micro diffuser (e.g., a tailored micro diffuser). Some such diffusers can be fabricated from polymer materials for example, polyethylene terephthalate (PET), oriented polypropylene (OPP), low density polyethylene (LDPE), linear low density polyethylene (LLDPE), polypropylene (PP), polyvinyl chloride (PVC), polycarbonate (PC), etc. The polymer materials can have a pseudo-random distribution or a tailored distribution of diffusing features. The diffuser can be coating with a reflective material such as aluminum, silver, gold, copper, titanium, zinc, tin, or alloys thereof (e.g., bronze).

In some embodiments, the diffuser has a surface that can receive incident light rays, and can break up an incident ray angle into many angles with a random or a tailored distribution over a wide angle. The shape of the scattered light angular distribution (e.g., Bi-Directional Reflectance Distribution Function or BRDF) can be dependent upon the incident angle and the surface characteristics. In various embodiments, the surface of the diffuser may not completely scatter the light. For example, some such surfaces can have diffusing features (e.g., features that can scatter light) and specular reflecting features (e.g., features that do not scatter light).

Certain embodiments of an optical product 10' can utilize specular reflecting features and diffusing features to vary the brightness (or darkness, e.g., greyness) in a 3D image. Various embodiments utilizing such variation can result in enhanced contrast in the image compared to embodiments not utilizing specular reflecting features and diffusing features. As described herein, the slopes of optical features $F_1, F_2, \ldots F_n$ in various portions $P_1, P_2, \ldots P_n$ can create depth perception and contrast in a 3D image as described herein. For example, less steep slopes can cause light to reflect toward the observer's eye, while steeper slopes can cause light to reflect away from the observer's eyes. In certain embodiments, optical features $F_1, F_2, \ldots F_n$ having specular reflecting features and diffusing features can provide additional contrast in the 3D image. In some such embodiments, macro features (e.g., $F_1, F_2, \ldots F_n$) and micro features (e.g., specular reflecting features and diffusing features) can be integrated together.

In various embodiments, the amount of specular reflecting features and diffusing features can be varied in the various portions $P_1, P_2, \ldots P_n$ to control the brightness (or the darkness, e.g., greyness) of an image. For example, the brightness (or darkness, e.g. greyness) as perceived by a viewer of an area can be modulated by the ratio of specular reflecting features to diffusing features. For example, the brightness (or darkness, e.g. greyness) as perceived by a viewer of an area within a portion can be modulated by the ratio of the area (e.g., area of the footprint) of specular reflecting features to the area (e.g., area of the footprint) of the diffusing features. The size, number, and/or distribution of the specular reflecting features relative to the size, number, and/or distribution of the diffuse reflecting features in an area within a portion can likewise be configured to provide the level of brightness, darkness, (e.g., greyness). The images produced can be achromatic. For example, the specular reflecting features and diffusing features can provide no diffractive or interference color (e.g., no wavelength dispersion or rainbows or rainbow effects). Pigment, inks, or other absorptive material can be used to provide color, in which case the relative areas, size, number, and/or distribution of the specular reflecting features relative to that of the diffuse reflecting features would control the perceived brightness or darkness of the hue or color.

In various embodiments, the level of brightness, darkness (e.g., greyness) can be provided by the size and/or number of the specular reflecting features relative to the size and/or number of the diffusing features. As an example, the size and/or number of the specular reflecting and diffusing features can be based on a height and/or width of a top surface (e.g., a flat top surface) of the specular reflecting and diffusing features. Such sizes and/or number can be provided by height (and/or depth) modulation as will be discussed in relation to FIGS. 1E-1a, 1E-1b, 1E-1c, and 1E-1d.

FIGS. 1E-1a, 1E-1b, 1E-1c, and 1E-1d show an example of height modulation to vary the ratio of specular reflecting features to diffusing features in accordance with various embodiments described herein. FIG. 1E-1a schematically illustrates a cross section of a surface having 100% diffusing features and 0% specular reflecting features. In this example, the distribution of the surface feature heights or widths (or a combination thereof) is random. As shown in FIG. 1E-1b, if the top of the surface (e.g., on the side opposite of the carrier) were to be "flattened," then the flat portion of the surface can act as a specular surface resulting in additional specular reflecting features (e.g., 30%) and a reduced amount of diffusing features (e.g., 70%). If more of the surface is "flattened," as shown in FIG. 1E-1c, then less of the surface can act as a diffuse surface resulting is more specular reflecting features (e.g., 60%) and less diffusing features (e.g., 40%). FIG. 1E-1d schematically illustrates a surface having 0% diffusing features and 100% specular reflecting features. The dashed line indicates a reflective coating. Thus, as shown in FIGS. 1E-1a, 1E-1b, 1E-1c, and 1E-1d, by flattening more or less of the surface height, the ratio between specular reflecting features and diffusing features can be modulated. The ratio between such features can correlate to a level of grey or brightness/darkness of hue if colored (e.g., including a tint, an ink, dye, or pigment where absorption can provide color). Utilizing a different ratio between such features in various portions $P_1, P_2, \ldots P_n$ of certain embodiments can produce varying levels of grey or brightness/darkness in the produced image. Thus, by controlling the amount of flattening corresponding to the grey level of a black and white image (or brightness/darkness of hue if colored), certain embodiments can reproduce a black and white image including many shades of grey (or many levels of brightness/darkness of hue if colored).

In various embodiments, the shape of the specular reflecting features and diffusing features, for example, in the area (e.g., area of the footprint) may be square, rectangular, hexagonal, circular, or a wide variety of other shapes. Similarly the specular reflecting features and diffusing features may be packed together in a wide variety of arrangements, e.g., in a square array, triangular array, hexagonally closed packed, or in other arrangements.

Figures 1, 1E, 2:
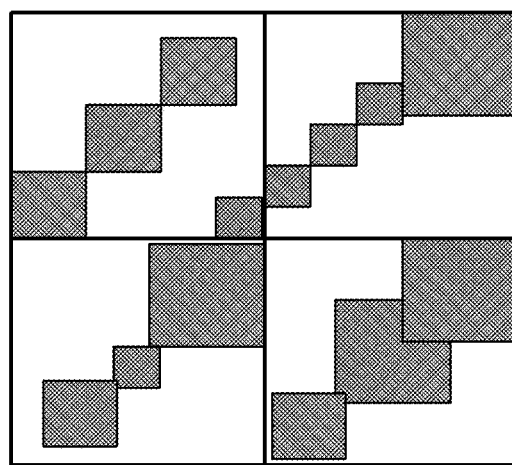
Figures 1, 1E, 2, 3:
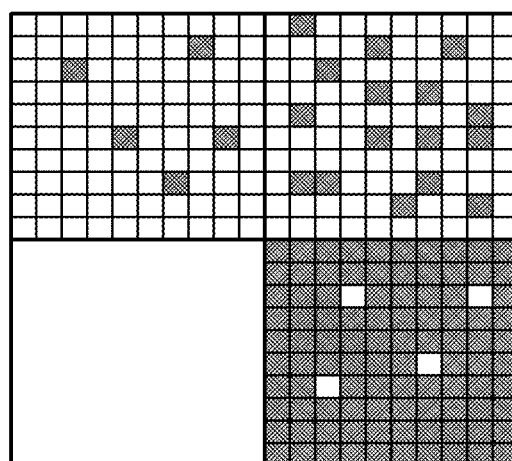
Figures 1, 1E, 2, 3, 4:
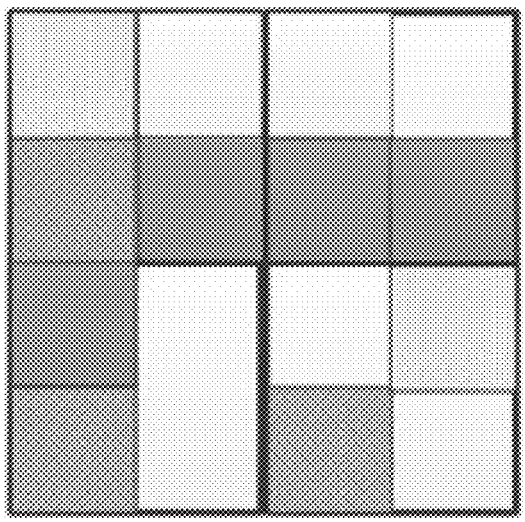

As shown in FIGS. 1E-2, 1E-3, and 1E-4, half-tone patterning or greyscale can be used to control the brightness (or the darkness, e.g., greyness) of an image. FIG. 1E-2 schematically illustrates an example half-tone pattern or screen that can be used in certain embodiments described herein. In FIG. 1E-2, the black areas can represent the specular reflecting features (or the diffusing features), and the white areas can represent the diffusing features (or the specular reflecting features). Varying the size, number, and/or distribution of the specular reflecting features relative to the size, number, and/or distribution of the diffuse reflecting features can be used to provide greyscale (or brightness/darkness of hue) in the produced image. The exact pattern or screen is not particularly limited and can vary according to the desired size, number, and/or distribution.

An un-aided eye typically cannot discern the image as a half-tone image if the half-tone features are less than around 75 microns. Accordingly, in various embodiments, a minimum half-tone feature in the half-tone patterning can be less than or equal to 75 microns (e.g., less than or equal to 65 microns, less than or equal to 50 microns, less than or equal to 30 microns, less than or equal to 10 microns, etc.) and/or be in a range from 0.05 micron to 75 microns (e.g., 0.05 micron to 65 microns, 0.05 micron to 50 microns, 0.05 micron to 30 microns, 0.05 micron to 10 microns, 1 micron to 75 microns, 1 micron to 50 microns, etc.).

FIG. 1E-3 schematically illustrates another example half-tone pattern and/or screen that can be used in certain embodiments described herein. In FIG. 1E-3, the black areas can represent the specular reflecting features (or the diffusing features), and the white areas can represent the diffusing features (or the specular reflecting features). In this example, a single image pixel can be broken into a grid of sub-pixels. To achieve 100 levels of grey, the grid can be provided as 10×10 subpixels. To achieve 50% grey, half of the subpixels represent specular reflecting features, and the remaining subpixels represent diffusing features. The distribution of the subpixels can be a pattern, a screen, and/or a stochastic dither (e.g., a pseudo-random probability distribution) as shown in FIG. 1E-3. In various embodiments, the stochastic dither can be applied to a spatial distribution of a fixed-pattern diffuser and reflective subpixels, or the stochastic dither can be applied in three dimensions to accompany variable height or pattern diffusers. The exact dither is not particularly limited and can vary according to the desired size, number, and/or distribution.

In the examples shown in FIGS. 1E-2 and 1E-3, the black areas can represent 100% specular reflecting features (or 100% diffusing features), and the white areas can represent 100% diffusing features (or 100% specular reflecting features). FIG. 1E-4 schematically illustrates an example greyscale that can be used in certain embodiments described herein. In some such embodiments the levels of specular reflecting features and diffusing features can be in between 0% and 100% (e.g., 30%, 70%, etc.). For example, as discussed above with regard to FIGS. 1E-1a, 1E-1b, 1E-1c, and 1E-1d, different levels of grey can be provided by different levels of specular reflecting features and diffusing features. FIG. 1E-4 shows an example pixel having 4 cells (e.g., 4 quandrants). There are four possible levels of grey within four cells per pixel. Accordingly, there are 16 possible levels per cell or 64 possible levels per pixel. The exact greyscale is not particularly limited and can vary according to the desired representation.

As discussed above, various embodiments of the optical product 10' can be advantageously used for authenticity and security applications. A recent trend has been to make the holograms used for authenticity and security applications more complicated. However, a disadvantage of using complicated holograms authenticity and security applications is that an average person may be unable to remember what the image is supposed to be. Thus, even if it were possible to make counterfeit copies of such complicated holograms the average person may not be able to distinguish a genuine hologram from the counterfeit hologram from the holographic image alone.

Embodiments of the optical object 10' can include a plurality of optical features that can produce different distinct images when viewed from different directions. Such a configuration can be resistant to photocopying, laser playback into a photoresist from bouncing the beam off of the plurality of optical features to form an original master, or other methods for duplicating. Thus, such objects can be suitable for security and/or authenticity applications. Additionally, the methods and system to manufacture various embodiments of optical objects described herein may not be easily practiced by counterfeiters thus reducing the risk of counterfeiters having the ability to make counterfeit copies of the optical object.

The different distinct images produced by the plurality of optical features included in the various embodiments of optical objects 10' described herein can be viewed from a variety of different viewing directions and can be brightly reflecting. Such embodiments, for example, can be advantageous over objects used in security applications that incorporate optically variable inks and/or magnetic optically variable inks which can have reduced brightness thus making them difficult to see under low light conditions. For example, currency notes including embodiments of optical objects including a plurality of optical features that are configured to produce different distinct images when viewed from different directions can be brighter and more resistant to counterfeiting than currency notes that do not include such optical features and instead rely on optically variable inks and/or magnetically optically variable inks and pigments, which have been used in the banknote industry.

FIGS. 1F-1, 1F-2, 1G-1 and 1G-2 schematically illustrate top views of an optical product 10' including a first plurality of portions, each of the first plurality of portions comprising one or more optical features that are configured to produce at least part of a first 3D image of a first 3D object at a first angle of view. The optical product 10' also includes a second plurality of portions, each of the second plurality of portions comprising one or more optical features that are configured to produce at least part of a second 3D image of a second 3D object at a second angle of view. Each portion of the optical product 10' can also be referred to as a pixel or a tile. The optical product 10' can be configured to produce a first distinct image (e.g., a text, such as, for example, the number "100") when viewed from a first direction and a second distinct image (e.g., an object, such as, for example a bell) when viewed from a second direction. The optical object 10' can be configured such that the first plurality of portions comprise a first set of optical features that contribute to producing the first 3D image and the second plurality of portions comprise a second set of optical features that contribute to producing the second 3D image. These concepts are discussed in detail below with reference to FIGS. 1F-1, 1F-2, 1G-1 and 1G-2.

FIGS. 1F-1 and 1F-2 schematically illustrate top view of an embodiment of an optical object 10' that comprises a first plurality of portions $P_{A1}$, $P_{A2}$ and $P_{A3}$. Each of the first plurality of portions $P_{A1}$-$P_{A3}$ comprises a first set of optical features $F_1$ configured to produce a first distinct image when viewed from a first direction. The optical object 10' also comprises a second plurality of portions $P_{B1}$-$P_{B3}$ that comprise a second set of optical features $F_2$ that are configured to produce a second distinct image when viewed from a second direction. For example, as illustrated by FIG. 1F-1, in a first position of the optical object 10', incident light is reflected at a first angle $\theta_1$ by the first set of optical features $F_1$ such that a viewer perceives the text "100" (without perceiving the liberty bell) and as illustrated by FIG. 1F-2, in a second position of the optical object 10', incident light is reflected at a second angle $\theta_2$ by the second set of optical features $F_2$ such that the viewer perceives a liberty bell (without perceiving the text "100").

FIG. 1G-1 schematically illustrates an embodiment of an optical object 10' that comprises a first plurality of portions $P_{A1}$, $P_{A2}$, $P_{A3}$, $P_{A4}$ and $P_{A5}$. Each of the first plurality of portions $P_{A1}$-$P_{A5}$ comprises a first set of optical features $F_1$ which together are configured to produce a first distinct image when viewed from a first direction. The illustrated embodiment also comprises a second plurality of portions $P_{B1}$, $P_{B2}$, $P_{B3}$ and $P_{B4}$. Each of the second plurality of portions $P_{B1}$-$P_{B4}$ comprises a second set of optical features $F_2$ which together are configured to produce a second distinct image when viewed from a second direction. In various embodiments, the optical features in each of the first plurality of portions can produce a part of the first image of the first 3D object. Although, in the embodiment illustrated in FIG. 1G-1, all the portions of the first plurality of portions $P_{A1}$-$P_{A5}$ are grouped together and all the second plurality of portions $P_{B1}$-$P_{B4}$ are grouped together, in other embodiments the first and the second plurality of portions can be interspersed. For example, the first plurality of portions $P_1$ and the second plurality of portions $P_2$ are interspersed with each to form a checker board pattern. Other patterns and distributions are also possible.

FIG. 1G-2 schematically illustrates a top view of an embodiment of an optical object 10' that comprises a first plurality of portions (e.g., $P_{A1}$, $P_{A2}$) including one or more optical features $F_1$ and a second plurality of portions (e.g., $P_{B1}$, $P_{B2}$, $P_{B3}$) including one or more optical features $F_2$. The optical features $F_1$ in the first plurality of portions (e.g., $P_{A1}$, $P_{A2}$) together contribute to produce a first image (e.g., text "100") when viewed from a first direction and the optical feature $F_2$ in the second plurality of portions (e.g., $P_{B1}$, $P_{B2}$, $P_{B3}$) together contribute to produce a second image (e.g., liberty bell) when viewed from a second direction. It is noted in FIG. 1G-2 that in regions where the first and the second plurality of portions do not overlap, portions that are adjacent to each other have the set of optical features that contribute to form the same image whereas in regions where the first and the second plurality of portions overlap portions that are adjacent to each other have different sets of optical features that contribute to form different images. Although, linear hatch marks of a certain orientation and periodicity (spacing) are used to distinguish in the figure between the first and the second plurality of portions, in various embodiments the orientation and the periodicity of the optical features may vary from portion to portion based on the object shape.

In various embodiments, each of the plurality of portions can be of equal size or shape. Alternately, in other embodiments, some of the plurality of portions can have a different size than some other of the plurality of portions. The optical features $F_1$ and $F_2$ can comprise linear or curved grooves, facets, or other surface relief features. In various embodiments, the optical features $F_1$ and $F_2$ can have a curved cross-sectional shape. The orientation, slope/gradient and other physical attributes of the optical features $F_1$ and $F_2$ are configured such that the intensity of light reflected and/or transmitted through the optical object 10' from the optical features $F_1$ and $F_2$ is varied to form regions of varying brightness and darkness which results in the perception of different images when viewed from different directions. For example, the different sets of optical features can be configured such that light that is retro-reflected appears bright and light reflected at different angles appears black or different shades of grey to give depth perception. This is described in detail with reference to FIG. 1H as well as elsewhere herein.

FIG. 1H schematically illustrates an enlarged side view of a portion of an optical product 10' including a plurality of optical features that are configured to produce different distinct images when viewed from different directions. The first set of optical features $F_1$ is represented by solid line and the second set of optical features $F_1$ is represented by dashed line. The physical attributes of the first set of optical features $F_1$, such as, for example, slope/gradient, orientation is varied such that when the optical object 10' is oriented such that a viewer viewing the optical object 10' along a first direction $\theta_1$ perceives a first image (e.g., the text "100"). The physical attributes of the second set of optical features $F_2$, such as, for example, slope/gradient, orientation, is varied such that when the optical object 10' is oriented such that a viewer viewing the optical object 10' along a second direction $\theta_2$ perceives a second image (e.g., a bell).

The first and the second viewing directions can be oriented (e.g., tilted and/or rotated) with respect to each other by an angle from 10 degrees to 60 degrees. For example, if the optical object 10' is configured as a reflective embodiment, the viewer can switch (or flip) between viewing the first and the second image by tilting the optical object 10' by an angle from 10 to 60 degrees (e.g., 20 degrees or less) about an axis in the plane of the optical object 10'. As another example, if the optical object 10' is configured as a transmissive embodiment, the viewer can switch (or flip) between the first and the second image by rotating the optical object 10' by an angle from 10 to 60 degrees (e.g., 45 degrees or less).

The optical object 10' can include laminates, films, or layers. The optical object 10' can be manufactured using the methods described herein. For example, the physical attributes (e.g., orientation, slope/gradient) of the different sets of optical features that would produce the different distinct images when viewed from different directions can be determined using an algorithm that can be executed by an electronic processing system and stored in a data file. Using the data file, the different sets of optical features can be disposed on a polymeric substrate using one or more positive/negative masters. In various implementations, reflective material (e.g., aluminum, copper, silver, high refractive index material, such as, for example, ZnS or $TiO_2$ for TIR) can be disposed on the plurality of optical features. Depending on the thickness of the reflective material the optical object 10' can be reflective or transmissive. Depending on the thickness of the reflective material the optical object 10' can be partially reflective or partially transmissive. For example, if the thickness of the reflective material is greater than or equal to 45 nm (e.g., 50 nm, 55 nm, 60 nm, etc.) and/or be in a range from 45 nm to 100 nm, or any range within this range (e.g., from 45 nm to 85 nm, from 45 nm to 75 nm, from 50 nm to 85 nm, etc.), then the optical object 10' can be reflective. As another example, if the thickness of the reflective material is less than 45 nm (e.g., 10 nm, 15 nm, 20 nm, 25 nm, etc.) and/or be in a range from 10 nm to 44.9 nm, or any range within this range (e.g., from 10 nm to 40 nm, from 10 nm to 35 nm, from 10 nm to 30 nm, etc.), then the optical object 10' can be transmissive. The thickness of the reflective material at which the optical object 10' is reflective or transmissive can depend on the chemical composition of the reflective material. The plurality of optical features coated with the reflective material can be protected by a protective polymer coating.

FIG. 1I illustrates an embodiment of the optical object 10' comprising a plurality of optical features $F_1$ and $F_2$ disposed on a polymeric substrate 1005. The polymeric substrate 1005 can include materials, such as, for example, polyethylene terephthalate (PET), oriented polypropylene (OPP), low density polyethylene (LDPE), linear low density polyethylene (LLDPE), polypropylene (PP), polyvinyl chloride (PVC), polycarbonate (PC) or any other plastic film. In various embodiments, the polymeric substrate can be clear. In various embodiments, the polymeric substrates can have a thickness less than or equal to 25 microns. The physical attributes of the plurality of optical features $F_1$ and $F_2$ can be determined from input images that correspond to the images that are desired to be perceived by a viewer. The input images can be three dimensional (3D) images. In some implementations, the input images can be dot matrix images. The physical attributes of the plurality of optical features $F_1$ and $F_2$ that will produce the desired images when illuminated by light can be determined using processes and algorithms that are executed by an electronic processing system. The processes and algorithms can be configured to analyze the input images and determine physical attributes (e.g., orientation, slope/gradient) of the different sets of optical features. The processes and algorithms can be based on equations and phenomena that govern the interaction of light with matter.

The plurality of optical features $F_1$ and $F_2$ are coated with a thickness of a reflective material 1010. As discussed above, depending on the thickness and the composition of the reflective material, the optical object 10' can be reflective or transmissive. A protective covering 1015 is disposed over the reflective material coating 1010 to protect the plurality of the optical features $F_1$ and $F_2$ and/or the reflective material coating 1010 from corrosion from acidic or basic solutions or organic solvents such as gasoline and ethyl acetate or butyl acetate. In various implementations, the protective covering 1015 can also provide protection during subsequent processing steps of the object like manufacturing currency.

In various implementations, the plurality of optical features $F_1$ and $F_2$ can be integrated with one or more lenses (e.g., a curved lens or a Fresnel lens or a lenticular lens) and/or prisms and/or mirrors. In such embodiments, the focal length of the lens can be approximately equal to the thickness of polymeric substrate 1005. Some such embodiments can present images with higher contrast and sharpness than some embodiments without lenses and/or prisms and/or mirrors. For example, certain embodiments described herein, e.g., referring to FIGS. 1F-1 and 1F-2 for example, are configured to produce by reflected or transmitted light, two distinct images when viewed from different directions. In some such embodiments, the slopes of the optical features $F_1$, $F_2$ within the various portions $P_{An}$, $P_{Bn}$ can create depth perception and contrast in the 3D images as described herein. For two 3D images, the slopes of the optical features $F_1$, $F_2$ can also separate the two distinct images to avoid cross talk and allow the observer to view the images independently from each other at a viewing angle. For example, less steep slopes can cause light to reflect toward the observer's eye, while steeper slopes can cause light to reflect away from the observer's eye. In some such embodiments, because some of the tilt range of the optical features $F_1$, $F_2$ is used to separate the images, the full tilt range would not be used to create the contrast in the images.

Figures 1, 1J:
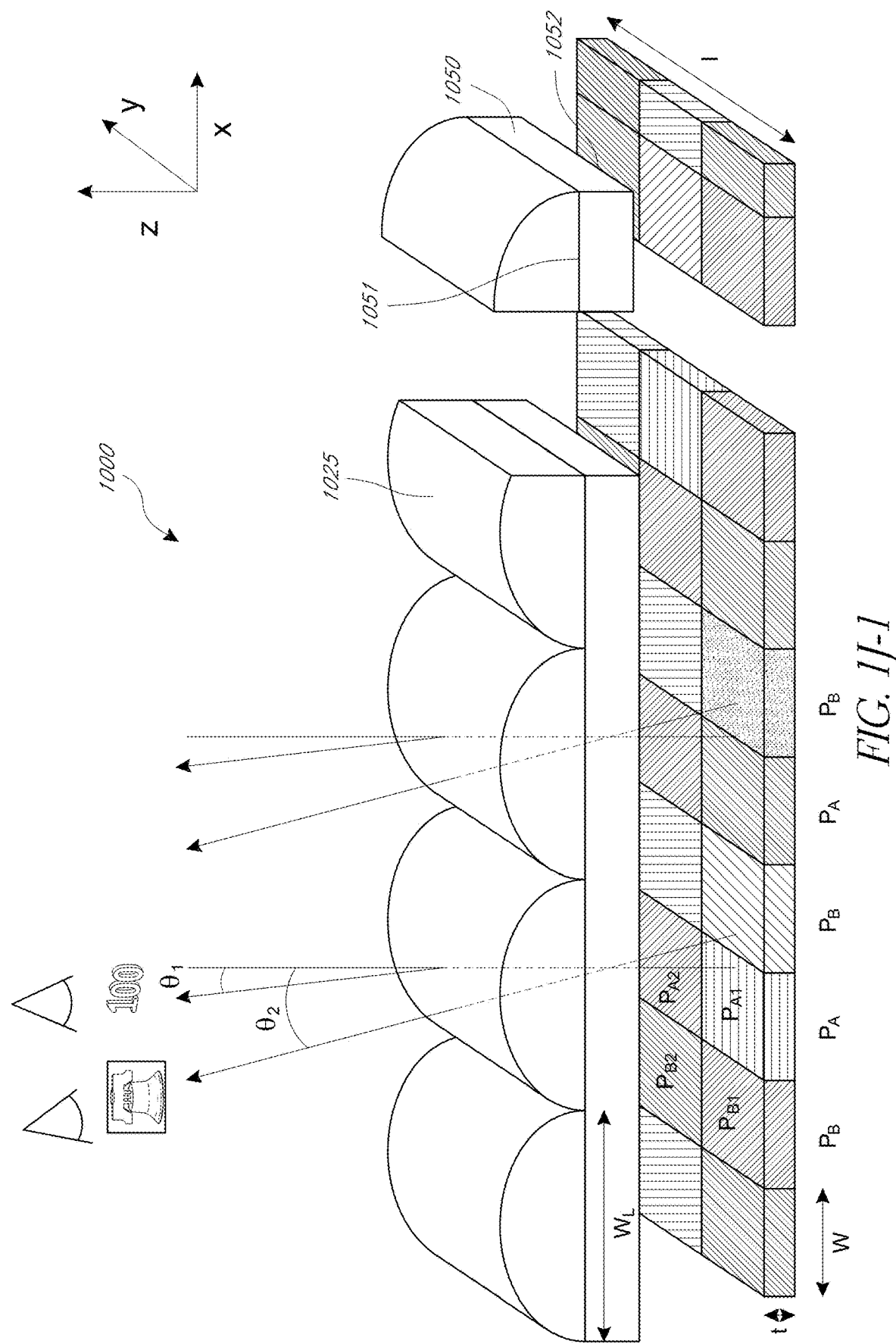
Figures 1, 1J, 2:
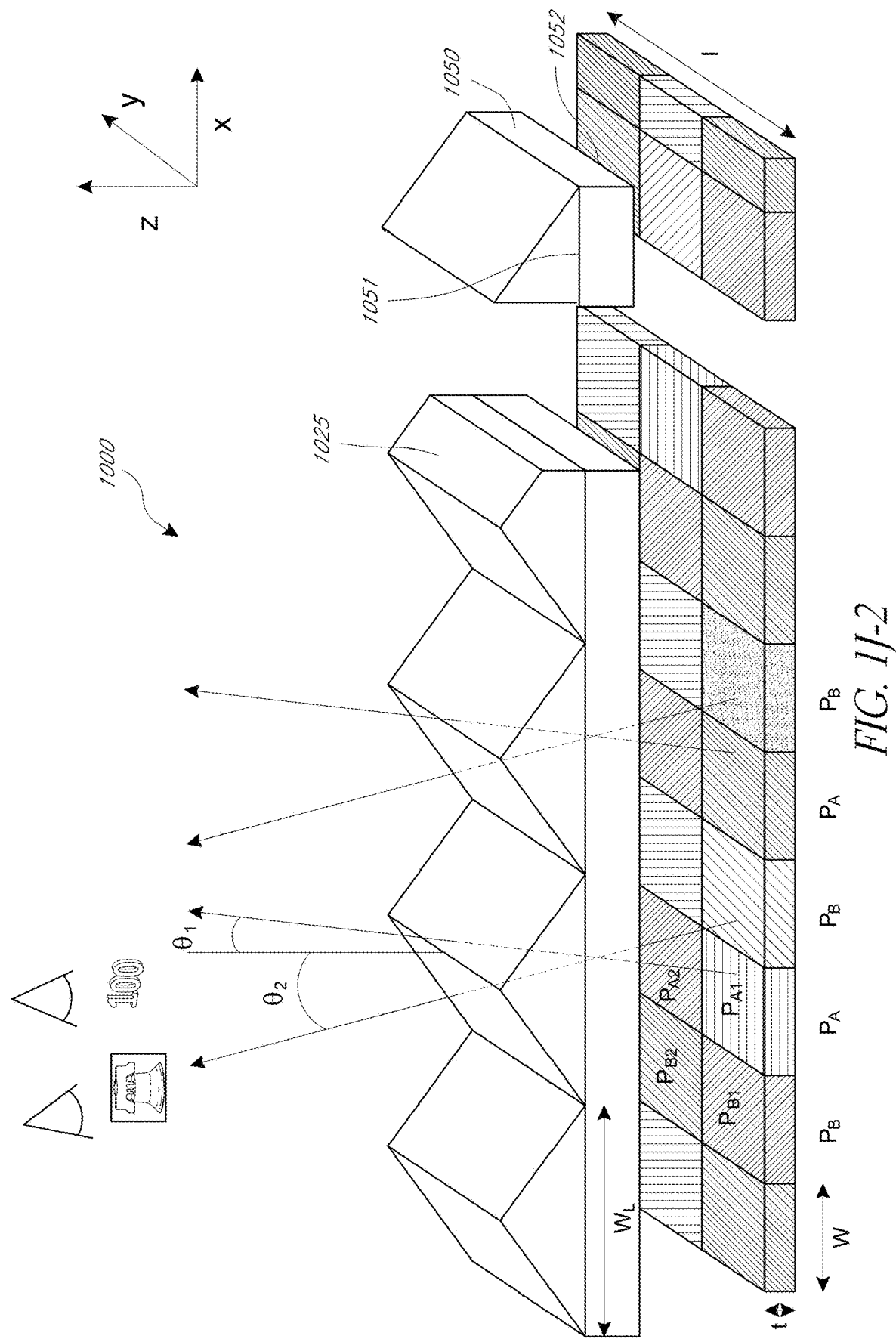
Figures 1, 1J, 2, 3:
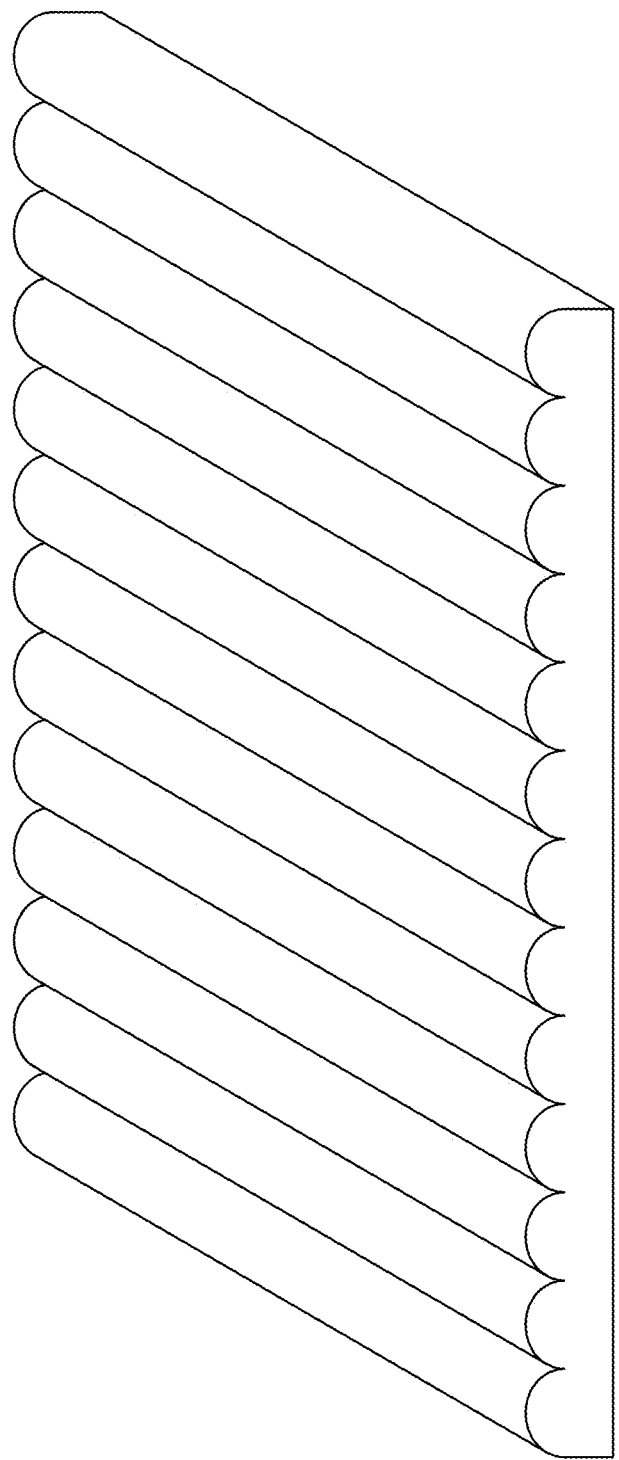
Figures 1, 1J, 2, 3, 4:
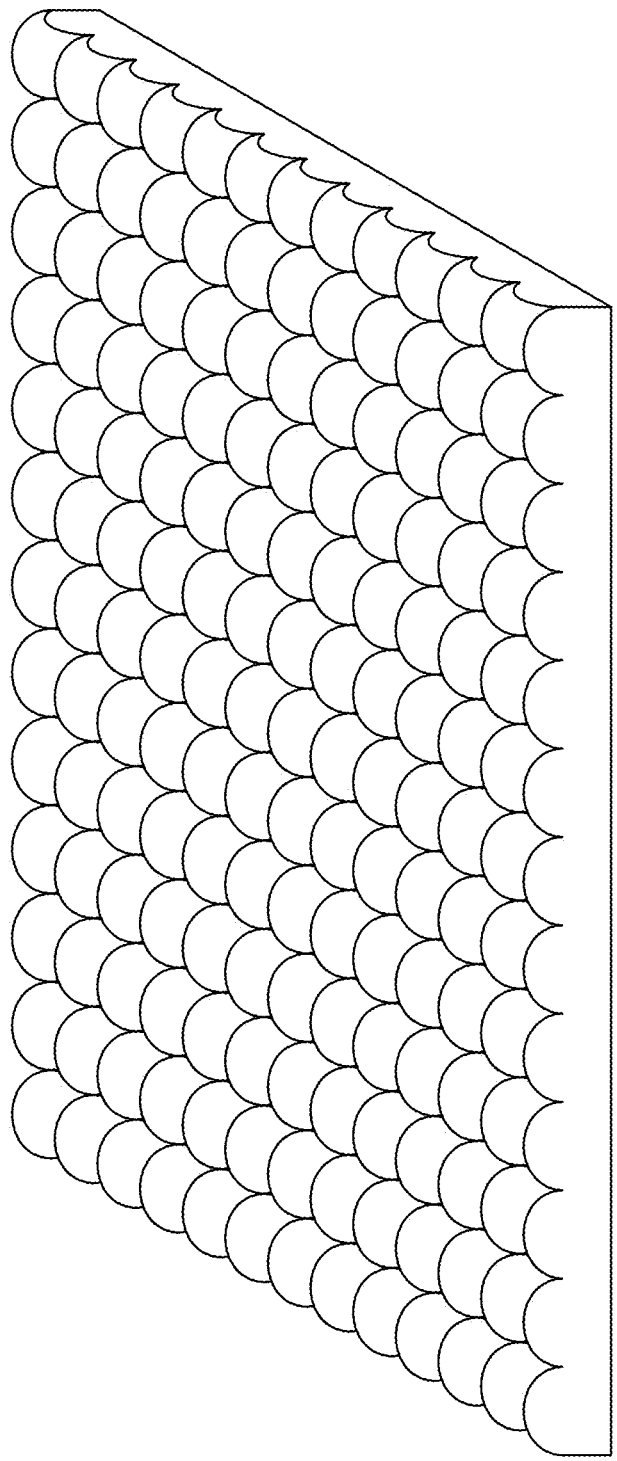
Figures 1, 1J, 2, 3, 4, 5, 6:
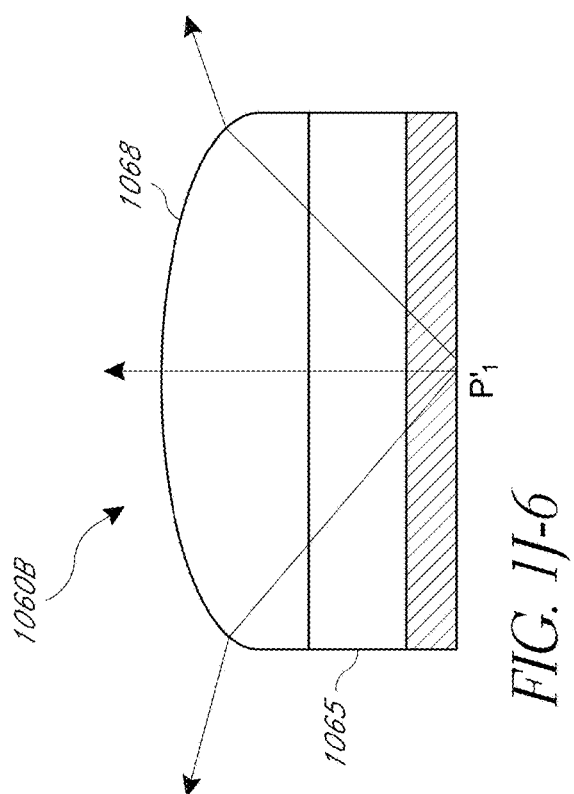
Figures 1, 1J, 2, 3, 4, 5:
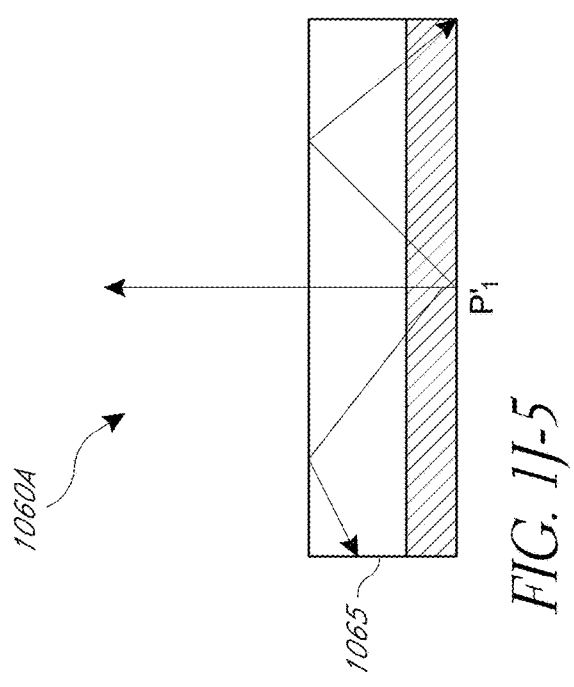
Figures 1, 1J, 2, 3, 4, 5, 6, 7:
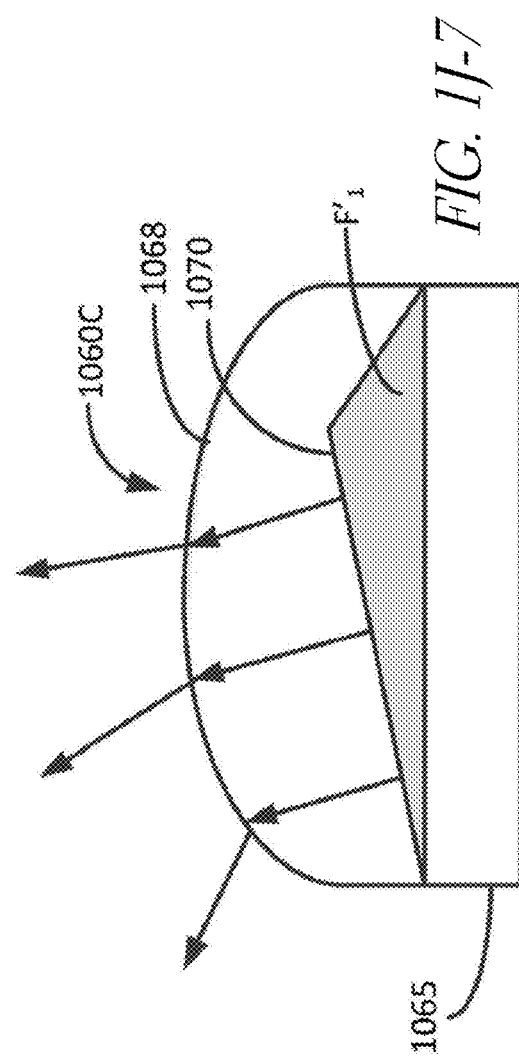
Figures 1, 1J, 2, 3, 4, 5, 6, 7, 8:
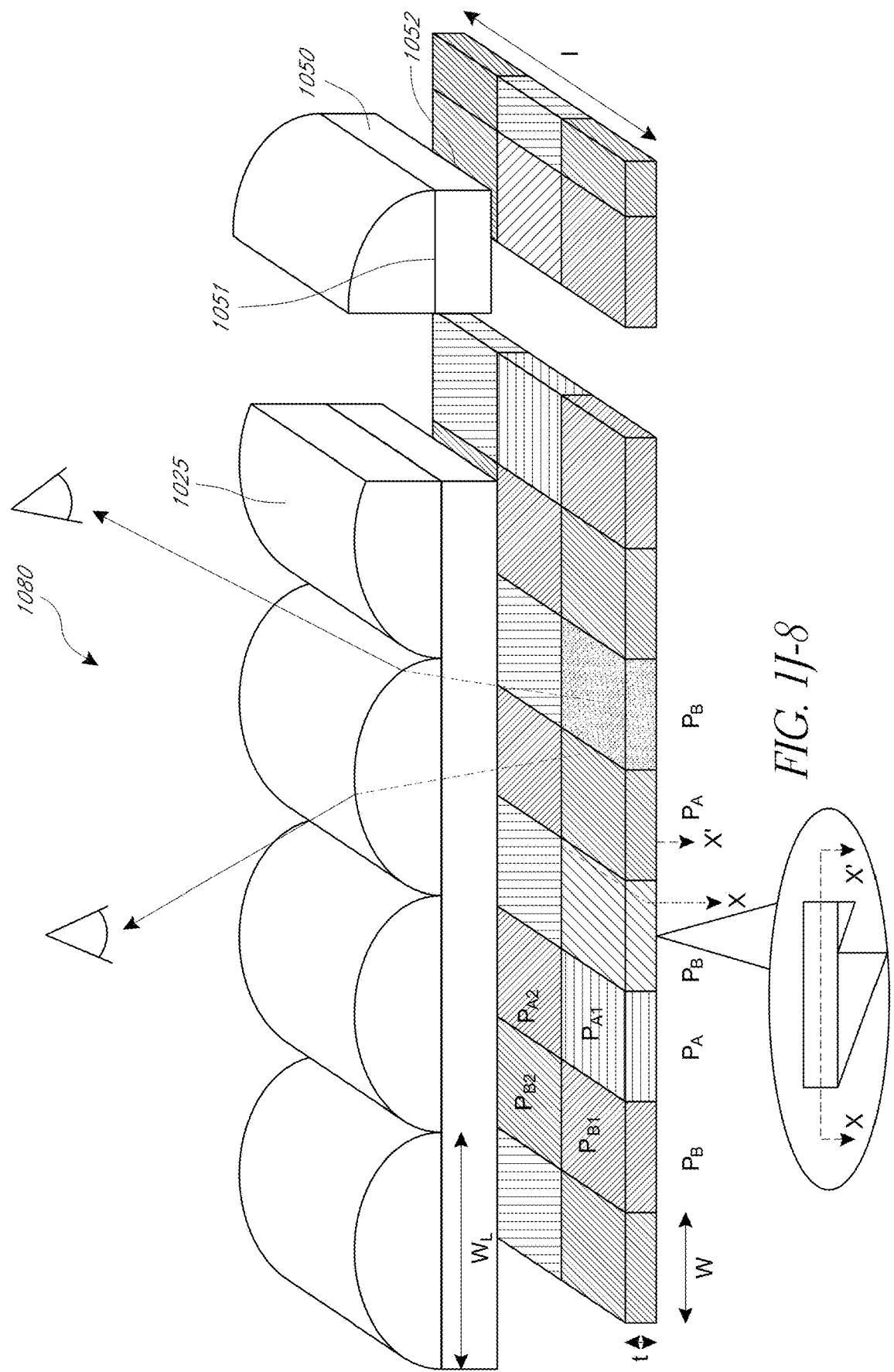
Figures 1, 1J, 2, 3, 4, 5, 6, 7, 8, 9:
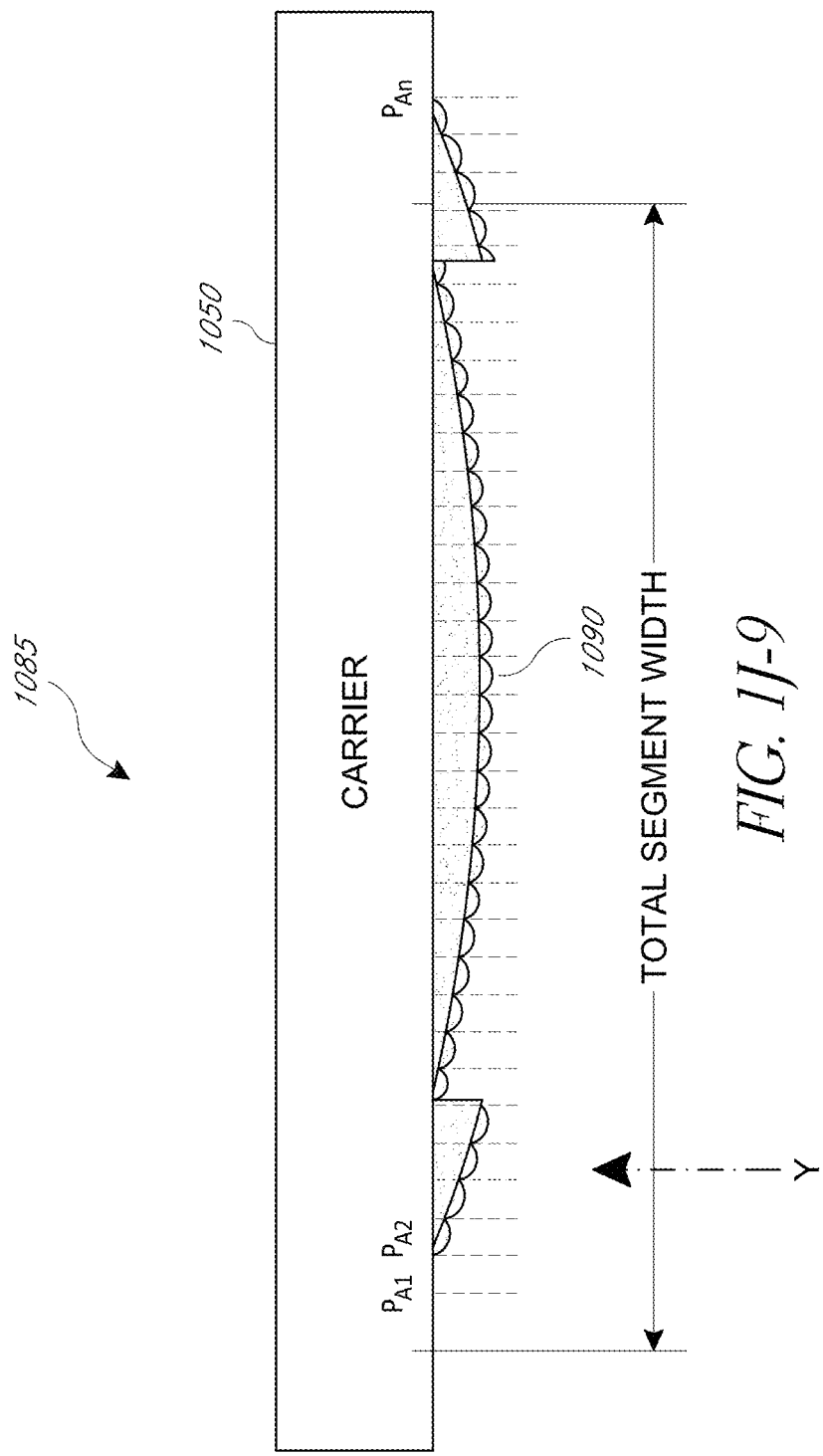
Figures 1, 1J, 2, 3, 4, 5, 6, 7, 8, 9, 10, 11:
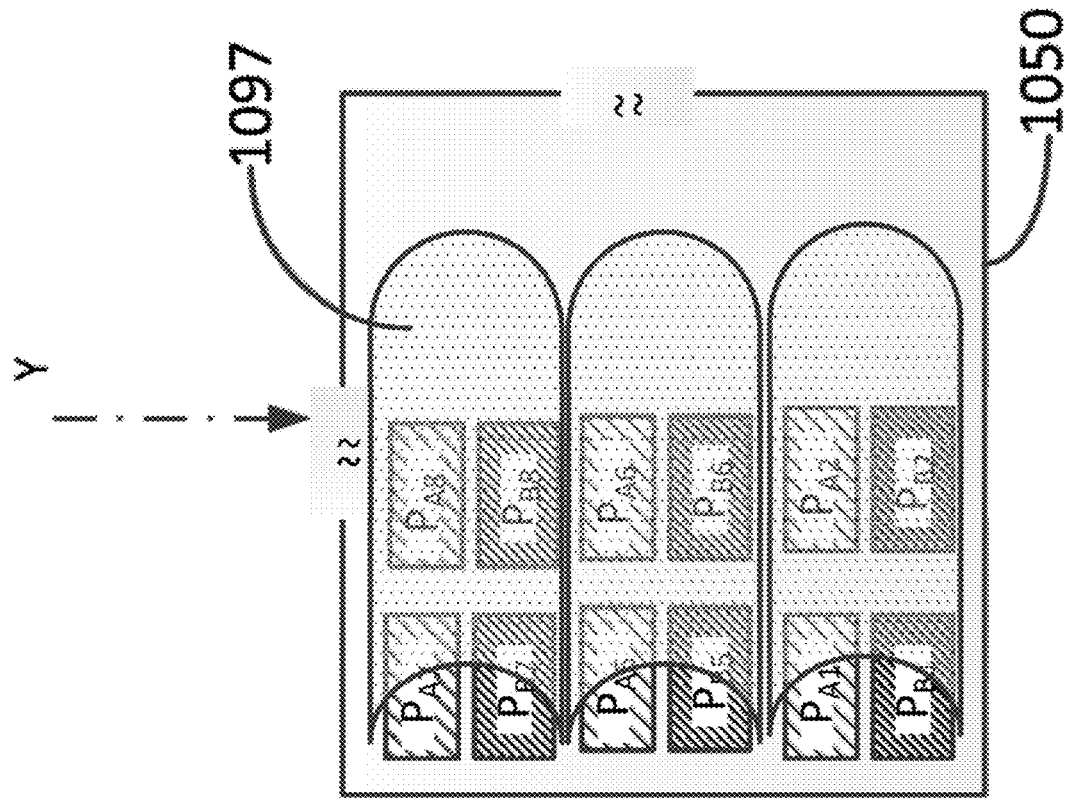
Figures 1, 1J, 2, 3, 4, 5, 6, 7, 8, 9, 10:
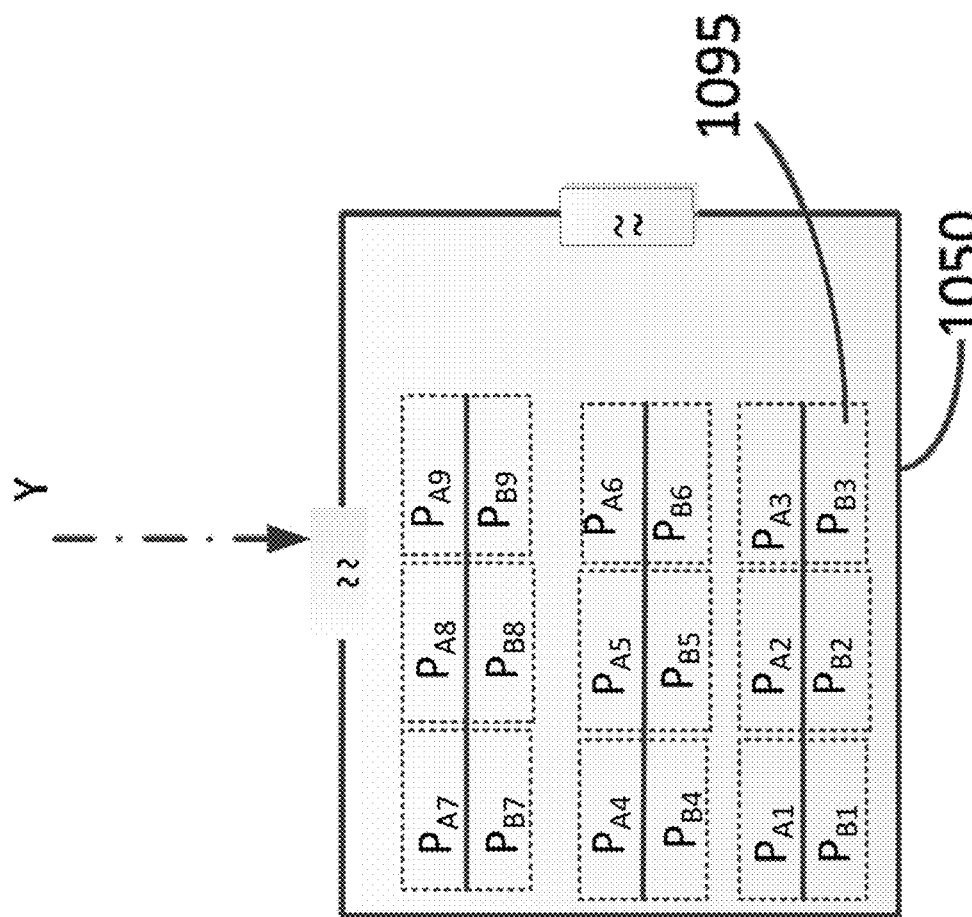

FIG. 1J-1 schematically illustrates an isometric view of an example optical product 1000 including an array 1025 of lenses disposed over a plurality of portions $P_{An}$, $P_{Bn}$ (e.g., having optical features as described herein). The optical product 1000 shown in FIG. 1J-1 is configured to present different distinct images when viewed from different directions. For example, at a first viewing angle $\theta_1$, the array 1025 of lenses can present a first 3D image (e.g., text "100"). At a second viewing angle $\theta_2$, the array 1025 of lenses can present a second 3D image (e.g., liberty bell). In various embodiments, an array of prisms or an array of mirrors (such as mirrors with optical power) can be used in combination with or instead of the lenses. FIG. 1J-2 schematically illustrates an example optical product including an array of prisms. In certain embodiments, the array 1025 of lenses and/or prisms and/or mirrors can be configured to separate the two distinct images so that the images can be viewed independently of each other. Because the lenses and/or prisms and/or mirrors can separate the images, the full tilt range of the optical features $F_1$, $F_2$ can be used to create contrast and sharpness in the images.

In various embodiments, the array 1025 of lenses can include a 1D lens array. As shown in FIG. 1J-3, the lenses can extend in length much longer than shown in FIG. 1J-1. However, the drawings and schematics are merely illustrative. A wide variation in sizes and dimensions are possible. In some embodiments, the array 1025 of lenses can include a number of cylindrical, hemi-cylindrical lenses, truncated hemi-cylindrical lenses, or plano convex cylindrical lenses with one convex surface and one plano surface. In some embodiments, the lenses can have one convex surface and one concave surface.

The array of lenses can include a micro lens array having a pitch (e.g., lateral distance between the centers of two lenses) from 8 microns to 300 microns (such as 8 microns, 12 microns, 15 microns, 20 microns, 25 microns, 30 microns, 42 microns, 50 microns, 62.5 microns, 75 microns, 87.5 microns, 100 microns, 125 microns, 150 microns, etc.) or any ranges within this range (such as 8 microns to 250 microns, 8 microns to 200 microns, 12.5 microns to 250 microns, 30 microns to 300 microns, 30 microns to 250 microns, 62.5 microns to 187.5 microns, 62.5 microns to 175 microns, 62.5 microns to 162.5 microns, 75 microns to 187.5 microns, etc.). In certain embodiments, the pitch can be constant across the array 1025 of lenses. However, in some embodiments, the pitch can vary across the array 1025.

A lens within the array 1025 of lenses can have a width $W_L$ (e.g., along the x-axis). In various embodiments, the width $W_L$ of a lens can be the same as the values of pitch described herein. In certain embodiments, the width $W_L$ of a lens can be the same as the width $W_L$ of another lens in the array 1025 of lenses. However, in other embodiments, the width $W_L$ of a lens can be different than the width $W_L$ of another lens in the array 1025 of lenses.

The radius of curvature of a lens can be from 10 microns to 500 microns (such as 10 microns, 15 microns, 37.5 microns, 50 microns, 62.5 microns, 75 microns, 87.5 microns, or 100 microns) or any ranges within this range (such as 10 microns to 87.5 microns, 10 microns to 75 microns, 37.5 microns to 87.5 microns, 37.5 microns to 75 microns, 50 microns to 87.5 microns, 50 microns to 75 microns, etc.). In some embodiments, the radius of curvature of a lens can be different from the radius of curvature of another lens in the array 1025 of lenses. The curvature can be rotationally symmetrical or can be rotationally asymmetrical. In some embodiments, the radius of curvature of the lens can be greater than 500 microns. Some embodiments may comprise freeform lenslets instead of rotationally symmetric lenslets.

The lenses can be made of various materials such as a polymer. For example, the array 1025 of lenses can be UV casted into a resin layer coated on a polymer substrate. Some example substrate materials can include, but are not limited to, polyethylene terephthalate (PET), oriented polypropylene (OPP), low density polyethylene (LDPE), linear low density polyethylene (LLDPE), polypropylene (PP), polyvinyl chloride (PVC), or polycarbonate (PC). As another example, the array 1025 of lenses can be molded or embossed in a polymer substrate. Moldable and/or embossable substrates can include acrylonitrile butadiene styrene (ABS), polymethyl methacrylate (PMMA), polyethylene (PE), polycarbonate/acrylonitrile butadiene styrene (PC/ABS), and polyethylene terephthalate glycol-modified (PETG). Other methods and materials known in the art or yet to be developed can be used.

In some embodiments, a lens can have a focal length (and corresponding f-number) and be disposed at a distance with respect to the back side of the substrate in comparison to the lens's focal length to focus light on the back side of the substrate. In other embodiments, a lens can have a focal length (and corresponding f-number) and be disposed at a distance with respect to the back side of the substrate in comparison to the lens's focal length to focus light on the front side of the substrate. In yet other embodiments, a lens can have a focal length (and corresponding f-number) and be disposed at a distance with respect to the back side of the substrate in comparison to the lens's focal length to focus light in between the front and back sides of the substrate. Example focal lengths include a number from 10 microns to 300 microns (such as 10 microns, 12.5 microns, 15 microns, 30 microns, 37.5 microns, 62.5 microns, 75 microns, 87.5 microns, 100 microns, 112.5 microns, 125 microns, 137.5 microns, 150 microns, 162.5 microns, 175 microns, 187.5 microns, 200 microns, etc.) or any ranges within this range (such as 10 microns to 250 microns, 12.5 microns to 250 microns, 12.5 microns to 200 microns, 37.5 microns to 187.5 microns, 37.5 microns to 175 microns, 62.5 microns to 187.5 microns, 62.5 microns to 175 microns, etc.). In some embodiments, the focal length (and f-number) of a lens can be different from the focal length (and f-number) of another lens in the array 1025 of lenses.

Although the array 1025 of lenses is illustrated in FIG. 1J-1 as a 1D array of lenses, in some embodiments, the array 1025 of lenses can include a 2D array of lenses. FIG. 1J-4 shows an example 2D array of lenses. A 1D array of lenses (e.g., FIG. 1J-3) can include a series of cylindrical, hemi-cylindrical lenses, truncated hemi-cylindrical lenses, or plano convex cylindrical lenses in a row with power (e.g., curvature) in one direction only, whereas a 2D array of lenses (e.g., FIG. 1J-4) can have power (e.g., curvature) in two directions. In various embodiments, the 2D array comprises lenses having surfaces that are rotationally symmetric surfaces. In some embodiments, the 2D array can comprise lenses having surfaces that are asymmetrical. For example, the lenses can be elliptical in that the lenses are longer in one orthogonal direction compared to the other. The shape and or arrangement of the lenses, however, should not be considered to be limited. As additional examples, the surfaces of the lenses can be convex, aspherical, toroidal, and/or decentered. The lenses may have circular, square, rectangular, hexagonal aperture shape or footprint, or may have other shapes, and the aperture may be truncated. Similarly, the lenses may be arranged in a square array, triangular array, hexagonal closed packed, or arranged otherwise.

In various embodiments, the array 1025 of lenses can include a series of lenses (e.g., a lenticular lens) configured to allow the features disposed under the lenses corresponding to different images to be viewable at different viewing angles. For example, in some cases, the lenses are magnifying lenses to enlarge different features disposed under the lenses corresponding to different images at different viewing angles. As another example, the lenses can provide an avenue to switch between different images through different channels. Thus, the product 1000 can include a first set of portions $P_A$ and a second set of second portions $P_B$ disposed under the array 1025 of lenses.

In FIG. 1J-1, the first plurality of portions $P_A$ and the second plurality of portions $P_B$ are interlaced with each other. At the first viewing angle $\theta_1$, the array 1025 of lenses can be configured to allow the first image (e.g., text "100") to be viewable without allowing the second image (e.g., liberty bell) to be viewable. At the second viewing angle $\theta_2$, the array 1025 of lenses can be configured to allow the second image (e.g., liberty bell) to be viewable without allowing the first image (e.g., text "100") to be viewable. Thus, by tilting the product 1000 from the first viewing angle $\theta_1$ to the second viewing angle $\theta_2$, the array 1025 of lenses can switch between the two images.

Referring to FIG. 1J-1, the first plurality of portions $P_A$ and the second plurality of portions $P_B$ can be disposed under the array 1025 of lenses. In various embodiments, the first plurality of portions $P_A$ and the second plurality of portions $P_B$ can have a width w smaller than the width $W_L$ of a lens in the array 1025 of lenses. In some embodiments, a pair of a first plurality of portions $P_A$ and a second plurality of portions $P_B$ can be aligned under each lens in the array 1025 of lenses. However, a pair of a first plurality of portions $P_A$ and a second plurality of portions $P_B$ need not be exactly aligned under a single lens in the array 1025, but might be offset from such an alignment. For example, a first plurality of portions $P_A$ can be disposed under a single lens in the array, while a portion of plurality of portions $P_B$ can be disposed under parts of two different lenses in the array 1025. Thus, in various embodiments, the pairs of a first plurality of portions $P_A$ and a second plurality of portions $P_B$ under the array 1025 of lenses are not alignment sensitive (e.g., exact alignment of pairs of a first plurality of portions $P_A$ and a second plurality of portions $P_B$ under a single lens in the array 1025 is not necessary).

Although exact alignment of pairs of a first plurality of portions $P_A$ and a second plurality of portions $P_B$ under a single lens in the array 1025 is not necessary, a lens within the array 1025 of lenses can be registered on average to a pair of a first plurality of portions $P_A$ and a second plurality of portions $P_B$. For example, a lens can correspond to a pair of a first plurality of portions $P_A$ and a second plurality of portions $P_B$. Light from a first portion $P_{A1}$ can pass through a first part of a lens and light from a second portion $P_{B1}$ and a second plurality of portions $P_{B1}$ can pass through a separate part of the lens, and corresponding portions of the lens can form the images 110, 120 at two different angles as described herein. On average, most of the lens may be registered with respect to the pair of a first plurality of portions $P_A$ and a second plurality of portions $P_B$.

FIG. 1J-5 illustrates a cross-sectional view of an embodiment of an optical product 1060A comprising a carrier 1065 and a portion $P'_1$ including a plurality of optical features (e.g. F'1) that are configured to produce an image of an object or part thereof. The optical product 1060A can have features/characteristics that are similar to the optical product 10' discussed above. In various embodiments, a reflective material can be disposed over the portion $P'_1$. In some embodiments, the portion $P'_1$ can be formed on a substrate and disposed on the first side of the carrier 1065. The carrier 1065 can have characteristics similar to the various polymeric substrates (e.g., polymeric substrate 1005 of FIG. 1I) described herein. For example, the carrier 1065 can comprise a polymeric material having a refractive index greater than the refractive index of air. Light rays that are incident on the carrier 1065 after being reflected and/or scattered by the plurality of optical features at angles less than the critical angle of the material of the carrier 1065 as measured with respect to a normal to the surface, such as, for example, close to the normal to the surface of the carrier 1065 can exit out of the carrier 1065 as shown in FIG. 1J-5. However, high angle rays that are incident on the carrier 1065 after being reflected and/or scattered by the plurality of optical features at angles greater than the critical angle of the material of the carrier 1065 will be total internally reflected and do not exit out of the carrier 1065 as shown in FIG. 1J-5. Accordingly, the image generated by the plurality of optical features of the product 1060A can only be viewed over an angular range that is less than the critical angle.

A lens element 1068 can be disposed on a second side of the carrier 1065 and registered with the portion $P'_1$ to increase the angular range over which the image produced by the plurality of optical features can be viewed. The lens element 1068 can be a part of an array of lenses. The lenses in the array can be on average registered with the plurality of portion $P_n'$. The lens element 1068 can advantageously increase the viewing angle over which the image generated by the portion $P'_1$ can be viewed, in part due to the condition of total internal reflection of high angle rays not being satisfied as explained below with reference to FIGS. 1J-5 and 1J-6.

The lens element 1068 can have a curved surface which can reduce the angle between the high angle rays and the surface normal such that the condition for total internal reflection is not satisfied. The lens element 1068 can be optically transmissive. Accordingly, some of the high angle rays that are incident on the carrier 1065 after being reflected and/or scattered by the plurality of optical features can exit out of the carrier 1065 instead of being total internally reflected. Consequently, the product 1060B including a lens element 1068 can advantageously increase the view angle over which the image produced by the plurality of optical features can be viewed. The lens element 1068 can also provide other advantages including but not limited to improving focus of the different images, increasing the difference between the tilt angles at which the different images can be viewed (also referred to as tilt budget) for embodiments in which multiple sets of portions produce multiple images, increasing depth perception by allowing a viewer to receive light at steeper angles and other advantages discussed herein.

In various embodiments of the product including a reflective surface disposed over the plurality of optical features, the lens element 1068 can increase the range of local surface normal as shown in FIG. 1J-7. For example, consider rays of light that are emitted from different points of the surface of the facet along a normal direction as illustrated in FIG. 1J-7. Each of the rays will be refracted out of the lens element 1068 in various directions depending on the curvature of the lens element at the point where each of the normal rays of light intersects the lens element. In this manner, the angular range of rays that are emitted along a normal direction to the surface is expanded. The lens element 1068 can be lenticular in some embodiments. In some other embodiments, the lens element 1068 can be, a spherical lens and/or a rotationally symmetric aspheric lens. In some embodiments, the lens element 1068 can be a part of a 1-D array of lenses as shown in FIGS. 1J-3. In some other embodiments, the lens element 1068 can be a part of a 2-D array of lenses as shown in FIG. 1J-4. In some embodiments, the lens element 1068 can be a microlens. The array of lenses can be a rectangular array, a square array, a triangular array, a hexagonal close packed array or an irregular array.

As discussed above and illustrated in FIG. 1J-1, individual lenses of the array 1025 of lenses can be disposed over a plurality of portions $P_{An}$, $P_{Bn}$ (e.g., having optical features as described herein) that are configured to produce a plurality of images or parts thereof. For example, an individual lens of the array 1025 of lenses can be disposed over at least a first plurality of portions $P_A$ configured to produce image A and a second plurality of portions $P_B$ configured to produce image B. In the embodiment 1080 of the product illustrated in FIG. 1J-8, the first plurality of portions $P_A$ can be configured to produce a first image or part thereof and the second plurality of portions $P_B$ can be configured to produce a second image or part thereof. The array 1025 of lenses can be configured such that a viewer may be able to view the first or the second image by flipping or tilting the product 1080 about an axis as discussed above with reference to FIG. 1J-1. The array 1025 of lenses disposed over the plurality of portions $P_{An}$, $P_{Bn}$ having different sets of optical features as described herein with reference to FIG. 1J-1 can also provide the advantage of increased field of view and other advantages discussed above.

In some embodiments, the first image produced by the first plurality of portions $P_A$ can correspond to a first stereoscopic version of an image corresponding to a right eye perspective of the an object and the second image produced by the second plurality of portions $P_B$ can be configured to produce a second stereoscopic version of an image corresponding to a left eye perspective of the object. The lenses of the array 1025 of lenses can be configured to direct light from the first plurality of portions $P_A$ towards the right eye of a viewer and light from the second plurality of portions $P_B$ towards the left eye of the viewer thereby generating 3D images (e.g., autostereoscopic images) which produce the perception of depth. The optical features, such as are described herein, included in the plurality of portions $P_{An}$, $P_{Bn}$ can have facets that are tilted progressively as depicted in the inset of FIG. 1J-8 which illustrates a cross-sectional view along axis X-X' of one of the second plurality of portions $P_B$.

In various embodiments, the array of optical element (e.g., lenses, prisms or mirrors) can be integrated or combined together in one surface with the optical features that are included in the plurality of portions $P_{An}$, $P_{Bn}$ (e.g., having optical features as described herein) that are configured to produce a plurality of images or parts thereof. FIG. 1J-9 illustrates a cross-sectional view of a product 1085 comprising a first plurality of portions $P_{A1}$, $P_{A2}$, ... $P_n$. Each portion $P_{An}$ can include optical features (e.g., optical features $F_1, F_2, \ldots, F_n$) or facets that can produce a first image. The product 1085 also includes a second plurality of portions $P_{B1}$, $P_{B2}$, ... $P_{Bn}$ which produce a second image. The second plurality of portions $P_{B1}$, $P_{B2}$, ... $P_{Bn}$ which are illustrated in the bottom view of the product 1085 shown in FIG. 1J-10. As noted in FIG. 1J-10, the carrier can include a plurality of portions configured to produce at least a first image of a first object and a second image of the second product. The combined surface 1095 of the plurality of portion combined with the optical elements (e.g., lenses, mirrors or prisms) is illustrated in FIG. 1J-10. Various embodiments, can include a plurality of elongate cylindrical lenses or mirrors 1097 that extend over the multiple portions as depicted in FIG. 1J-11 instead of the plurality of optical elements 1090.

The surfaces of the optical features or facets can be slowly varying (e.g., sloped) such that the surface across some or all plurality of portions $P_{A1}$, $P_{A2}$, ... $P_{An}$ is substantially continuous as discussed above with reference to FIG. 1E. The product 1085 further comprises optical elements 1090 such as lenses, prisms or mirrors (e.g., curved mirrors) integrated (e.g., monolithically integrated) with the optical features or facets. The optical elements 1090 can include powered elements such as lenticular elements, microlenses, concave mirrors, cylindrically shaped concave mirrors, rotationally symmetric curved surfaces, elongate cylindrical surfaces, spherical or toroidal surfaces, prisms, diffractive features, etc. In some embodiments, the optical elements 1090 can be superimposed on the shape of the optical features or facets to form an aggregate surface which includes shape contribution from both the optical elements (e.g., lenses, prisms or mirrors) as well as the features and/or facets in the plurality of portions, as depicted in FIG. 1J-9. In the embodiment illustrated in FIG. 1J-10 the optical elements 1090 are superimposed on the first and the second plurality of portions. However, in some other embodiments, a first set of optical elements can be integrated with and/or superimposed on the optical features of the first plurality of portions and a second set of optical elements can be integrated with and/or superimposed on with the optical features of the second plurality of portions.

Embodiments in which the optical features of the first and the second plurality of portions are combined with optical elements (e.g., lenses, mirrors or prisms) have a first curvature/gradient that is configured to produce the desired first and/or the second image and a second curvature corresponding to the curvature of the optical elements 1090 configured to provide additional optical power, improve contrast ratio and/or diffusive effects. The optical elements 1090 can be superimposed on the surface of the optical features or facets on a side opposite the carrier 1050. In such embodiments, the exposed portions of the optical elements 1090 can include a reflective surface (e.g., metallized) to reflect light out of the carrier 1050. Accordingly, the optical element may comprise a mirror with optical power (e.g., a concave mirror). The reflective surface can be partially transmissive in some embodiments. In various embodiments, the mirror can comprise curved surfaces formed in a material having refractive index higher than refractive index of the surrounding material such that light is reflected due to total internal reflection.

To manufacture the product 1085 the aggregate surface profile which includes shape contribution from both the optical elements (e.g., lenses, prisms or mirrors) as well as the features and/or facets in the plurality of portions stored in a data file can be used to replicate the aggregate surface profile on a polymeric substrate. For example, the aggregate surface profile can be embossed into an UltraViolet (UV) curable resin coated onto various polymeric substrates, such as, for example, polyethylene terephthalate (PET), oriented polypropylene (OPP), low density polyethylene (LDPE), linear low density polyethylene (LLDPE), polypropylene (PP), polyvinyl chloride (PVC), polycarbonate (PC) or any other type of plastic film or carrier. For thermoformable plastics such as PVC and PC, the aggregate surface profile can be embossed directly into the substrate without the UV curable layer. This method can be used to manufacture the product 1085 on a large industrial scale Integrating on a single surface, the optical elements 1090 with the optical features or facets included in the plurality of portions $P_{An}$, $P_{Bn}$ can advantageously simplify manufacturing by removing the need to provide structures on 2-sides or surfaces of the carrier 1050. Accordingly, manufacturing costs can be reduced since only one side or surface of the carrier 1050 undergoes a process of replication (e.g., embossing) to provide optical features or facets. Additionally, since, the optical elements (e.g., lenses, prisms or mirrors) are integrated with the optical features or facets, for example in a data file, a separate process need not be required to separately register or align the optical elements (e.g., lenses, prisms or mirrors) with the optical features or facets. This can additionally improve ease of manufacturing and help reduce Moire effects due to misalignment between the optical elements (e.g., lenses, prisms or mirrors) and the corresponding optical features or facets. In some embodiments, the lenses or mirrors may be configured to provide additional optical power to the optical features or facets and/or provide diffusion effects. Integrating the optical elements (e.g., lenses, mirrors or prisms) with the optical features or facets can further provide directional reflection which can help in steering images formed by the different plurality of portions in the desired direction.

The optical products similar to product 1085 include macro features (e.g., features $F_1$, $F_2$, ..., $F_n$) that are configured to produce an image of a 3D object superimposed with micro features (e.g., microlenses, lenticular elements, prisms, mirrors). As discussed above, these optical products can be configured to provide switching between different images. In some embodiments, the micro features can also comprise diffractive features that can increase contrast. The optical products including macro features (e.g., features $F_1$, $F_2$, ..., $F_n$) that are configured to produce an image of a 3D object combined with micro features (e.g., microlenses, lenticular elements, prisms, mirrors) can be manufactured using a replication process (e.g., embossing). The micro features superimposed on the macro features can be substantially achromatic. For example, the combined macro and micro features can provide no diffractive or interference color (e.g., no wavelength dispersion or rainbows or rainbow effects). In some cases, the the combined macro and micro features can be colored. For example, the non-holographic features can comprise a tint, an ink, dye, or pigment where absorption can provide color. As discussed above, the macro features and the micro features can be integrated together and a combined surface profile can be stored in a data file which can be used to replicate the combined surface profile on the optical product. The optical product including the combined surface profile can be applied to a surface of a product using different technologies including but not limited to hot stamping, cold foil, lamination and transfer or any other technology.

As described above, in certain embodiments, the optical product 10' can provide a stereoscopic view or a 3D effect. For example, the first and second portions can correspond to portions of a right side and left side view of the 3D object respectively. In some such embodiments, the lenses in the array of lenses, array of prisms, array or curved mirrors or array of mirrors (and the first and second portions) can have a longitudinal axis disposed in the vertical direction (e.g., cylindrical lenses or mirrors with more curvature in the horizontal direction). When tilting the device about the longitudinal axis of the lenses, the array of lenses, prisms or mirrors can be configured to present the right and left side views of the object for a stereoscopic view of the object. As disclosed herein, the first and second portions can include the optical features $F_1$, $F_2$, ... $F_n$ or elements $E_1$, $E_2$, ..., $E_n$ described herein. In various embodiments, the optical product 10' can further comprise more than two portions disposed under the array of lenses or mirrors. These additional portions can correspond to portions of one or more additional side views of the image (e.g., 3, 4, 5, 6, 7, 8, 9, 10, 15, 17, 20, etc). For example, the views of the object can include images as seen from 0 degrees, 5 degrees, 10 degrees, 15 degrees, 20 degrees, 30 degrees, 40 degrees, 45 degrees, 50 degrees, 60 degrees, 70 degrees, etc. with respect to the front forward direction of the object. These additional side views can include different perspectives of the object as if rotating about the object.

A first plurality of portions $P_A$ and/or a second plurality of portions $P_B$ can have a length l (along the y-axis), width w (along the x-axis), and thickness t (along the z-axis). The length l, width w, and thickness t are not particularly limited, and can be based on the application. In various embodiments, the first plurality of portions $P_A$ and/or the second plurality of portions $P_B$ can include multiple portions (e.g., $P_{A1}$, $P_{A2}$, ... $P_{An}$ and/or $P_{B1}$, $P_{B2}$, ... $P_{Bn}$ respectively) long the length l. In some embodiments, the width w of a first plurality of portions $P_A$ and/or a second plurality of portions $P_B$ can be based on the size of the lenses in the array 1025 (e.g., approximately half of the pitch of the lens) or vice versa.

In various embodiments, the array 1025 of lenses can be disposed on a first side 1051 of a substrate or carrier 1050. The first plurality of portions $P_A$ and/or a second plurality of portions $P_B$ can be disposed on the second side 1052 opposite the first side 1051 of the substrate 1050. The first plurality of portions $P_A$ and/or the second plurality of portions $P_B$ can include the optical features $F_1$, $F_2$ or elements $E_1$, $E_2$, ..., $E_n$ as described herein.

After the product 1000 is formed, some such products 1000 can be incorporated into a banknote having a paper thickness from 90 microns to 110 microns (e.g., 90 microns, 95 microns, 98 microns, 100 microns, 105 microns, 107 microns, etc.), or any range within this range (e.g., 90 microns to 105 microns, 95 microns to 105 microns, etc.). The product 1000 can be formed into security threads in banknotes. A security thread can be a polymeric film interwoven into the banknote paper as it is being made such that portions of it are visible at the surface and some portions are not. The product 1000 can be a hot stamp feature, an embedded feature, a windowed feature, or a laminated feature. A hot stamp feature can be transferred to a banknote surface using a release substrate upon which may be located a security feature, e.g., a hologram, using heated die and pressure. A patch is generally hot stamped to a banknote surface. An embedded feature can be affixed within a depression, e.g., formed during the paper making process, in the banknote. In some embodiments, this feature can keep the banknote surface flat. A windowed feature can allow one to view the product in transmission. A windowed feature can include a security thread interwoven into the banknote paper. A laminated feature can be affixed to the surface of the banknote by means of an adhesive. A laminated strip can include a flat polymer film with built in optical security devices. This flat polymer film can be attached to a banknote across its width (e.g., narrow dimension) using adhesive on the banknote surface. In some embodiments, the product 1000 can be configured to provide authenticity verification on an item of security (e.g., currency, a credit card, a debit card, a passport, a driver's license, an identification card, a document, a tamper evident container or packaging, or a bottle of pharmaceuticals).

It is contemplated that other variations are also possible. For example, in various implementations, the first and the second set of optical features $F_1$ and $F_2$ can be superimposed or interspersed within a portion such that they overlap with each other in the portion. Such an embodiment is illustrated in FIGS. 1K-1 and 1K-2 which schematically illustrate a top view of an embodiment of an optical object 10' that comprises three portions $P_1$, $P_2$, and $P_3$. Each portion $P_1$-$P_3$ in the group shown comprises a first set of optical features $F_1$ configured to produce a first distinct image when viewed from a first direction and a second set of optical features $F_2$ that are configured to produce a second distinct image when viewed from a second direction.

Various methods can be used to manufacture the master 10 for fabricating an optical product 10'. An example method 100 is shown in FIG. 2. As shown in operational block 110, the method 100 can include providing a data file, e.g., a 2D data file, configured to describe, characterize, and/or record features the 3D object and/or 3D image 50'. The data file can provide the pattern of the features $F_1, F_2, \ldots F_n$ on the surface 12 of the master 10.

For example, the data file can comprise a plurality of portions (as will be described further herein). Each portion can correspond to one or more points on a surface S of the 3D object 50. Each portion can comprise features of intensity corresponding to non-holographic elements on the optical product 10'. A gradient in intensity can correlate to an inclination of the surface S of the 3D object 50 at the one or more corresponding points. In addition, an orientation of the features can correlate to an orientation of the surface S of the 3D object 50 at the one or more corresponding points. As shown in operational block 120, the method 100 can further include manufacturing the master 10 based at least in part on the 2D data file.

Figure 2:
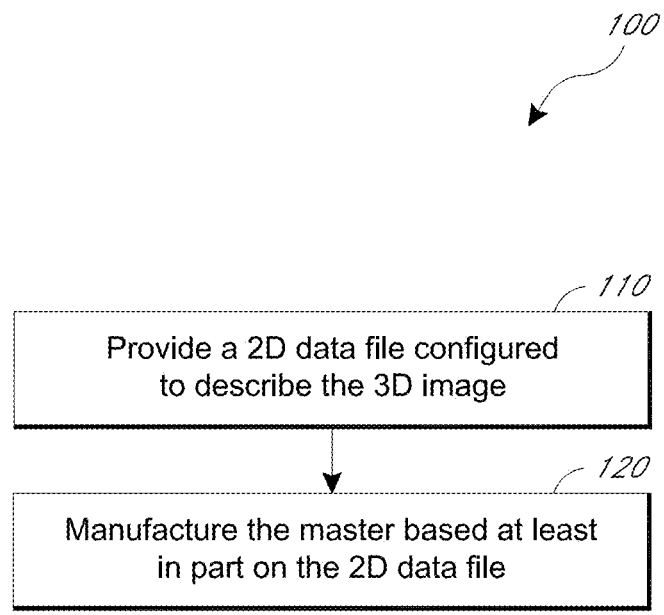
Figure 2A:
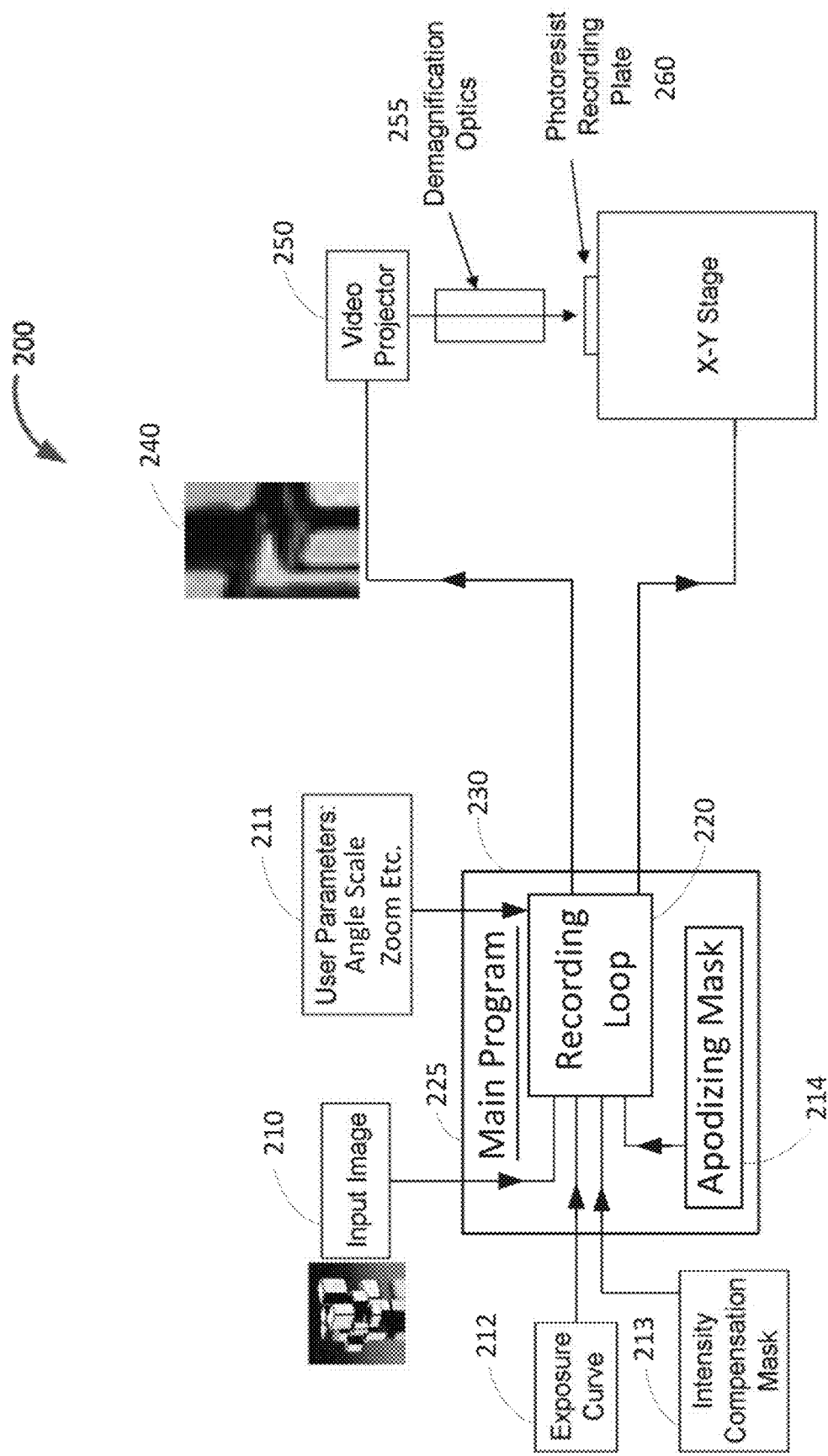
FIG. 2A illustrates an example method that can be used to manufacture a surface relief diffuser.

As described herein, certain embodiments of the optical product 10' can produce a bright, mirror-like image. In some implementations, a matte finish may be desired. FIG. 2A illustrates an example method that can be used to manufacture a surface relief diffuser and also to determine a height displacement file used to manufacture the diffuser. In the method 200 shown in FIG. 2A, an input image 210 of the 3D object 50 (e.g., a 2D photograph of the 3D object) is entered into the recording loop 220 of the main program 225 of the processor 230. Other information, such as user parameters 211 (e.g., angle, scale, zoom, etc.), exposure compensation curve 212, intensity compensation mask 213, and apodizing mask 214 can also be entered into the recording loop 220. The processor 230 can produce a height displacement file 240 that is configured to describe the intensities of the 3D object 50. This height displacement file 240 can be used as a map to generate the pattern of the diffuser. In some examples of the height displacement file 240, the intensities of the 3D object can be correlated to a depth for the diffuser. For example, the black sections of the 3D object 50 can correlate to the surface of the diffuser, white sections of the 3D object 50 can correlate to a lower depth (e.g., down 10 µm), and grey sections of the 3D object 50 can correlate to some depth in between. Other variations are possible.

In the example method 200 shown in FIG. 2A, a digital micromirror device (DMD) video projector 250 can be used along with the photoresist recording plate 260, each receiving the inputted information from the recording loop 220. The DMD video projector 250 includes a DMD chip that includes a plurality of micromirrors that in certain embodiments can correspond to the pixels of the height displacement file 240. The pixels of the height displacement file 240 can also correspond to the regions on the X-Y stage of the photoresist recording plate 260 in some embodiments. Each micromirror of the DMD chip can be used as a spatial light modulator that, for example, reflects light from a light source in the video projector 250 in the on-state, and that does not reflect light in the off-state. Varying the amount of light intensity can be produced by varying the time the micromirror is in the on- and off-states (e.g., pulse width modulation, etc.). As shown in FIG. 2A, demagnification optics 255 can be used to produce the pattern of the diffuser in a light sensitive material, e.g., a photoresist, on the resist recording plate 260. In some embodiments, the resist can be used as the diffuser. As disclosed herein, other techniques, such as electron beam lithography on electron sensitive material and ion beam lithography on ion sensitive material can also be used. Certain embodiments of the diffuser can be used with certain embodiments of the optical product 10' to produce a diffuse or hazy layer over the reflected image 50' to produce an image with a matte finish.

Figure 2B:
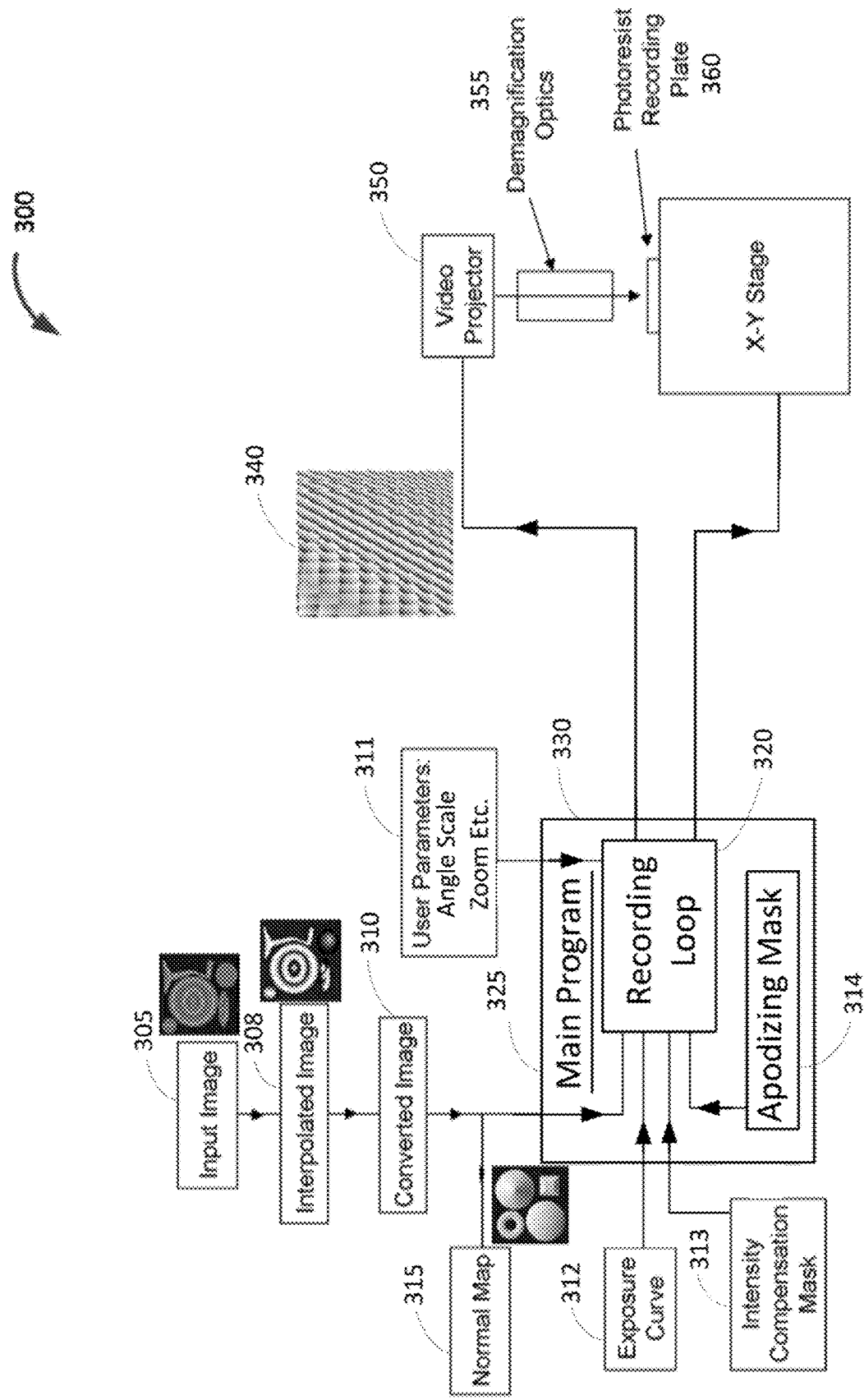
FIGS. 2B-2C illustrate example methods to manufacture a master for fabricating an optical product in accordance with certain embodiments described herein.

FIG. 2B illustrates an example method that can be used to manufacture the master 10 and also to determine the data file to be used to manufacture the master 10, e.g., to determine the pattern of the features $F_1, F_2, \ldots F_n$ on the surface 12 of the master 10. Certain such embodiments can be advantageous as a 3D physical object and/or a 3D model utilizing physical dimensions of the 3D object (e.g., topographical calculations) are not required. For example, in the method 300 shown in FIG. 2B, the input image 305 can be a 2D input image (e.g., a 2D photograph of the 3D object) or 2D image converted from a 3D image. In some embodiments, the input image 305 can be converted into a 2D interpolated image 308 and produced as a 2D converted image 310. The 2D image of the 3D object can be translated into a gray scale image (e.g., a normal map 315 wherein black, white, and gray regions correlate to different heights of the 3D object). In the method 300 shown in FIG. 2B, the converted image 310 (or a normal map 315) is entered into the recording loop 320 of the main program 325 of the processor 330 in accordance with certain embodiments described herein. Similar to the method 200 in FIG. 2A, other information, such as user parameters 311 (e.g., angle, scale, zoom, etc.), exposure compensation curve 312, intensity compensation mask 313, and apodizing mask 314 can also be entered into the recording loop 320. The processor 330 can produce a data file 340, e.g., a 2D data file, that is configured to describe the 3D image 50' of at least a part of the 3D object 50. In some embodiments, the intensities in the data file 340 can be assigned based on gray scale. For example, the data file 340 can comprise a plurality of portions. Each portion can correspond to one or more points on a surface S of the 3D object 50. Each portion can comprise features of intensity corresponding to non-holographic elements on the optical product 10'. A gradient in intensity can correlate to a gradient or an inclination of the surface S of the 3D object 50 at the one or more corresponding points. In addition, an orientation of the features can correlate to an orientation of the surface S of the 3D object 50 at the one or more corresponding points. This data file 340 can be used as a map to generate the pattern of features $F_1, F_2, \ldots F_n$ on the surface 12 of the master 10. An example data file is discussed with respect to FIG. 3A.

Similar to method 200 in FIG. 2A, a digital micromirror device (DMD) video projector 350 can be used along with the photoresist recording plate 360, each receiving the inputted information from the recording loop 320. The plurality of micromirrors in the DMD video projector 350 in certain embodiments can correspond to the pixels of the data file 240. The pixels of the data file 340 can also correspond to one or more portions $P_1, P_2, \ldots P_n$ of the surface 12 of the master 10 in some embodiments. As shown in FIG. 2B, the demagnification optics 355 can be used to produce the pattern of features $F_1, F_2, \ldots F_n$ in a light sensitive material, e.g., a photoresist, on the resist recording plate 360. In some embodiments, the resist can be used as the surface 12 of the master 10. As disclosed herein, other techniques, such as electron beam lithography on electron sensitive material and ion beam lithography on ion sensitive material can also be used.

In some embodiments, the method 300 can further include adding on the master 10 features corresponding to holographic elements on the optical product 10'. For example, an optical recording (e.g., a planar optical recording) for the holographic elements can be superimposed onto the master 10 to add the holographic elements on the master 10. As another example, in some embodiments, the data file 340 can include features corresponding to holographic elements on the optical product 10'. In other embodiments, a separate data file comprising the features of intensity corresponding to holographic elements on the optical product 10' can be provided. Manufacturing the master 10 can be based at least in part on the data file 340 including features corresponding to non-holographic elements and on the data file including features corresponding to holographic elements on. In some such embodiments, the data file 340 including the features corresponding to non-holographic elements and the data file including the features corresponding to holographic elements can be used sequentially or simultaneously to manufacture the master 10. In some other embodiments, a needle, such as from an atomic force microscope, can be used to produce the features corresponding to the holographic elements on the optical product 10'. Other methods can be employed to add holographic features or elements.

Figure 2C:
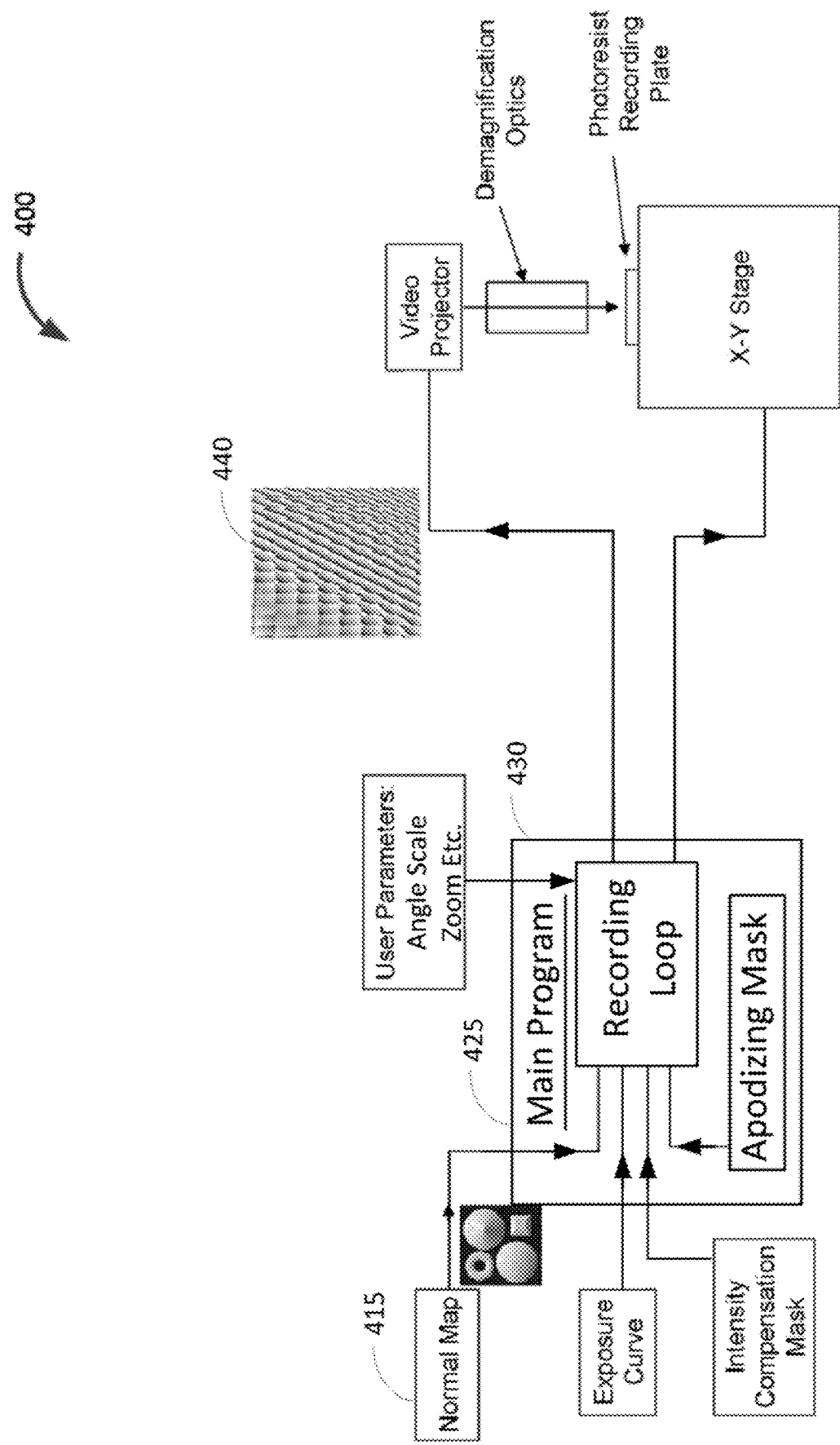

FIG. 2C illustrates yet another example method that can be used to determine the pattern of the features $F_1, F_2, \ldots F_n$ on the surface 12 of the master 10. The method 400 shown in FIG. 2C is similar to the method 300 shown in FIG. 2B except that a normal map 415 can be provided instead of the input image 310. The normal map 415 can be inputted into the main program 425 of the processor 430 to produce the data file 440.

Figure 3A:
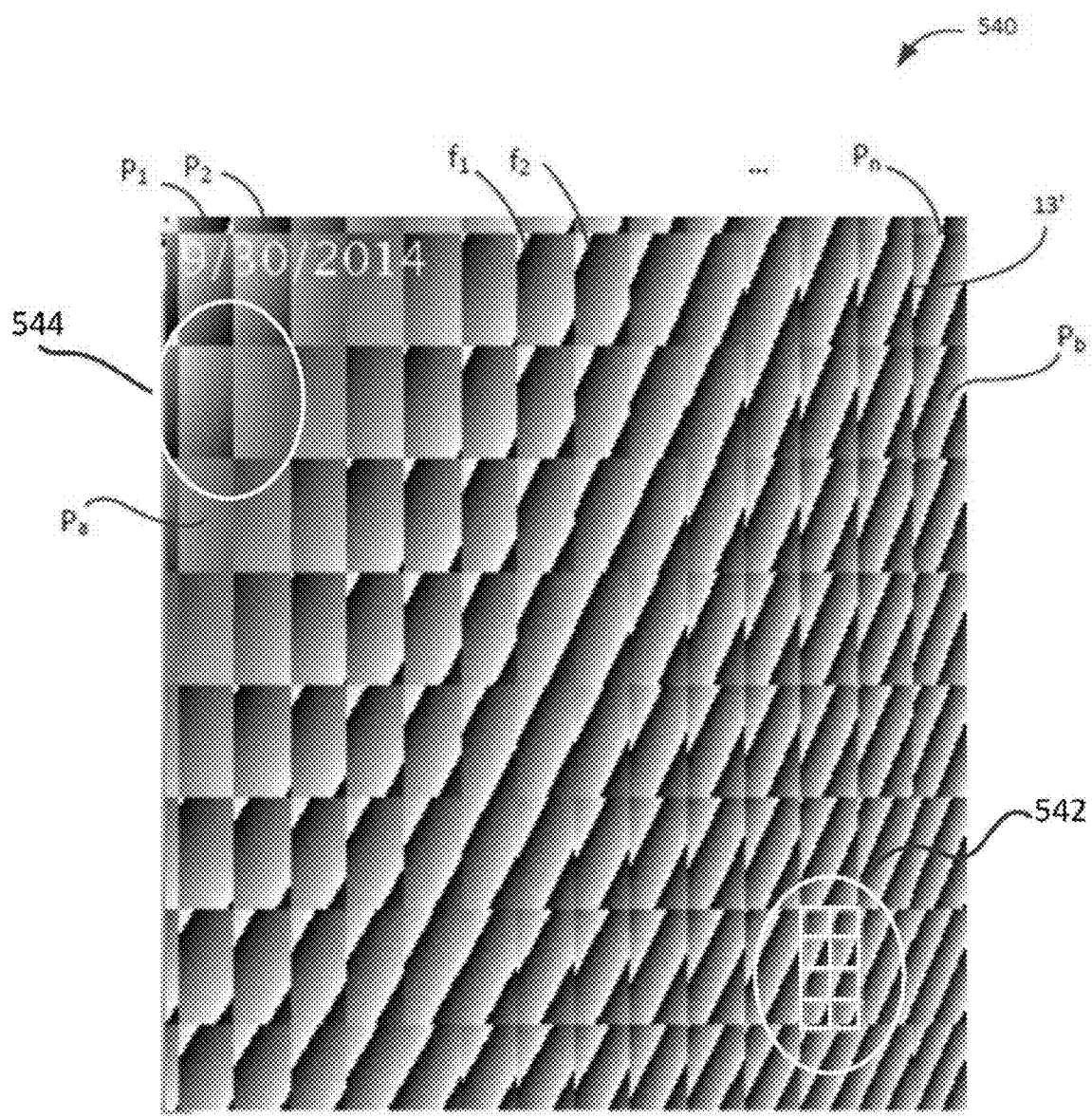
FIGS. 3A-3B illustrate example 2D data files in accordance with certain embodiments disclosed herein.

FIG. 3A illustrates an example 2D data file 540 in accordance with certain embodiments disclosed herein. The data file 540 can include a plurality of portions $p_1, p_2, \ldots p_n$. In some embodiments, the plurality of portions $p_1, p_2, \ldots p_n$ can form a single cell (e.g., a mono-cell). In other embodiments, as shown in FIG. 3A, the plurality of portions $p_1, p_2, \ldots p_n$ can form a plurality of cells. In various embodiments, the portions $p_1, p_2, \ldots p_n$ can form a pixelated surface corresponding to the portions $P_1, P_2, \ldots P_n$ of the surface 12 of the master 10. For example, as shown in FIG. 3A, the portions $p_1, p_2, \ldots p_n$ can include a plurality of rows and columns.

Figure 3B:
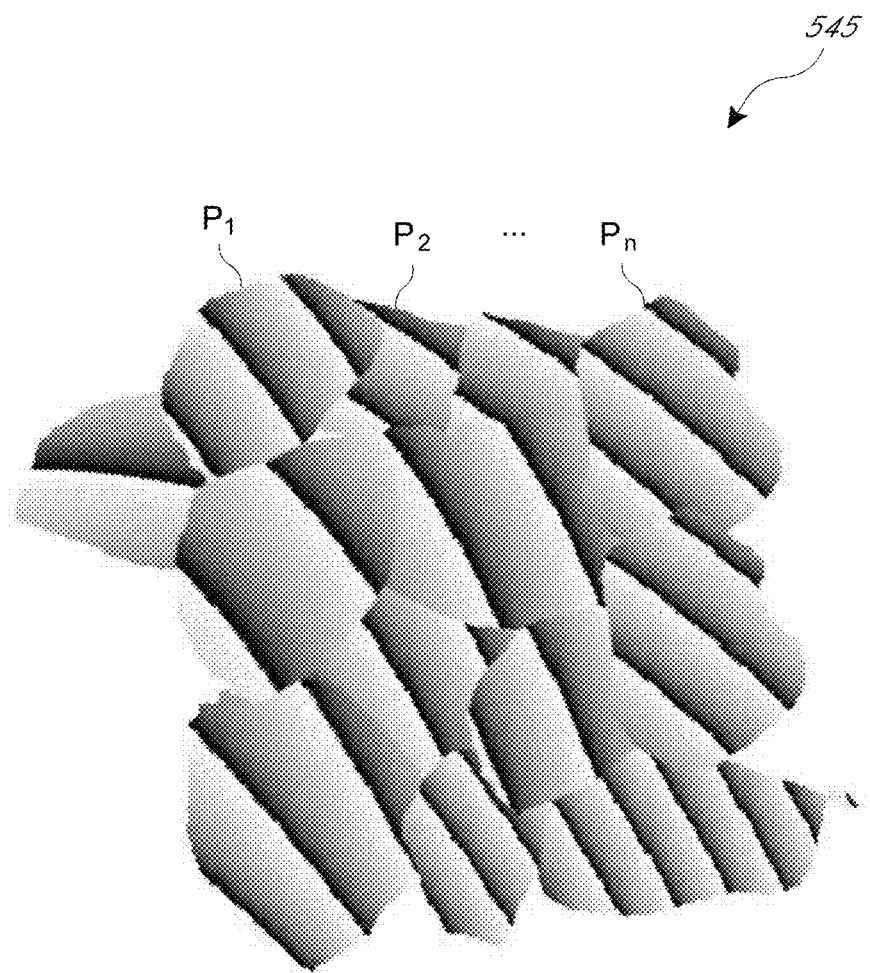

As also shown in FIG. 3A, in some embodiments, borders 13' can surround at least part of the portions $p_1, p_2, \ldots p_n$. The borders 13' can substantially surround a portion $p_n$ or can surround just part of a portion $p_n$. As with the master 10, the size and shape of the portions $p_1, p_2, \ldots p_n$ on the data file 540 are not particularly limited. Some of the portions $p_1, p_2, \ldots p_n$ can comprise a symmetrical shape. For example, the symmetrical shape can include a rectangle, a square, a rhombus, an equilateral triangle, an isosceles triangle, a regular polygon (e.g., a regular pentagon, a regular hexagon, a regular octagon), etc. The shape can also include curvature, e.g., a circle, an ellipse, etc. In other embodiments, some of the portions $p_1, p_2, \ldots p_n$ can comprise a non-symmetrical shape, e.g., a non-rotationally symmetrical shape, and/or an irregular shape. For example, FIG. 3B illustrates an example embodiment of a data file 545 with irregularly shaped portions $p_1, p_2, \ldots p_n$. In some embodiments, some of the portions $p_1, p_2, \ldots p_n$ can have a shape that is substantially the same as other portions $p_1, p_2, \ldots p_n$. In other embodiments, e.g., as shown in FIG. 3B, some of the portions $p_1, p_2, \ldots p_n$ can have a shape that is different from other portions $p_1, p_2, \ldots p_n$.

As with the master 10, the arrangement of the portions $p_1, p_2, \ldots p_n$ in the data file 540 is not particularly limited. For example, whether with or without borders, whether symmetrically shaped or non-symmetrically shaped, or whether regularly or irregularly shaped, the portions $p_1, p_2, \ldots p_n$ can form a periodic array. For example, in FIG. 3A, the portions $p_1, p_2, \ldots p_n$ form a periodic array. In other embodiments, whether with or without borders, whether symmetrically shaped or non-symmetrically shaped, or whether regularly or irregularly shaped, the portions $p_1, p_2, \ldots p_n$ can form an aperiodic array. For example, in FIG. 3B, the portions $p_1, p_2, \ldots p_n$ form an aperiodic array. In yet other embodiments, the portions $p_1, p_2, \ldots p_n$ can form a combination of periodic and aperiodic arrays.

With continued reference to FIG. 3A, each portion $p_n$ can include features $f_1, f_2, \ldots f_n$ that correspond to features $F_1, F_2, \ldots F_n$ on the surface 12 of the master 10. Portion $p_a$ has a single feature $f_1$, while portion $p_b$ has multiple features $f_n$. The features $f_1, f_2, \ldots f_n$ of the data file 540 can include features of intensity (varying dark and light lines). In some embodiments, the intensity can correlate to the height of a feature on the surface S of the 3D object 50.

In various embodiments, a lateral distance between two features can be defined in some embodiments as a pitch. In some embodiments, the pitch between features within a portion $p_n$ can be substantially the same within the portion $p_n$. For example, in various embodiments, in portion $p_1$ of the portions $p_1, p_2, \ldots p_n$, the feature $f_1$ can comprise a plurality of features that form a periodic array such that the pitch is substantially the same within portion $p_1$. In addition, in some embodiments, the features $f_1, f_2, \ldots f_n$ among multiple portions $p_1, p_2, \ldots p_n$, can form a periodic array such that the pitch is substantially the same among multiple portions $p_1, p_2, \ldots p_n$.

In other embodiments, the features can form an aperiodic array such that the pitch may be different among multiple portions $p_1, p_2, \ldots p_n$. However, although the pitch may be different for different portions $p_1, p_2, \ldots p_n$, in some embodiments, the pitch can be slowly varying (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance) among the portions $p_1, p_2, \ldots p_n$. In some embodiments, the pitch may uniformly change across multiple portions $p_1, p_2, \ldots p_n$.

In other embodiments, the features could be chirped within a portion $p_n$ such that the pitch may be different within the portion $p_n$. In some such embodiments, the pitch within the portion $p_n$ may slowly vary (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance).

FIG. 3A shows an example data file 540 with linear features where the pitch is substantially uniform within a portion $p_n$, and FIG. 3B shows an example data file 545 with curved features where the pitch is substantially uniform within a portion $p_n$. FIG. 3A is also an example of features having a pitch that slowly changes (e.g., less than 10% change per lateral distance) across multiple portions $p_1$, $p_2$, $p_n$.

In various embodiments, each feature of intensity can include a slope. Various embodiments can advantageously have a uniform gradient (e.g., uniform slope) within each portion $p_n$ such that the gradient is a single value (e.g., a single polar angle $\theta_n$) at the corresponding point $S_n$ on the surface S of the 3D object 50. The gradient in the features $f_1$, $f_2$, ... $f_n$ can correlate to an inclination of the surface S of the 3D object 50 at the corresponding point $S_1$, $S_2$, ... $S_n$. In other embodiments, the feature $f_n$ within a portion $p_n$ includes a plurality of features, and the features within the portion $p_n$ may have more than one gradient (e.g., different slopes). In such embodiments, the average gradient (e.g., average slope) of the features within the portion $p_n$ can correlate to the inclination of the surface S of the 3D object 50 at the corresponding point $S_n$.

Various embodiments can also advantageously have a uniform orientation within each portion $p_n$, such that the orientation is a single value (e.g., a single azimuth angle $\varphi_n$) at the corresponding point $S_n$ on the surface S of the 3D object 50. In various embodiments, the orientation of features $f_1$, $f_2$, ... $f_n$ can correlate to an orientation of the surface S of the 3D object 50 at the corresponding point $S_1$, $S_2$, ... $S_n$. In other embodiments, the feature $f_n$ within a portion $p_n$ includes a plurality of features, and the features within the portion $p_n$ may have more than one orientation (e.g., different orientations). In such embodiments, the average orientation of the features within the portion $p_n$ can correlate to the orientation of the surface S of the 3D object 50 at the corresponding point $S_n$. Furthermore, the orientation of the features within and among the portions $p_1$, $p_2$, ... $p_n$, can slowly vary (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance) within and among the portions $p_1$, $p_2$, ... $p_n$.

In various embodiments, the portions $p_1$, $p_2$, ... $p_n$ can be configured as mesh free cell structures wherein, the size of the portions $p_1$, $p_2$, ... $p_n$ can be correlated to the gradient of the features in each portion $p_1$, $p_2$, ... $p_n$ and/or the pitch of the features in each portion $p_1$, $p_2$, ... $p_n$. For example the size of the portions $p_1$, $p_2$, ... $p_n$ in the region 542 depicted in FIG. 3A which has features with steeper gradients can be smaller than the size of the portion $p_1$, $p_2$, ... $p_n$ in the region 544 which has features with shallower gradients. In such embodiments, the characteristics of lens elements that are registered or on average registered with the portions $p_1$, $p_2$, ... $p_n$ (e.g., the aperture size or width of the lens/mirror/prism elements, height, radius of curvature, surface curvature, center-to-center spacing between adjacent lenses, etc.) can be also be varied such that they lenses/prisms/mirrors are aligned with the respective portions $p_1$, $p_2$, ... $p_n$. For example, the center-to-center distance between adjacent lenses/prisms/mirrors that are registered or on average registered with portions having optical features with steeper gradients can be smaller than distance between adjacent lenses that are registered with portions having optical features with shallower gradients. The size of the lens/prism/mirror may be related to the size of the portions with which the lens is registered. Consequently the location of the smaller sized lens/prism/mirror may coincide with or track the location of the smaller sized portion. The size of the lens/prism/mirror may be correlated with steepness/shallowness of the recorded object. For example, if the recorded object has a steep surface, then the size of the lens/prism/mirror configured to reproduce an image of the steep surface can be small. As another example, if the recorded object has a shallow surface, then the size of the lens/prism/mirror configured to reproduce an image of the shallow surface can be large.

In some embodiments, where a feature $f_1$ includes multiple features within a portion, the features can appear discontinuous with other features within the portion. In some embodiments where the surface 12 of the master 10 is pixelated (e.g., having a plurality of cells), the features $f_1$, $f_2$, ... $f_n$ can appear discontinuous with features in surrounding adjacent portions. Based on pixel or cell size and/or tolerances in creating the data file 540, some embodiments may include random discontinuities with substantially no (relatively little if any) negative impact in image reproduction. Such discontinuity can reduce iridescence. In other embodiments, the portions $p_1$, $p_2$, ... $p_n$ can form a single cell or a mono-cell. In some such embodiments, the features $f_1$, $f_2$, ... $f_n$ can appear continuous and smoothly varying depending on the shape. In other such embodiments, the features $f_1$, $f_2$, ... $f_n$ can appear discontinuous due to discontinuities in the 3D object 50.

Figure 3C:
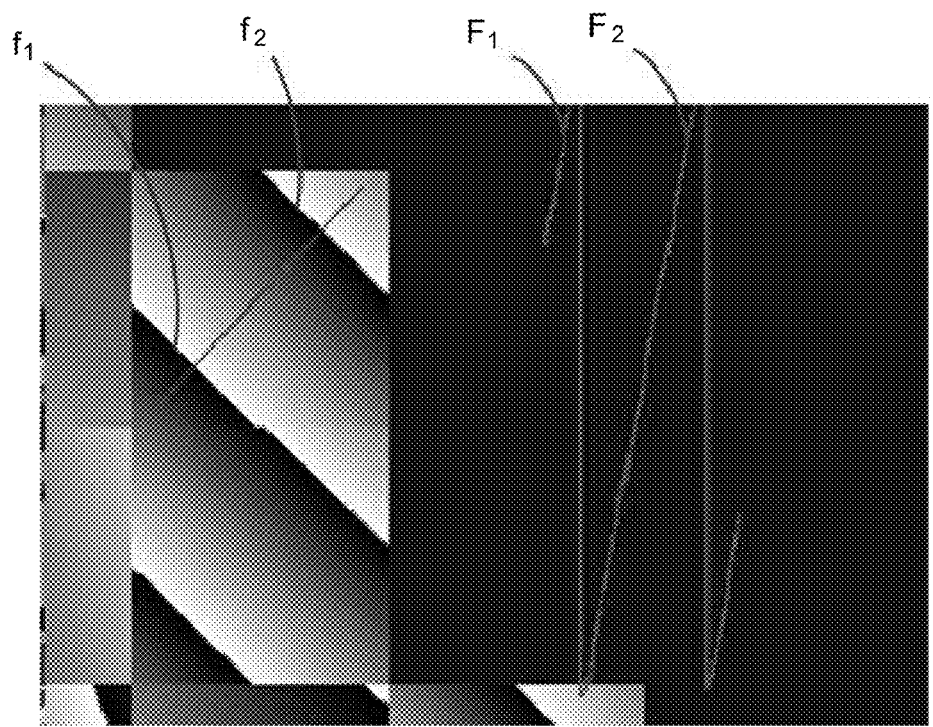
FIGS. 3C-3D illustrate example features on a data file and the corresponding features on the surface of a master for fabricating an optical product in accordance with certain embodiments disclosed herein.

In some embodiments, as shown in FIG. 3C, the features $f_1$, $f_2$, ... $f_n$ can comprise linear features corresponding to a substantially smooth region of the surface S of the 3D object 50. The features $f_1$, $f_2$, ... $f_n$ can be used to produce linear features $F_1$, $F_2$, ... $F_n$ on the surface 12 of the master 10. The features $f_1$, $f_2$, ... $f_n$ can also be used to produce non-linear features $F_1$, $F_2$, ... $F_n$ on the surface 12 of the master 10. In some embodiments, features $f_1$, $f_2$, ... $f_n$ that are linear can be used to correspond to a curved region of the surface S of the 3D object 50. In some such embodiments, linear features $f_1$, $f_2$, ... $f_n$ in the data file can be used to represent a curved region by using a piecewise approximation function.

Figure 3D:
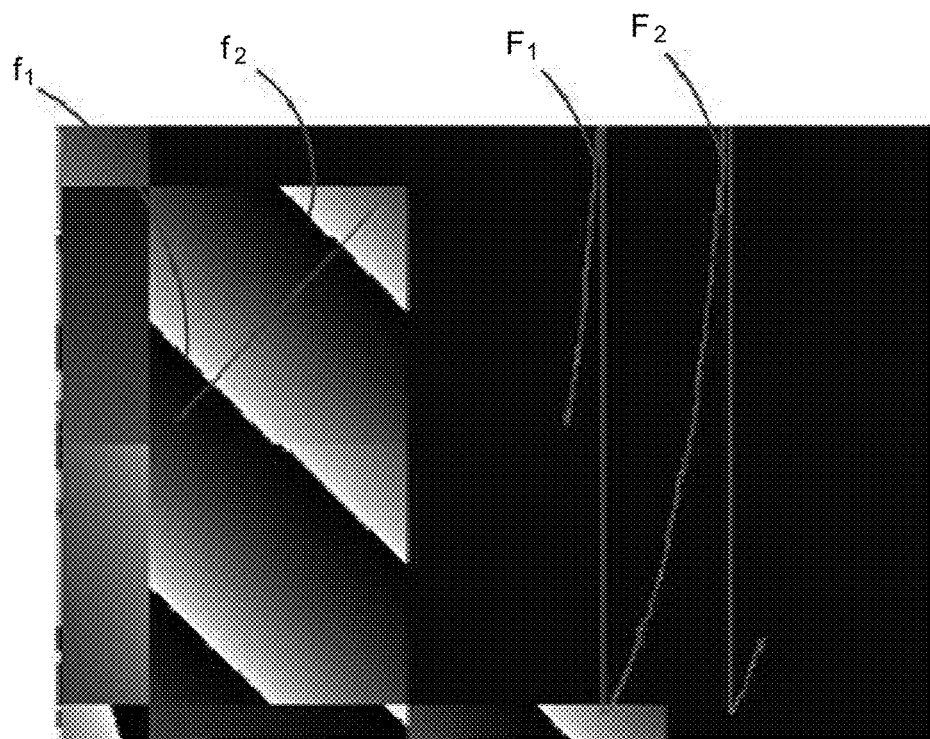

As shown in FIG. 3D, in some embodiments, although linear features $f_1$, $f_2$, ... $f_n$ in the data file can correspond to a substantially smooth region of the surface S of the 3D object 50, non-linear features on the master 10 (e.g., curved facets shown in left profile) can be used. As described herein, in some such embodiments, non-linear features on the master 10 can be used to produce elements $E_1$, $E_2$, ... $E_n$ on an optical product 10' that can appear smooth because the corresponding features on the optical product 10' can be relatively small (e.g., between 1 μm and 100 μm, between 1 μm and 75 μm, between 1 μm and 50 μm, or between 1 μm and 25 μm).

As the features $f_1$, $f_2$, ... $f_n$ of the data file 540 correspond to aspects of the surface S of the 3D object 50, the features $f_1$, $f_2$, ... $f_n$ of the data file 540 can be used to produce the features $F_1$, $F_2$, ... $F_n$ on the surface 12 of the master 10. As described herein, the features $F_1$, $F_2$, ... $F_n$ on the surface 12 of the master 10 can be used to fabricate the elements $E_1$, $E_2$, ... $E_n$ on the surface 12' of the optical product 10'. As described herein, in various embodiments, the elements $E_1$, $E_2$, ... $E_n$ on the optical product 10' can be non-holographic.

For example, the elements $E_1, E_2, \ldots E_n$ do not need to rely on holography to render a 3D image 50' of the 3D object 50.

Figure 4A:
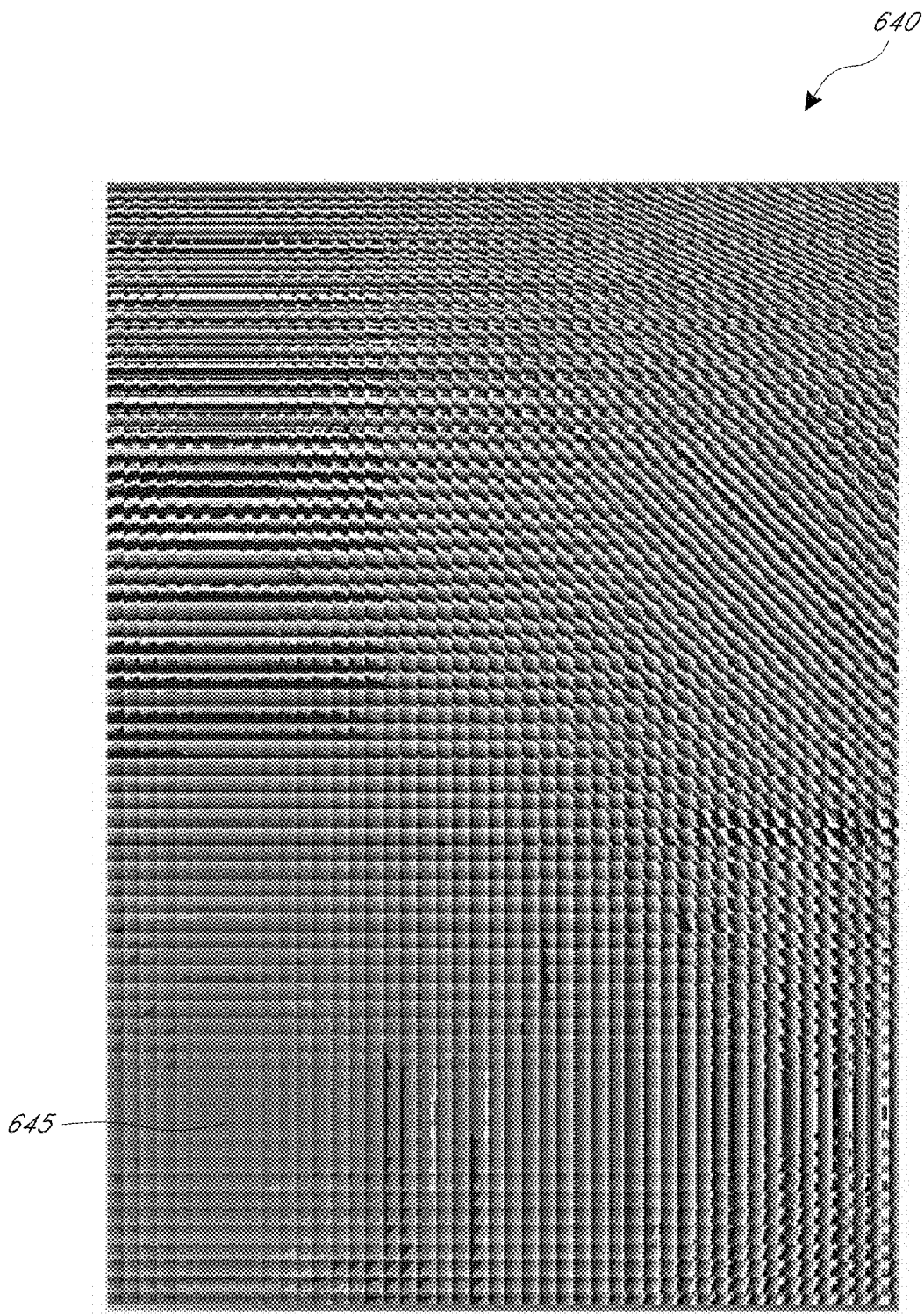
FIG. 4A illustrates another example 2D data file in accordance with certain embodiments disclosed herein.
Figure 4B:
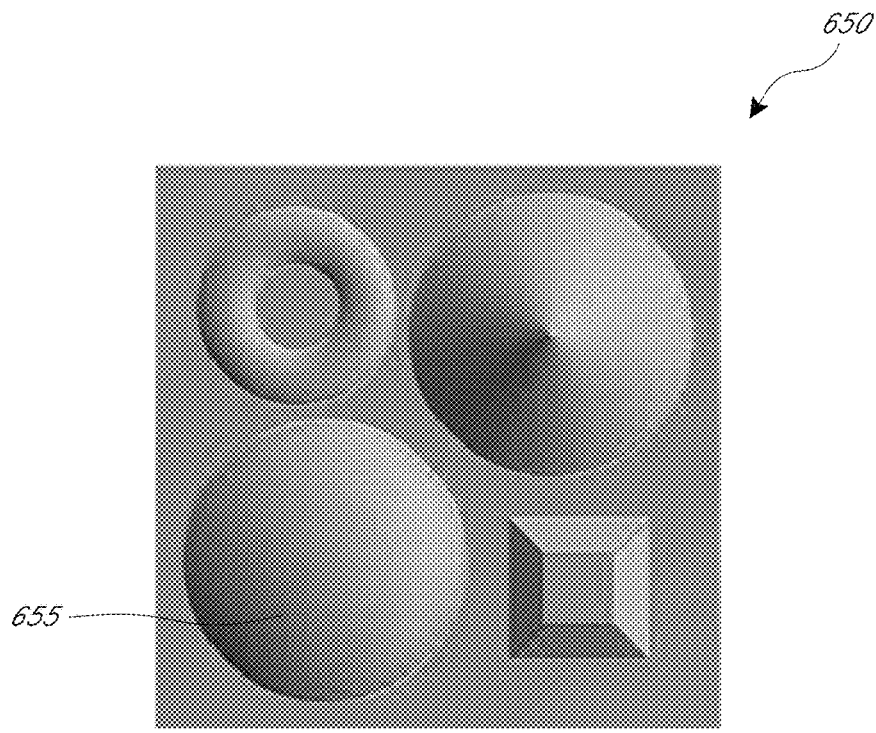
FIG. 4B illustrates an example normal map used to generate the data file shown in FIG. 4A.
Figure 4C:
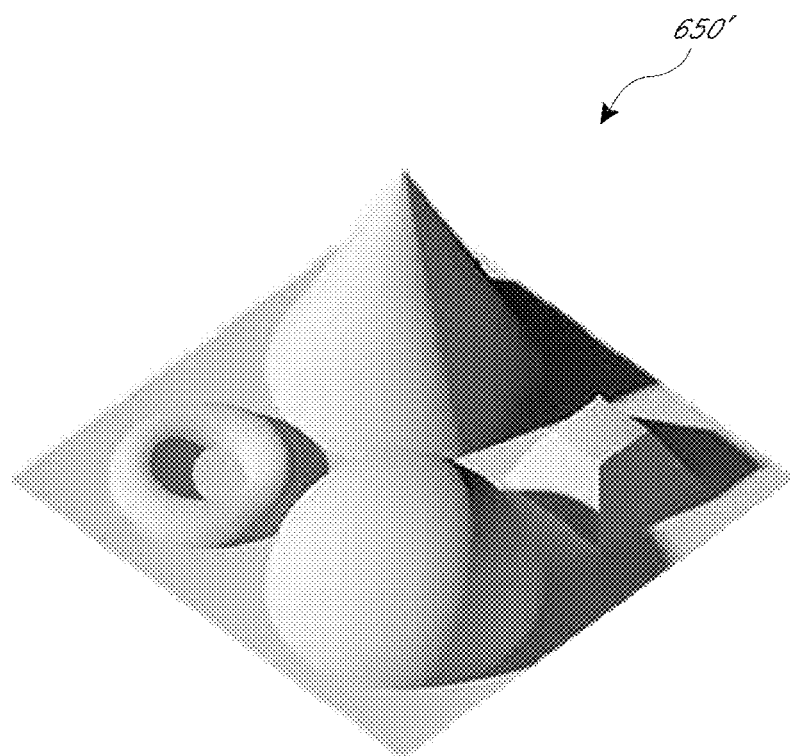
FIG. 4C illustrates the 3D image reproduced by an optical product generated from a master produced using the data file shown in FIG. 4A.

FIG. 4A is another example 2D data file 640 prepared in accordance with certain embodiments described herein. The data file 640 was generated by the normal map 650 shown in FIG. 4B. As an example, the lower left portion 645 of the data file 640 represents the center of the hemispherical object 655 in the lower left portion of the normal map 650. The data file 640 was used to generate the features $F_1, F_2, \ldots F_n$ on the surface 12 of a master 10, which was used to fabricate the elements $E_1, E_2, \ldots E_n$ on the surface 12' of an optical product 10'. The optical product 10' was configured, when illuminated, to reproduce by reflected light, the 3D image 650' shown in FIG. 4C.

In certain embodiments, an optical product 10' is also disclosed herein. As described herein, the optical product 10' can be configured, when illuminated, to reproduce by reflected light, a 3D image 50' of at least a part of a 3D object 50. As shown in FIG. 1A, similar to the master 10, the optical product 10' can include a surface 12' comprising a plurality of portions $P'_1, P'_2, \ldots P'_n$. Each portion $P'_n$ can correspond to a point $S_n$ on a surface S of the 3D object 50. Each portion $P'_n$ can comprise features, e.g., non-holographic elements $E_1, E_2, \ldots E_n$. In certain embodiments, the non-holographic elements $E_1, E_2, \ldots E_n$ can be configured to produce at least part of the 3D image 50' without relying on diffraction. In various embodiments, the portions $P'_1, P'_2, \ldots P'_n$ can form a single cell (e.g., a mono-cell). In other embodiments, the portions $P'_1, P'_2, \ldots P'_n$ can form a plurality of cells. Each portion $P'_n$ can form a cell of the plurality of cells. The optical product 10' can include borders surrounding at least part of the portions $P'_1, P'_2, \ldots P'_n$.

A gradient (e.g., uniform slope or average slope) in the non-holographic features $E_1, E_2, \ldots E_n$ can correlate to an inclination of the surface S of the 3D object 50 at the corresponding point $S_1, S_2, \ldots S_n$. In addition, the orientation (e.g., uniform orientation or average orientation) of the non-holographic features $E_1, E_2, \ldots E_n$ can correlate to an orientation of the surface S of the 3D object 50 at the corresponding point $S_1, S_2, \ldots S_n$.

Furthermore, since the master 10 can be used to fabricate an optical product 10', aspects disclosed herein with reference to the master 10 can apply to certain embodiments of the optical product 10'. For example, disclosure with respect to the shapes (e.g., symmetrical, non-symmetrical, irregular, curved, etc.) and arrangements (e.g., periodic, aperiodic, etc.) of the portions $P_1, P_2, \ldots P_n$ for the master 10 can apply to the shapes and arrangements of the portions $P'_1, P'_2, \ldots P'_n$ of the optical product 10'. As another example, disclosure with respect to the features $F_1, F_2, \ldots F_n$ (e.g., linear, curved, periodic, aperiodic, slowly varying, continuous, discontinuous, non-sinusoidal, etc.) for the master 10 can apply to the features $E_1, E_2, \ldots E_n$ of the optical product 10'. Furthermore, as described herein with respect to the master and the method of manufacturing the master, the optical product 10' of certain embodiments can further comprise features corresponding to holographic features.

In addition, small features can be imbedded in the optical product 10' that do not contribute to the formation of the image. Such imbedded features can be used in authenticity and security applications. Furthermore, as described herein, certain embodiments can incorporate intentional variations within one or more portions $P'_1, P'_2, \ldots P'_n$ of the optical product 10' for security applications.

The optical product can be configured to provide authenticity verification on an item for security. The item can be currency, a credit card, a debit card, a passport, a driver's license, an identification card, a document, a tamper evident container or packaging, or a bottle of pharmaceuticals. The optical product can be configured to be applied onto a lighting product, such as, for example, a light emitting diode (LED) based lighting system to control the LED based lighting system. The optical product can include portions and/or optical features which do not rely on phase information to generate an image of an object. The portions and/or optical features can be configured to be substantially achromatic. The optical product can include non-holographic features configured to produce images that are achromatic. For example, the non-holographic features can provide no diffractive or interference color (e.g., no wavelength dispersion or rainbows or rainbow effects). In some cases, the non-holographic features can be colored. For example, the non-holographic features can comprise a tint, an ink, dye, or pigment where absorption can provide color.

Numbered Example Embodiments

The following is a numbered list of example embodiments that are within the scope of this disclosure. The example embodiments that are listed should in no way be interpreted as limiting the scope of the embodiments. Various features of the example embodiments that are listed can be removed, added, or combined to form additional embodiments, which are part of this disclosure. For example, the following example embodiments can be combined with the lenses and/or prisms and/or mirrors as described herein.

1. A master for fabricating an optical product, said optical product configured, when illuminated, to reproduce by reflected light, a 3D image of at least a part of a 3D object, said master comprising:
    a first surface; and
    a second surface opposite said first surface, said second surface comprising a plurality of portions, each portion corresponding to a point on a surface of said 3D object, each portion comprising features corresponding to non-holographic elements on said optical product,
    wherein a gradient in said features correlates to an inclination of said surface of said 3D object at said corresponding point, and
    wherein an orientation of said features correlates to an orientation of said surface of said 3D object at said corresponding point.

2. The master of Embodiment 1, wherein said portions form a single cell.

3. The master of Embodiment 1, wherein said portions form a plurality of cells, each portion forming a cell of said plurality of cells.

4. The master of Embodiment 3, further comprising borders surrounding said portions.

5. The master of Embodiment 3 or 4, wherein some of said portions comprise a symmetrical shape.

6. The master of Embodiment 5, wherein said symmetrical shape comprises a rectangle.

7. The master of Embodiment 5, wherein said symmetrical shape comprises a square.

8. The master of Embodiment 3 or 4, wherein said portions comprise curvature.

9. The master of Embodiment 3 or 4, wherein some of said portions comprise a non-symmetrical shape.

10. The master of Embodiment 3 or 4, wherein some of said portions comprise an irregular shape.

11. The master of any of Embodiments 3-10, wherein some of said portions have a shape different from others of said portions.

12. The master of any of Embodiments 3-11, wherein said portions form a periodic array.

13. The master of any of Embodiments 3-11, wherein said portions form an aperiodic array.

14. The master of any of Embodiments 1-13, wherein said features comprise a periodic array of features within a portion of said plurality of portions.

15. The master of any of Embodiments 1-13, wherein said features comprise an aperiodic array of features, and wherein a lateral distance between said features varies less than about 15% per lateral distance.

16. The master of any of Embodiments 1-15, wherein some of said portions comprise features discontinuous with features in surrounding adjacent portions.

17. The master of any of Embodiments 1-16, wherein said features comprise non-sinusoidal features.

18. The master of any of Embodiments 1-17, wherein when viewed from a top or front view, said features comprise linear features corresponding to a substantially smooth region of said surface of said 3D object.

19. The master of any of Embodiments 1-17, wherein when viewed from a top or front view, said features comprise non-linear features corresponding to a curved region of said surface of said 3D object.

20. The master of any of Embodiments 1-19, wherein a lateral distance between said features is between 1 μm and 100 μm.

21. The master of Embodiment 20, wherein said lateral distance is between 1 μm and 50 μm.

22. The master of Embodiment 21, wherein said lateral distance is between 1 μm and 25 μm.

23. The master of any of Embodiments 1-22, wherein said inclination comprises a polar angle from a first reference line of said 3D object, and said orientation comprises an azimuth angle from a second reference line orthogonal to said first reference line.

24. The master of any of Embodiments 1-23, comprising a negative master configured to form a surface of said optical product that is complementary to said second surface of said master.

25. The master of any of Embodiments 1-23, comprising a positive master configured to provide a surface for said optical product that is substantially similar to said second surface of said master.

26. The master of any of Embodiments 1-25, comprising a light, electron, or ion sensitive material.

27. The master of Embodiment 26, wherein said material comprises a photoresist.

28. The master of any of Embodiments 1-27, wherein said second surface further comprises features corresponding to holographic elements on said optical product.

29. The master of any of Embodiments 1-28, wherein said 3D object comprises an irregularly shaped object.

30. The master of any of Embodiments 1-29, wherein said 3D object comprises one or more alphanumeric characters.

31. The master of any of Embodiments 1-30, wherein said non-holographic elements on said optical product are configured to produce at least part of said 3D image without relying on diffraction.

32. An optical product configured, when illuminated, to reproduce by reflected light, a 3D image of at least a part of a 3D object, said optical product comprising:
   a first surface; and
   a second surface opposite said first surface, said second surface comprising a plurality of portions, each portion corresponding to a point on a surface of said 3D object, each portion comprising non-holographic features configured to produce at least part of said 3D image of said 3D object without relying on diffraction,
   wherein a gradient in said non-holographic features correlates to an inclination of said surface of said 3D object at said corresponding point, and
   wherein an orientation of said non-holographic features correlates to an orientation of said surface of said 3D object at said corresponding point.

33. The optical product of Embodiment 32, wherein said portions form a single cell.

34. The optical product of Embodiment 32, wherein said portions form a plurality of cells, each portion forming a cell of said plurality of cells.

35. The optical product of Embodiment 34, further comprising borders surrounding at least part of said portions.

36. The optical product of Embodiment 34 or 35, wherein some of said portions comprise a symmetrical shape.

37. The optical product of Embodiment 36, wherein said symmetrical shape comprises a rectangle.

38. The optical product of Embodiment 36, wherein said symmetrical shape comprises a square.

39. The optical product of Embodiment 34 or 35, wherein said portions comprise curvature.

40. The optical product of Embodiment 34 or 35, wherein some of said portions comprise a non-symmetrical shape.

41. The optical product of Embodiment 34 or 35, wherein some of said portions comprise an irregular shape.

42. The optical product of any of Embodiments 34-41, wherein some of said portions have a shape different from others of said portions.

43. The optical product of any of Embodiments 34-42, wherein said portions form a periodic array.

44. The optical product of any of Embodiments 34-42, wherein said portions form an aperiodic array.

45. The optical product of any of Embodiments 32-44, wherein said features comprise a periodic array of features within a portion of said plurality of portions.

46. The optical product of any of Embodiments 32-44, wherein said features comprise an aperiodic array of features, and wherein a lateral distance between said features varies less than about 15% per lateral distance.

47. The optical product of any of Embodiments 32-46, wherein some of said portions comprise features discontinuous with features in surrounding adjacent portions.

48. The optical product of any of Embodiments 32-47, wherein said features comprise non-sinusoidal features.

49. The optical product of any of Embodiments 32-48, wherein when viewed from a top or front view, said features comprise linear features corresponding to a substantially smooth region of said surface of said 3D object.

50. The optical product of any of Embodiments 32-48, wherein when viewed from a top or front view, said features comprise non-linear features corresponding to a curved region of said surface of said 3D object.

51. The optical product of any of Embodiments 32-50, wherein said inclination comprises a polar angle from a first reference line of said 3D object, and said orientation comprises an azimuth angle from a second reference line orthogonal to said first reference line.

52. The optical product of any of Embodiments 32-51, wherein said second surface comprises a reflective surface.

53. The optical product of any of Embodiments 32-52, wherein said second surface further comprises features corresponding to holographic features.

54. The optical product of Embodiment 53, wherein said holographic features are integrated into at least one of said portions.

55. The optical product of any of Embodiments 32-54, wherein said 3D object comprises an irregularly shaped object.

56. The optical product of any of Embodiments 32-55, wherein said 3D object comprises one or more alphanumeric characters.

57. A method for manufacturing a master for fabricating an optical product, said optical product configured, when illuminated, to reproduce by reflected light, a 3D image of at least a part of a 3D object, said method comprising:
  providing a 2D data file generated from a 2D image of the 3D object, said 2D data file configured to describe said 3D image, said data file comprising a plurality of portions, each portion corresponding to one or more points on a surface of said 3D object, each portion comprising features of intensity corresponding to non-holographic elements on said optical product,
  wherein a gradient in intensity correlates to an inclination of said surface of said 3D object at said one or more corresponding points, and
  wherein an orientation of said features correlates to an orientation of said surface of said 3D object at said one or more corresponding points; and
  manufacturing said master based at least in part on said 2D data file.

58. The method of Embodiment 57, wherein manufacturing said master comprises manufacturing a negative master.

59. The method of Embodiment 57, wherein manufacturing said master comprises manufacturing a positive master.

60. The method of any of Embodiments 57-59, wherein manufacturing said master comprises using photolithography, electron beam lithography, or ion beam lithography.

61. The method of any of Embodiments 57-60, wherein said data file further comprises features corresponding to holographic elements on said optical product.

62. The method of any of Embodiments 57-61, further comprising adding on said master features corresponding to holographic elements on said optical product.

63. The method of Embodiment 62, wherein adding on said master comprises providing a second data file comprising features of intensity corresponding to holographic elements on said optical product; and manufacturing said master comprises manufacturing said master based at least in part on said 2D data file and said second data file.

64. The method of any of Embodiments 57-63, wherein said 3D object comprises an irregularly shaped object.

65. The method of any of Embodiments 57-64, wherein said 3D object comprises one or more alphanumeric characters.

66. The method of any of Embodiments 57-65, wherein said non-holographic elements on said optical product are configured to produce at least part of said 3D image without relying on diffraction.

67. The method of Embodiment 57, wherein said 2D image comprises a photograph.

68. The method of Embodiment 57, wherein said 2D image comprises a gray scale image.

69. The method of Embodiment 68, wherein said 2D image comprises a normal map.

70. An optical product configured, when illuminated, to reproduce by reflected or refracted light, an image that appears 3D of at least a part of a 3D object, said optical product comprising:
  a first surface; and
  a second surface opposite said first surface, said second surface comprising a plurality of portions, each portion corresponding to a point on a surface of said 3D object, each portion comprising one or more non-holographic features configured to produce at least part of said image without relying on diffraction,
  wherein a gradient in said non-holographic features correlates to an inclination of said surface of said 3D object at said corresponding point,
  wherein an orientation of said non-holographic features correlates to an orientation of said surface of said 3D object at said corresponding point, and
  wherein at least 20% of said plurality of portions comprise no more than a single non-holographic feature.

71. An optical product configured, when illuminated, to reproduce by reflected or refracted light, an image that appears 3D of at least a part of a 3D object, said optical product comprising:
  a first surface; and
  a second surface opposite said first surface, said second surface comprising a plurality of portions, each portion corresponding to a point on a surface of said 3D object, each portion comprising one or more non-holographic features configured to produce at least part of said image without relying on diffraction,
  wherein a gradient in said non-holographic features correlates to an inclination of said surface of said 3D object at said corresponding point,
  wherein an orientation of said non-holographic features correlates to an orientation of said surface of said 3D object at said corresponding point, and
  wherein a majority of said plurality of portions comprises one or more non-holographic features discontinuous with one or more non-holographic features in surrounding adjacent portions.

72. An optical product configured, when illuminated, to reproduce by reflected or refracted light, an image that appears 3D of at least a part of a 3D object, said optical product comprising:
  a first surface; and
  a second surface opposite said first surface, said second surface comprising a plurality of portions, each portion corresponding to a point on a surface of said 3D object, each portion comprising one or more non-holographic features configured to produce at least part of said image without relying on diffraction,
  wherein a gradient in said non-holographic features correlates to an inclination of said surface of said 3D object at said corresponding point,
  wherein an orientation of said non-holographic features correlates to an orientation of said surface of said 3D object at said corresponding point, and
  wherein a majority of said plurality of portions comprises one or more non-holographic features having different orientations as one or more non-holographic features in surrounding adjacent portions.

73. An optical product configured, when illuminated, to reproduce by reflected or refracted light, an image that appears 3D of at least a part of a 3D object, said optical product comprising:
  a first surface; and
  a second surface opposite said first surface, said second surface comprising a plurality of portions, each portion corresponding to a point on a surface of said 3D object, each portion comprising one or more non-holographic features configured to produce at least part of said image without relying on diffraction,
  wherein a gradient in said non-holographic features correlates to an inclination of said surface of said 3D object at said corresponding point, wherein an orientation of said non-holographic features correlates to an orientation of said surface of said 3D object at said corresponding point, and wherein said one or more non-holographic features comprise non-linear features when viewed in a cross-section.

74. The optical product of Embodiment 73, wherein said 3D object comprises a surface and said non-linear features correspond to a curved region of said surface of said 3D object.

75. An optical product configured, when illuminated, to reproduce by reflected or refracted light, an image that appears 3D of at least a part of a 3D object, said optical product comprising:

a first surface; and a second surface opposite said first surface, said second surface comprising a plurality of portions, each portion corresponding to a point on a surface of said 3D object, each portion comprising one or more non-holographic features configured to produce at least part of said image without relying on diffraction (1) at viewing angles through about 20 degrees to about 160 degrees relative to a plane of the optical product as the optical product is tilted and (2) at viewing angles through about 20 degrees to about 90 degrees relative to the plane of the optical product as the optical product is rotated at least throughout the range of about 90 degrees in the plane of the optical product, wherein a gradient in said non-holographic features correlates to an inclination of said surface of said 3D object at said corresponding point, and wherein an orientation of said non-holographic features correlates to an orientation of said surface of said 3D object at said corresponding point.

76. The optical product of Embodiment 75, wherein the viewing angles are through about 15 degrees to about 165 degrees relative to the plane of the optical product as the optical product is tilted.

77. The optical product of Embodiment 76, wherein the viewing angles are through about 10 degrees to about 170 degrees relative to the plane of the optical product as the optical product is tilted.

78. The optical product of Embodiment 77, wherein the viewing angles are through about 5 degrees to about 175 degrees relative to the plane of the optical product as the optical product is tilted.

79. The optical product of Embodiment 78, wherein the viewing angles are through about 0 degrees to about 180 degrees relative to the plane of the optical product as the optical product is tilted.

80. The optical product of any of Embodiments 75-79, wherein the viewing angles are through about 15 degrees to about 90 degrees relative to the plane of the optical product as the optical product is rotated at least throughout the range of about 90 degrees in the plane of the optical product.

81. The optical product of Embodiment 80, wherein the viewing angles are through about 10 degrees to about 90 degrees relative to the plane of the optical product as the optical product is rotated at least throughout the range of about 90 degrees in the plane of the optical product.

82. The optical product of Embodiment 81, wherein the viewing angles i are through about 5 degrees to about 90 degrees relative to the plane of the optical product as the optical product is rotated at least throughout the range of about 90 degrees in the plane of the optical product.

83. The optical product of Embodiment 82, wherein the viewing angles are through about 0 degrees to about 90 degrees relative to the plane of the optical product as the optical product is rotated at least throughout the range of about 90 degrees in the plane of the optical product.

84. The optical product of any of Embodiments 71-83, wherein said optical product is configured to provide authenticity verification on an item for security.

85. The optical product of Embodiment 84, wherein said item is currency, a credit card, a debit card, a passport, a driver's license, an identification card, a document, a tamper evident container or packaging, or a bottle of pharmaceuticals.

86. The optical product of Embodiment 84, wherein the optical product is an embedded feature, a hot stamp feature, windowed thread feature, or a transparent window feature.

87. The optical product of any of Embodiments 71-86, wherein each portion has a length between about 35 µm and about 55 µm, and a width between about 35 µm and about 55 µm.

88. The optical product of Embodiment 87, wherein each portion has a length between about 40 µm and about 50 µm, and a width between about 40 µm and about 50 µm.

89. The optical product of Embodiment 87 or 88, wherein each portion has an aspect ratio between about 1:1-1:1.1.

90. The optical product of any of Embodiments 71-89, wherein said second surface comprises a reflective surface.

91. The optical product of Embodiment 90, wherein said second surface comprises a coating comprising a reflective material.

92. The optical product of any of Embodiments 71-89, wherein said second surface comprises a transparent, relatively high refractive index coating.

93. The optical product of Embodiment 92, wherein said relatively high refractive index coating comprises ZnS or $TiO_2$.

94. The optical product of any of Embodiments 71-93, wherein said second surface further comprises holographic features.

95. The optical product of Embodiment 94, wherein said holographic features are integrated into at least one of said portions.

96. The optical product of any of Embodiments 71-95, wherein said second surface further comprises additional features that when illuminated, do not reproduce a part of said 3D object.

97. The optical product of any of Embodiments 71-96, wherein said 3D object comprises an irregularly shaped object.

98. The optical product of any of Embodiments 71-96, wherein said 3D object comprises one or more alphanumeric characters.

99. The optical product of any of Embodiments 71-98, wherein at least 20% of said plurality of portions comprises no more than a single non-holographic feature.

100. The optical product of Embodiment 70 or any of Embodiments 72-99, wherein a majority of said plurality of portions comprises one or more non-holographic features discontinuous with one or more non-holographic features in surrounding adjacent portions.

101. The optical product of any of Embodiments 70-71 or any of Embodiments 73-100, wherein a majority of said plurality of portions comprises one or more non-holographic features having different orientations as one or more non-holographic features in surrounding adjacent portions.

102. The optical product of any of Embodiments 70-72 or any of Embodiments 75-101, wherein said one or more non-holographic features comprise non-linear features when viewed in a cross-section.

103. The optical product of Embodiment 102, wherein said 3D object comprises a surface and said non-linear features correspond to a curved region of said surface of said 3D object.

104. The optical product of any of Embodiments 70-74 or any of Embodiments 84-103, wherein (1) the viewing angle is at least between about 20 degrees to about 160 degrees relative to a plane of the optical product as the optical product is tilted and (2) the viewing angle is at least between about 20 degrees to about 90 degrees relative to the plane of the optical product as the optical product is rotated at least throughout the range of about 90 degrees in the plane of the optical product.

105. The optical product of Embodiment 104, wherein the viewing angle is at least between about 15 degrees to about 165 degrees relative to the plane of the optical product as the optical product is tilted.

106. The optical product of Embodiment 105, wherein the viewing angle is at least between about 10 degrees to about 170 degrees relative to the plane of the optical product as the optical product is tilted.

107. The optical product of Embodiment 106, wherein the viewing angle is at least between about 5 degrees to about 175 degrees relative to the plane of the optical product as the optical product is tilted.

108. The optical product of Embodiment 107, wherein the viewing angle is between about 0 degrees to about 180 degrees relative to the plane of the optical product as the optical product is tilted.

109. The optical product of any of Embodiments 104-108, wherein the viewing angle is at least between about 15 degrees to about 90 degrees relative to the plane of the optical product as the optical product is rotated at least throughout the range of about 90 degrees in the plane of the optical product.

110. The optical product of Embodiment 109, wherein the viewing angle is at least between about 10 degrees to about 90 degrees relative to the plane of the optical product as the optical product is rotated at least throughout the range of about 90 degrees in the plane of the optical product.

111. The optical product of Embodiment 110, wherein the viewing angle is at least between about 5 degrees to about 90 degrees relative to the plane of the optical product as the optical product is rotated at least throughout the range of about 90 degrees in the plane of the optical product.

112. The optical product of Embodiment 111, wherein the viewing angle is between about 0 degrees to about 90 degrees relative to the plane of the optical product as the optical product is rotated at least throughout the range of about 90 degrees in the plane of the optical product.

113. The master of Embodiment 1, wherein the gradient in said features correlates to a gradient of said surface of said 3D object at said corresponding point.

114. The optical product of Embodiment 71, wherein a majority of said plurality of portions comprises one or more non-holographic features discontinuous with at least two non-holographic features in surrounding adjacent portions.

115. The optical product of any of Embodiments 71-98, wherein a majority of said plurality of portions comprises no more than a single non-holographic feature.

Further Numbered Example Embodiments

116. An optical product configured to reproduce a first 3D image of at least part of a first 3D object and a second 3D image of at least part of a second 3D object, the optical product comprising:

a first surface; and
a second surface opposite said first surface, said second surface configured, when illuminated, to reproduce by reflected or transmitted light, the first 3D image without reproducing the second 3D image at a first angle of view, and the second 3D image without reproducing the first 3D image at a second angle of view, said second surface comprising:
  a first plurality of portions, each portion of said first plurality of portions corresponding to a point on a surface of said first 3D object, each portion comprising first non-holographic features configured to produce at least part of said first 3D image of said first 3D object, and
  a second plurality of portions, each portion of said second plurality of portions corresponding to a point on a surface of said second 3D object, each portion comprising second non-holographic features configured to produce at least part of said second 3D image of said second 3D object.

117. The optical product of Embodiment 116,
wherein a gradient in said first non-holographic features correlates to an inclination of said surface of said first 3D object at said corresponding point, and
wherein an orientation of said first non-holographic features correlates to an orientation of said surface of said first 3D object at said corresponding point.

118. The optical product of Embodiment 116 or 117,
wherein a gradient in said second non-holographic features correlates to an inclination of said surface of said second 3D object at said corresponding point, and
wherein an orientation of said second non-holographic features correlates to an orientation of said surface of said second 3D object at said corresponding point.

119. The optical product of any of Embodiments 116-118, further comprising borders surrounding at least part of said portions of said first and second plurality of portions.

120. The optical product of any of Embodiments 116-119, wherein some of said portions of said first and second plurality of portions form a periodic array.

121. The optical product of Embodiment 120, wherein said periodic array includes a striped, zigzagged, checkerboard, or houndstooth pattern.

122. The optical product of any of Embodiments 116-119, wherein said portions of said first and second plurality of portions form an aperiodic array.

123. The optical product of any of Embodiments 116-122, wherein said optical product when tilted in a direction from said first angle of view to said second angle of view, said first 3D image appears to change to said second 3D image in a direction orthogonal to said direction from said first angle of view to said second angle of view.

124. The optical product of any of Embodiments 116-123, wherein said first or second non-holographic features has a largest dimension between 1 µm and 35 µm.

125. The optical product of any of Embodiments 116-124, wherein some of said portions of said first and second plurality of portions comprise features discontinuous with features in surrounding adjacent portions.

126. The optical product of any of Embodiments 116-124, wherein when viewed from a top or front view, said first or second features comprise linear features corresponding to a substantially smooth region of said surface of said first or second 3D object respectively.

127. The optical product of any of Embodiments 116-124, wherein when viewed from a top or front view, said first or second features comprise non-linear features corresponding to a curved region of said surface of said first or second 3D object respectively.

128. The optical product of any of Embodiments 117-127,
wherein said inclination of said surface of said first 3D object comprises a polar angle from a first reference line of said first 3D object, and
wherein said orientation of said surface of said first 3D object comprises an azimuth angle from a second reference line orthogonal to said first reference line of said first 3D object.

129. The optical product of any of Embodiments 118-128,
wherein said inclination of said surface of said second 3D object comprises a polar angle from a first reference line of said second 3D object, and
wherein said orientation of said surface of said second 3D object comprises an azimuth angle from a second reference line orthogonal to said first reference line of said second 3D object.

130. The optical product of any of Embodiments 116-129, wherein said second surface comprises a reflective surface.

131. The optical product of any of Embodiments 116-130, wherein said second surface further comprises holographic features.

132. The optical product of Embodiment 131, wherein said holographic features are integrated into at least one of said portions of said first and second plurality of portions.

133. The optical product of any of Embodiments 116-132, wherein said first or second 3D object comprises an irregularly shaped object.

134. The optical product of any of Embodiments 116-133, wherein said first or second 3D object comprises one or more alphanumeric characters.

135. The optical product of any of Embodiments 116-134, wherein said second surface further comprises additional features that when illuminated, do not reproduce a part of said first or second 3D object.

136. The optical product of any of Embodiments 116-135, wherein said optical product is configured to provide authenticity verification on an item for security.

137. The optical product of Embodiment 135, wherein said item is currency, a a tamper evident container or packaging, or a bottle of pharmaceuticals.

138. An optical product comprising:
an array of lenses, prisms, or mirrors;
a first plurality of portions disposed under the array of lenses, prisms, or mirrors, individual ones of the first plurality of portions corresponding to a point on a surface of a first 3D object, and comprising first non-holographic features configured to produce at least part of a first 3D image of the first 3D object; and
a second plurality of portions disposed under the array of lenses, prisms, or mirrors, individual ones of the second plurality of portions corresponding to a point on a surface of a second 3D object, and comprising second non-holographic features configured to produce at least part of a second 3D image of the second 3D object,
wherein at a first viewing angle, the array of lenses, prisms, or mirrors presents the first 3D image for viewing without presenting the second 3D image for viewing, and at a second viewing angle different from the first viewing angle, the array of lenses, prisms, or mirrors presents for viewing the second 3D image without presenting the first 3D image for viewing.

139. The optical product of Embodiment 138, where the array of lenses, prisms, or mirrors comprises an array of lenses.

140. The optical product of Embodiment 138, where the array of lenses, prisms, or mirrors comprises a 1D lenticular lens array.

141. The optical product of Embodiment 138, where the array of lenses, prisms, or mirrors comprises a 2D lenticular lens array.

142. The optical product of Embodiment 138, where the array of lenses, prisms, or mirrors comprises an array of prisms.

143. The optical product of any of Embodiments 138-142,
wherein a gradient in said first non-holographic features correlates to an inclination of said surface of said first 3D object at said corresponding point, and
wherein an orientation of said first non-holographic features correlates to an orientation of said surface of said first 3D object at said corresponding point.

144. The optical product of any of Embodiments 138-143,
wherein a gradient in said second non-holographic features correlates to an inclination of said surface of said second 3D object at said corresponding point, and
wherein an orientation of said second non-holographic features correlates to an orientation of said surface of said second 3D object at said corresponding point.

145. The optical product of any of Embodiments 138-144, wherein some of said portions of said first and second plurality of portions form a periodic array.

146. The optical product of any of Embodiments 143-145,
wherein said inclination of said surface of said first 3D object comprises a polar angle from a first reference line of said first 3D object, and
wherein said orientation of said surface of said first 3D object comprises an azimuth angle from a second reference line orthogonal to said first reference line of said first 3D object.

147. The optical product of any of Embodiments 138-146,
wherein said inclination of said surface of said second 3D object comprises a polar angle from a first reference line of said second 3D object, and
wherein said orientation of said surface of said second 3D object comprises an azimuth angle from a second reference line orthogonal to said first reference line of said second 3D object.

148. The optical product of any of Embodiments 138-147, wherein said first and second non-holographic features comprise a reflective surface.

149. The optical product of any of Embodiments 138-148, wherein said first or second 3D object comprises an irregularly shaped object.

150. The optical product of any of Embodiments 138-149, wherein said first or second 3D object comprises one or more alphanumeric characters.

151. The optical product of any of Embodiments 138-150, wherein said optical product is configured to provide authenticity verification on an item for security.

152. The optical product of Embodiment 151, wherein said item is currency, a a tamper evident container or packaging, or a bottle of pharmaceuticals.

153. An optical product comprising:
a first surface; and
a second surface opposite said first surface, said second surface configured, when illuminated, to reproduce by reflected or transmitted light, a first 3D image of at least part of a first 3D object at a first angle of view, said second surface comprising:
a first plurality of portions, each portion of said first plurality of portions corresponding to a point on a surface of said first 3D object, each portion comprising first non-holographic features configured to produce at least part of said first 3D image of said first 3D object,
wherein at least some of said portions comprise diffusing features.

154. The optical product of Embodiment 153, wherein at least some of said portions comprise diffusing features and specularly reflection regions.

155. The optical product of Embodiment 154, further comprising a half-tone pattern or greyscale created by said diffusing features and specularly reflection regions.

156. The optical product of Embodiment 153, the optical product configured when illuminated, to reproduce by reflected or transmitted light, a second 3D image of at least part of a second 3D object at a second angle of view, said second surface further comprising a second plurality of portions, each portion of said second plurality of portions corresponding to a point on a surface of said second 3D object, each portion comprising second non-holographic features configured to produce at least part of said second 3D image of said second 3D object.

157. The optical product of any of Embodiments 138-152, wherein the optical product is configured to provide a right side view and a left side view of the first or second 3D object for a stereoscopic view of the first or second 3D object.

158. An optical product comprising:
a first surface; and
a second surface opposite said first surface, said second surface configured, when illuminated, to reproduce by reflected or transmitted light, a first 3D image of at least part of a first 3D object at a first angle of view, and a second 3D image of at least part of a second 3D object at a second angle of view, said second surface comprising:
  a first plurality of portions, each portion of said first plurality of portions corresponding to a point on a surface of said first 3D object, each portion comprising first non-holographic features configured to produce at least part of said first 3D image of said first 3D object, and
  a second plurality of portions, each portion of said second plurality of portions corresponding to a point on a surface of said second 3D object, each portion comprising second non-holographic features configured to produce at least part of said second 3D image of said second 3D object; and
  a plurality of lenses, prisms, or mirrors integrated with the first and the second plurality of portions of said second surface.

159. The optical product of Embodiment 158, wherein the plurality of lenses, prisms, or mirrors are arranged in a two-dimensional array.

160. The optical product of Embodiment 158, wherein a characteristic of some of the plurality of lenses, prisms, or mirrors is varied based on a gradient of the first or the second non-holographic features.

161. The optical product of Embodiment 160, wherein the characteristic includes at least one of a size, a width or a center-to-center distance between adjacent lenses, prisms, or mirrors.

162. The optical product of Embodiment 158, wherein some of the plurality or mirrors include a curved mirror, a reflective mirror, or a total internal reflecting mirror.

163. An optical product configured, when illuminated, to reproduce by reflected or transmitted light, a 3D image of at least a part of a 3D object, said optical product comprising:
a first surface; and
a second surface opposite said first surface, said second surface comprising a plurality of portions, each portion corresponding to a point on a surface of said 3D object, each portion comprising non-holographic features configured to produce at least part of said 3D image of said 3D object,
wherein said non-holographic features comprise specular reflecting features and diffusing features that provide greyscale in said 3D image,
  wherein a gradient in said non-holographic features correlates to an inclination of said surface of said 3D object at said corresponding point, and
  wherein an orientation of said non-holographic features correlates to an orientation of said surface of said 3D object at said corresponding point.

164. The optical product of Embodiment 163, wherein the specular reflecting features and the diffusing features each have sizes and are distributed within said plurality of portions to provide said greyscale for producing said 3D image.

165. The optical product of Embodiment 164, wherein the sizes include a width of a top surface of the specular reflecting and diffusing features.

166. The optical product of any of Embodiments 163-165, wherein the specular reflecting features and the diffusing features are included in said plurality of portions in an amount and distribution to provide said greyscale for producing said 3D image.

167. An optical product comprising:
a first surface; and
a second surface opposite said first surface, said second surface configured, when illuminated, to reproduce by reflected or transmitted light, a first 3D image of at least part of a first 3D object at a first angle of view, and a second 3D image of at least part of a second 3D object at a second angle of view, said second surface comprising:
  a first plurality of portions, each portion of said first plurality of portions corresponding to a point on a surface of said first 3D object, each portion comprising first non-holographic features configured to produce at least part of said first 3D image of said first 3D object, and
  a second plurality of portions, each portion of said second plurality of portions corresponding to a point on a surface of said second 3D object, each portion comprising second non-holographic features configured to produce at least part of said second 3D image of said second 3D object,
  wherein said first or second non-holographic features comprise specular reflecting features and diffusing features that provide greyscale in said first or second 3D image.

168. The optical product of Embodiment 167,
wherein a gradient in said first non-holographic features correlates to an inclination of said surface of said first 3D object at said corresponding point, and
wherein an orientation of said first non-holographic features correlates to an orientation of said surface of said first 3D object at said corresponding point.

169. The optical product of Embodiment 167 or 168,
wherein a gradient in said second non-holographic features correlates to an inclination of said surface of said second 3D object at said corresponding point, and
wherein an orientation of said second non-holographic features correlates to an orientation of said surface of said second 3D object at said corresponding point.

170. The optical product of any of Embodiments 167-169, wherein the specular reflecting features and the diffusing features each have sizes and are distributed within said first or second plurality of portions to provide said greyscale for producing said first or second 3D image.

171. The optical product of Embodiment 170, wherein the sizes include a width of a top surface of the specular reflecting and diffusing features.

172. The optical product of any of Embodiments 167-171, wherein the specular reflecting features and the diffusing features are included in said first or second plurality of portions in an amount and distribution to provide said greyscale for producing said first or second 3D image.

173. The optical product of any of Embodiments 163-172, further comprising a metallized coating over the specular reflecting features and the diffusing features.

174. An optical product configured, when illuminated, to reproduce by reflected or transmitted light, an image of at least a part of a 3D object, said optical product comprising:
  an array of the lenses, prisms, or mirrors, the lenses, prisms, or mirrors having a longitudinal axis disposed in a vertical direction; and
  a plurality of first and second portions disposed under the array of lenses, prisms, or mirrors, the first portions corresponding to portions of a right side view of said object, and the second portions corresponding to portions of a left side view of said object,
  wherein when tilting the first and second portions about the longitudinal axis of the lenses, prisms, or mirrors, the array of lenses, prisms, or mirrors presents the right and left side views of the object for a stereoscopic view of the object,
  wherein individual ones of the first and second portions correspond to a point on a surface of said 3D object, and comprise non-holographic features configured to produce at least part of said image of said 3D object,
  wherein a gradient in said non-holographic features correlates to an inclination of said surface of said 3D object at said corresponding point, and
  wherein an orientation of said non-holographic features correlates to an orientation of said surface of said 3D object at said corresponding point.

175. The optical product of Embodiment 174, further comprising a plurality of additional portions disposed under the array of lenses, prisms, or mirrors, the additional portions corresponding to portions of an additional side view of said object.

176. The optical product of Embodiment 175, wherein the additional side view of said image comprises at least four additional side views of said object.

177. The optical product of Embodiment 158, wherein the second surface has a shape that include contributions from the shape of (i) a surface having a gradient that correlates to an inclination of said surface of said first 3D object at said corresponding point, and an orientation that correlates to an orientation of said surface of said first 3D object at said corresponding point and (ii) a plurality of curved mirrors.

178. The optical product of Embodiment 158, wherein some of said mirrors include elongate mirrors.

179. The optical product of Embodiment 158, wherein some of said mirrors include cylindrical mirrors.

180. The optical product of Embodiment 158, wherein some of said lenses, prisms, or mirrors have spherical curvature.

181. The optical product of Embodiment 158, wherein some of said lenses, prisms, or mirrors have aspherical curvature 182. The optical product of Embodiment 158, wherein some of said lenses, prisms, or mirrors have a curvature that is rotationally symmetric 183. An optical product comprising:
  a first surface; and
  a second surface opposite said first surface, said second surface configured, when illuminated, to reproduce by reflected or transmitted light, a first 3D image of at least part of a first 3D object at a first angle of view, said second surface comprising:
    a plurality of portions, each portion of said plurality of portions corresponding to a point on a surface of said first 3D object, each portion comprising non-holographic features configured to produce at least part of said 3D image of said 3D object, and
    a plurality of lens elements disposed with respect to said plurality of portions such that light from said plurality of portions passes through said plurality of lens elements.

184. The optical product of Embodiment 183, wherein the plurality of lens elements are configured as a two-dimensional array.

185. The optical product of Embodiment 183, wherein one of said lens elements has an aperture size and said portion has a lateral size, and said aperture size of said lens element is the size of said lateral size of said portion.

186. The optical product of Embodiment 183, wherein each of the plurality of said lens elements has an aperture size and each of a plurality of said portions have lateral sizes, and said aperture sizes of said lens element are the size of said lateral sizes of said portion.

187. The optical product of Embodiment 183, wherein said lenses are configured to permit egress of light that would otherwise be reflected within said substrate by total internal reflection.

188. An optical product comprising:
  a first surface; and
  a second surface opposite said first surface, said second surface configured, when illuminated, to reproduce by reflected or transmitted light, a first 3D image of at least part of a first 3D object at a first angle of view, said second surface comprising:
    a plurality of portions, each portion of said plurality of portions corresponding to a point on a surface of said first 3D object, each portion comprising non-holographic features configured to produce at least part of said 3D image of said 3D object,
    wherein different portions have different sizes and the size of the portion is correlated with a gradient in said first non-holographic features.

189. The optical product of Embodiment 188, wherein said the size of the portion is correlated to an inclination of said surface of said first 3D object at said corresponding point.

190. An optical product comprising:
  a first surface; and
  a second surface opposite said first surface, said second surface configured, when illuminated, to reproduce by reflected or transmitted light, a first 3D image of at least part of a first 3D object at a first angle of view, said second surface comprising:
    a plurality of portions, each portion of said plurality of portions corresponding to a point on a surface of said first 3D object, each portion comprising non-holographic features configured to produce at least part of said 3D image of said 3D object, wherein different portions have different sizes and the size of the portion is correlated an inclination of said surface of said first 3D object at said corresponding point.

191. The optical product of Embodiment 190, wherein a gradient in said first non-holographic features correlates to an inclination of said surface of said first 3D object at said corresponding point 192. An optical product comprising:
a first surface; and
a second surface opposite said first surface, said second surface configured, when illuminated, to reproduce by reflected or transmitted light, a first 3D image of at least part of a first 3D object at a first angle of view, said second surface comprising:
   a plurality of portions, each portion of said plurality of portions corresponding to a point on a surface of said first 3D object, each portion comprising non-holographic features configured to produce at least part of said 3D image of said 3D object, and
   a plurality of lenses, mirrors, or prisms disposed with respect to said with the plurality of portions,
   wherein the lenses, mirrors, or prisms have different sizes, and
   wherein said sizes are correlated with different the sizes of the portions.

193. The optical product of Embodiment 192, wherein smaller lenses, mirrors, or prisms are superimposed on smaller portions and larger lenses, mirrors, or prisms are superimposed on larger portions.

194. An optical product comprising:
a first surface; and
a second surface opposite said first surface, said second surface configured, when illuminated, to reproduce by reflected or transmitted light, a first 3D image of at least part of a first 3D object at a first angle of view, said second surface comprising:
   a plurality of portions, each portion of said plurality of portions corresponding to a point on a surface of said first 3D object, each portion comprising non-holographic features configured to produce at least part of said 3D image of said 3D object, and
   a plurality of lenses, mirrors, or prisms disposed with respect to said with the plurality of portions,
   wherein the lenses, mirrors, or prisms have different sizes, and
   wherein said sizes are correlated with the periodicity of the portions.

195. The optical product of Embodiment 194, wherein smaller lenses, mirrors, or prisms are superimposed on portions having a higher periodicity and larger lenses, mirrors, or prisms are superimposed on portions with lower periodicity.

196. An optical product comprising:
a first surface; and
a second surface opposite said first surface, said second surface configured, when illuminated, to reproduce by reflected or transmitted light, a first 3D image of at least part of a first 3D object at a first angle of view, said second surface comprising:
   a plurality of portions, each portion of said plurality of portions corresponding to a point on a surface of said first 3D object, each portion comprising non-holographic features configured to produce at least part of said 3D image of said 3D object, and
   a plurality of lenses, mirrors, or prisms disposed with respect to said with the plurality of portions,
   wherein the lenses, mirrors, or prisms have different sizes, and
   wherein said sizes are correlated with the gradient in said first non-holographic features.

197. The optical product of Embodiment 196, wherein smaller lenses, mirrors, or prisms are superimposed on portions having a higher gradient and larger lenses, mirrors, or prisms are superimposed on portions with lower gradient.

198. An optical product comprising:
a first surface; and
a second surface opposite said first surface, said second surface configured, when illuminated, to reproduce by reflected or transmitted light, a first 3D image of at least part of a first 3D object at a first angle of view, said second surface comprising:
   a plurality of portions, each portion of said plurality of portions corresponding to a point on a surface of said first 3D object, each portion comprising non-holographic features configured to produce at least part of said 3D image of said 3D object,
   wherein a surface of the non-holographic features in each portion comprises a plurality of lenses, mirrors, or prisms,
   wherein the lenses, mirrors, or prisms have different sizes, and
   wherein said sizes are correlated with an inclination of said surface of said first 3D object at said corresponding point.

199. The optical product of Embodiment 198, wherein smaller lenses, mirrors, or prisms are superimposed on portions correlated with steep inclination of said surface of said first 3D object at said corresponding point and larger lenses, mirrors, or prisms are superimposed on portions correlated with an shallower inclination of said surface of said first 3D object at said corresponding point.

200. The optical product of Embodiment 158, wherein the first and the second plurality of portions comprising the plurality of lenses, prisms, or mirrors are transferred to an article using hot stamping.

201. The optical product of Embodiment 200, wherein the article comprises a packaging material, a lighting product, a security note, a banknote or a financial instrument.

202. An optical product comprising:
a first surface; and
a second surface opposite said first surface, said second surface configured, when illuminated, to reproduce by reflected or transmitted light, an image of at least part of an object, said second surface comprising:
   a plurality of portions, each of said plurality of portions corresponding to a point on a surface of said object, each portion comprising non-holographic features configured to produce at least part of said image of said object,
   wherein a surface of the non-holographic features in each portion comprises a plurality of curved reflecting elements, and
   wherein light incident on the non-holographic features in each portion is reflected by the plurality of curved reflecting elements.

203. The optical product of Embodiment 202, wherein the plurality of curved reflecting elements are arranged in a two-dimensional array.

204. The optical product of Embodiment 202, wherein the plurality of curved reflecting elements comprise concave, cylindrical, toroidal, aspherical, or rotationally symmetric mirrors.

205. The optical product of Embodiment 141 or 183, wherein the lenses or lens elements are periodically arranged.

206. The optical product of Embodiment 141 or 183, wherein the lenses or lens elements are arranged in a square array, a triangular array, or hexagonal closed packed.

207. The optical product of Embodiment 141 or 183, wherein the lenses or lens elements comprise rotationally symmetric surface curvature.

208. The optical product of Embodiment 141 or 183, wherein the lenses or lens elements comprise spherical surfaces.

209. The optical product of Embodiment 141 or 183, wherein the lenses or lens elements comprise surfaces that are aspherical and rotationally symmetric.

210. The optical product of Embodiment 175 or 176, wherein the additional side views comprise images as seen from different angles with respect to the object.

211. The optical product of Embodiment 210, wherein the additional side views comprise different perspectives as if rotating about the object.

212. The optical product of any Embodiments 116-173 or any of claims 177-209, wherein the optical product is configured to provide a right side view and a left side view of a 3D object.

213. The optical product of Embodiment 212, wherein the optical product is configured to provide additional side views as seen from different angles with respect to the object.

214. The optical product of Embodiment 213, wherein the additional side views comprise different perspectives as if rotating about the object.

215. The optical product of any of Embodiments 183-199, the optical product configured when illuminated, to reproduce by reflected or transmitted light, a second 3D image of at least part of a second 3D object at a second angle of view, said second surface further comprising a second plurality of portions, each portion of said second plurality of portions corresponding to a point on a surface of said second 3D object, each portion comprising second non-holographic features configured to produce at least part of said second 3D image of said second 3D object.

216. The optical product of any of Embodiments 153-215, wherein a gradient in said non-holographic features correlates to an inclination of said surface of said 3D object at said corresponding point, and
wherein an orientation of said non-holographic features correlates to an orientation of said surface of said 3D object at said corresponding point.

217. The optical product of any of Embodiments 116-216, wherein the non-holographic features are configured to produce at least part of the image without relying on diffraction.

218. The optical product of any of Embodiments 116-217, wherein the non-holographic features are configured to produce at least part of the image without relying on phase information.

219. The optical product of any of Embodiments 116-218, wherein images are achromatic.

220. The optical product of any of Embodiments 116-219, wherein the non-holographic features provide no diffractive or interference color.

221. The optical product of any of Embodiments 116-220, wherein the optical product does not provide iridescence over an angular range about a viewing direction over a collection pupil having a size of 4.0 mm located at a distance of 24 inches.

222. The optical product of any of Embodiments 116-221, wherein the optical product does not provide iridescence over an angular range around a viewing direction over the collection pupil having a size of 5.0 mm located at a distance of 24 inches.

223. The optical product of any of Embodiments 116-222, wherein the non-holographic features comprise a tint, an ink, dye, or a pigment.

224. The optical product of any of Embodiments 116-223, wherein at least some of the portions comprise diffusing features.

225. The optical product of Embodiment 224, wherein at least some of the portions comprise diffusing features and specular reflecting features.

226. The optical product of Embodiment 225, further comprising a half-tone pattern or greyscale created by said diffusing features and specular reflection features.

227. The optical product of Embodiment 225 or 226, wherein the diffusing features and specular reflecting features provide greyscale in the image.

228. The optical product of any of Embodiments 225-227, wherein the diffusing features and specular reflecting features provide brightness or darkness of hue in the image.

229. The optical product of any of Embodiments 225-128, further comprising a metallized coating over said diffusing features and specular reflecting features.

230. The optical product of any of Embodiments 116-229, wherein a size of one or more of said plurality of portions is correlated with gradient or inclination of non-holographic features included in the one or more said of said plurality of portions.

231. The optical product of any of Embodiments 116-230, wherein a size of one or more of said plurality of portions is correlated with pitch of non-holographic features included in the one or more said of said plurality of portions.

232. The optical product of any of Embodiments 116-231, wherein the 3D object comprises an irregularly shaped object.

233. The optical product of any of Embodiments 116-232, wherein the 3D object comprises one or more alphanumeric characters.

234. The optical product of any of Embodiments 116-233, wherein said optical product is configured to provide authenticity verification on an item for security.

235. The optical product of Embodiment 234, wherein said item is currency, a a tamper evident container or packaging, or a bottle of pharmaceuticals.

236. A lighting product comprising the optical product of any of Embodiments 116-235.

237. The lighting product of Embodiment 236, wherein the lighting product is a light emitting diode based lighting system.

238. The lighting product of Embodiment 236 or 237, wherein the optical product is configured to control the lighting product.

239. The optical product of any of Embodiments 116-238, wherein the optical product does not provide a color change over an angular range about a viewing direction over a collection pupil having a size of 4.0 mm located at a distance of 24 inches.

240. The optical product of any of Embodiments 116-239, wherein the optical product does not provide a color change over an angular range around a viewing direction over the collection pupil having a size of 5.0 mm located at a distance of 24 inches.

241. The optical product of Embodiments 221, 222, 239 or 240, wherein the angular range is 3-degrees.

242. The optical product of Embodiments 221, 222, 239 or 240, wherein the angular range is 5-degrees.

243. The optical product of Embodiments 221, 222, 239 or 240, wherein the angular range is 10-degrees.

244. The optical product of Embodiments 221, 222, 239 or 240, wherein the angular range is 20-degrees.

245. The optical product of Embodiments 221, 222, 239 or 240, wherein the viewing direction is between about 10 degrees and about 60 degrees with respect to a normal to a surface of the product.

246. The optical product of Embodiments 221, 222, 239 or 240, wherein the viewing direction is between about 15 degrees and about 50 degrees with respect to a normal to a surface of the product.

247. The optical product of Embodiments 221, 222, 239 or 240, wherein the viewing direction is between about 20 degrees and about 45 degrees with respect to a normal to a surface of the product.

248. The optical product of Embodiments 221, 222, 239 or 240, wherein the viewing direction is between about 25 degrees and about 35 degrees with respect to a normal to a surface of the product.

CONCLUSION

Various embodiments of the present invention have been described herein. Although this invention has been described with reference to these specific embodiments, the descriptions are intended to be illustrative of the invention and are not intended to be limiting. Various modifications and applications may occur to those skilled in the art without departing from the true spirit and scope of the invention.

What is claimed is:

1. An optical product comprising:
an array of lenses, prisms, or mirrors;
a first plurality of portions disposed under the array of lenses, prisms, or mirrors, individual ones of the first plurality of portions corresponding to a point on a surface of a first 3D object, and comprising first non-holographic features configured to produce at least part of a first 3D image of the first 3D object; and
a second plurality of portions disposed under the array of lenses, prisms, or mirrors, individual ones of the second plurality of portions corresponding to a point on a surface of a second 3D object, and comprising second non-holographic features configured to produce at least part of a second 3D image of the second 3D object,
wherein at a first viewing angle, the array of lenses, prisms, or mirrors presents the first 3D image for viewing without presenting the second 3D image for viewing, and at a second viewing angle different from the first viewing angle, the array of lenses, prisms, or mirrors presents for viewing the second 3D image without presenting the first 3D image for viewing,
wherein a gradient in said first non-holographic features correlates to an inclination of said surface of said first 3D object at said corresponding point, and
wherein an orientation of said first non-holographic features correlates to an orientation of said surface of said first 3D object at said corresponding point.

2. The optical product of claim 1, where the array of lenses, prisms, or mirrors comprises an array of lenses.

3. The optical product of claim 1, where the array of lenses, prisms, or mirrors comprises a 1D lens array comprising a series of lenses in one direction.

4. The optical product of claim 1, where the array of lenses, prisms, or mirrors comprises a 2D lens array comprising a series of lenses in two directions.

5. The optical product of claim 1,
wherein a gradient in said second non-holographic features correlates to an inclination of said surface of said second 3D object at said corresponding point, and
wherein an orientation of said second non-holographic features correlates to an orientation of said surface of said second 3D object at said corresponding point.

6. The optical product of claim 1,
wherein said inclination of said surface of said first 3D object comprises a polar angle from a first reference line of said first 3D object, and
wherein said orientation of said surface of said first 3D object comprises an azimuth angle from a second reference line orthogonal to said first reference line of said first 3D object.

7. The optical product of claim 6,
wherein said inclination of said surface of said second 3D object comprises a polar angle from a first reference line of said second 3D object, and
wherein said orientation of said surface of said second 3D object comprises an azimuth angle from a second reference line orthogonal to said first reference line of said second 3D object.

8. The optical product of claim 1, wherein said first and second non-holographic features comprise a reflective surface.

9. The optical product of claim 1, wherein said first or second 3D object comprises an irregularly shaped object.

10. The optical product of claim 1, wherein said first or second 3D object comprises one or more alphanumeric characters.

11. The optical product of claim 1, wherein said optical product is configured to provide authenticity verification on an item for security.

12. The optical product of claim 11, wherein said item is currency, a credit card, a debit card, a passport, a driver's license, an identification card, a document, a tamper evident container or packaging, or a bottle of pharmaceuticals.

13. The optical product of claim 1, wherein the first and/or second non-holographic features are configured to produce at least part of the image without relying on diffraction and/or phase information.

14. The optical product of claim 1, wherein the first and second 3D images are achromatic.

15. The optical product of claim 1, wherein the first and/or second non-holographic features provide no diffractive or interference color.

16. The optical product of claim 1, wherein the optical product does not provide iridescence over an angular range about a viewing direction over a collection pupil having a size of 4.0 mm or 5.0 mm located at a distance of 24 inches.

17. The optical product of claim 1, wherein the first and/or second non-holographic features comprise a tint, an ink, dye, or a pigment.

18. The optical product of claim 1, wherein the array of lenses prisms, or mirrors comprises an array of lenses, and wherein the array of lenses comprises freeform lenslets.

19. The optical product of claim 1, wherein the array of lenses prisms, or mirrors comprises an array of lenses, and wherein the array of lenses comprises symmetric lenslets.

* * * * *